(12) United States Patent
Wang et al.

(10) Patent No.: US 11,702,720 B2
(45) Date of Patent: Jul. 18, 2023

(54) METHOD OF PRODUCING STABLE CU-BASED CORE-SHELL NANOPARTICLES

(71) Applicant: INSTITUT NATIONAL DE LA RECHERCHE SCIENTIFIQUE, Québec (CA)

(72) Inventors: Yong Wang, Longueuil (CA); Dongling Ma, Pointe-Claire (CA); Mohamed Chaker, Montréal (CA)

(73) Assignee: INSTITUT NATIONAL DE LA RECHERCHE SCIENTIFIQUE, Québec (CA)

(*) Notice: Subject to any disclaimer, the term of this patent is extended or adjusted under 35 U.S.C. 154(b) by 81 days.

(21) Appl. No.: 17/129,795

(22) Filed: Dec. 21, 2020

(65) Prior Publication Data
US 2021/0229169 A1 Jul. 29, 2021

Related U.S. Application Data

(60) Provisional application No. 62/964,891, filed on Jan. 23, 2020.

(51) Int. Cl.
| | |
|---|---|
| C22C 1/04 | (2023.01) |
| B22F 9/30 | (2006.01) |
| B22F 1/054 | (2022.01) |
| B22F 1/145 | (2022.01) |
| B22F 1/17 | (2022.01) |
| B82Y 30/00 | (2011.01) |

(Continued)

(52) U.S. Cl.
CPC .......... *C22C 1/0425* (2013.01); *B22F 1/054* (2022.01); *B22F 1/145* (2022.01); *B22F 1/17* (2022.01); *B22F 9/30* (2013.01); *B22F 1/0545* (2022.01); *B22F 2301/10* (2013.01); *B22F 2301/255* (2013.01); *B22F 2304/054* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| | | | | |
|---|---|---|---|---|
| 6,929,675 B1 * | 8/2005 | Bunge | ............. | B82Y 30/00 75/371 |
| 2012/0048426 A1 * | 3/2012 | Ishizaki | ............. | B82Y 40/00 252/75 |

(Continued)

FOREIGN PATENT DOCUMENTS

| | | | |
|---|---|---|---|
| CN | 105405975 A | * | 3/2016 |
| EP | 2810714 | | 12/2014 |
| WO | WO-2018140226 A1 | * | 8/2018 |

OTHER PUBLICATIONS

English translation of CN 105405975 (originally published Mar. 16, 2016) obtained from PE2E search.*

(Continued)

*Primary Examiner* — George Wyszomierski
(74) *Attorney, Agent, or Firm* — Bereskin & Parr LLP/S.E.N.C.R.L., s.r.l.

(57) ABSTRACT

The present disclosure relates to a stable copper-based core-shell nanoparticle and its process of manufacture. Further, the present disclosure relates to the use of the copper-based core-shell nanoparticles as plasmonic photocatalysts in photocalysis and hydrogen production.

18 Claims, 28 Drawing Sheets

(51) Int. Cl.
B82Y 40/00 (2011.01)
B22F 1/0545 (2022.01)

(56) References Cited

U.S. PATENT DOCUMENTS

2021/0031271 A1* 2/2021 Chen ............... B22F 1/0547
2021/0039171 A1* 2/2021 Chen ............... B01J 35/023

OTHER PUBLICATIONS

Lee et al., "Cu—Ag core-shell nanoparticles with enhanced oxidation stability for printed electronics", Nanotechnology 26 (Oct. 22, 2015) 455601 (9pp).
Liu et al., "Unidirectional Thermal Diffusion in Bimetallic Cu@Au Nanoparticles", ACS Nano, vol. 8, No. 2, 1886-1892, Jan. 28, 2014.
Niu et al., "Ultrathin Epitaxial Cu@Au Core-Shell Nanowires for Stable Transparent Conductors", Journal of the American Chemical Society, May 8, 2017, 139, 7348-7354.
Lucas V. Besteiro et al., "The fast and the furious: Ultrafast hot electrons in plasmonic metastructures. Size and structure matter", Nano Today 27 (Jul. 2019) 120-145.
Marimuthu et al., "Tuning Selectivity in Propylene Epoxidation by Plasmon Mediated Photo-Switching of Cu Oxidation State", Science, Mar. 29, 2013, vol. 339, 1590-1593.
Minsu Jung et al., "Exploring Cu oxidation state on TiO2 and its transformation during photocatalytic hydrogen evolution", Applied Catalysis A: General 521 (2016) 190-201 (Available Online on Dec. 8, 2015).
Muzikansky et al., "Ag Dewetting in Cu@Ag Monodisperse Core-Shell Nanoparticles", J. Phys. Chem. C, 2013, 117, 3093-3100 (Published on Dec. 5, 2012).
Newhouse et al., "Coherent Vibrational Oscillations of Hollow Gold Nanospheres", J. Phys. Chem. Lett., Jan. 2011, 2, 228-235.
Nianqiang Wu, "Plasmonic metal—semiconductor photocatalysts and photoelectrochemical cells: a review", Nanoscale, 2018, 10, 2679-2696 (Accepted on Dec. 30, 2017).
Y. F. Nicolau, "Solution Deposition of Thin Solid Compound Films by a Successive Ionic-Layer Adsorption and Reaction Process", Applications of Surface Science 22/23 (1985) 1061-1074 (Accepted for Publication on Dec. 10, 1984).
Niu et al., "Ultrathin Epitaxial Cu@Au Core-Shell Nanowires for Stable Transparent Conductors", J. Am. Chem. Soc., May 2017, 139, 7348-7354.
Osowiecki et al., "Tailoring Morphology of Cu—Ag Nanocrescents and Core-Shell Nanocrystals Guided by a Thermodynamic Model", J. Am. Chem. Soc., Jun. 2018, 140, 8569-8577.
Park et al., "Reversibly pH-Responsive Gold Nanoparticles and Their Applications for Photothermal Cancer Therapy", Scientific Reports, (Dec. 2019) 9:20180.
Peng Zheng et al., "Origin of strong and narrow localized surface plasmon resonance of copper nanocubes", Nano Research, 2019, 12(1): 63-68 (Accepted on Aug. 14, 2018).
Pinghua Ling et al., "Versatile Three-Dimensional Porous Cu@Cu2O Aerogel Networks as Electrocatalysts and Mimicking Peroxidases", Angew. Chem., May 2018, 130, 6935-6940.
Piyong Zhang et al., "Design of Cu—Cu2O/g-C3N4 nanocomponent photocatalysts for hydrogen evolution under visible light irradiation using water-soluble Erythrosin B dye sensitization", Applied Surface Science 391 (2017) 404-414 (Available Online on May 31, 2016).
Piyong Zhang et al., "In-situ synthesis of Cu nanoparticles hybridized with carbon quantum dots as a broad spectrum photocatalyst for improvement of photocatalytic H2 evolution", Applied Catalysis B: Environmental 206 (Jan. 2017) 328-335.
Piyong Zhang et al., "Plasmonic Cu nanoparticle on reduced graphene oxide nanosheet support: An efficient photocatalyst for improvement of near infrared photocatalytic H2 evolution", Applied Catalysis B: Environmental 225 (2018) 172-179 (Available Online on Nov. 29, 2017).

Qichen Lu et al., "Oxygen-Defected Molybdenum Oxides Hierarchical Nanostructure Constructed by Atomic-Level Thickness Nanosheets as an Efficient Absorber for Solar Steam Generation", Sol. RRL 2019, 3, 1800277 (Published Online on Nov. 30, 2018).
Qingbo Zhang et al., "Synthesis of Ag@AgAu Metal Core/Alloy Shell Bimetallic Nanoparticles with Tunable Shell Compositions by a Galvanic Replacement Reaction", Small, Feb. 2008, 4, No. 8, 1067-1071.
Qingqing Lang et al., "Graphene "bridge" in transferring hot electrons from plasmonic Ag nanocubes to TiO2 nanosheets for enhanced visible light photocatalytic hydrogen evolution", Applied Catalysis B: Environmental 220 (2018) 182-190 (Available Online Aug. 20, 2017).
Qingzhe Zhang et al., "High-Efficiency Broadband C3N4 Photocatalysts: Synergistic Effects from Upconversion and Plasmons", ACS Catal., Aug. 2017, 7, 6225-6234.
Qingzhe Zhang et al., "Plasmonic Au-Loaded Hierarchical Hollow Porous TiO2 Spheres: Synergistic Catalysts for Nitroaromatic Reduction", J. Phys. Chem. Lett., Aug. 2018, 9, 5317-5326.
Qin Li et al., "Synthesis, Microstructure, and Catalytic Performance of Monolithic Low-Density Porous Au", Advanced Engineering Materials, Jan. 2017, 19, No. 7, 1700045.
Ristov et al., "Chemical Deposition of Cu2O Thin Films", Thin Solid Films, 123 (1985) 63-67 (Accepted on Oct. 23, 1984).
Rusch et al., "Versatile route to core-shell reinforced network nanostructures", Nanoscale, Jul. 2019, 11, 15270.
Seung Uk Son et al., "Synthesis of Cu2O coated Cu nanoparticles and their successful applications to Ullmann-type amination coupling reactions of aryl chlorides", Chem. Commun., Feb. 2004, 778-779.
Shengyun Huang et al., "High-Performance Suspended Particle Devices Based on Copper-Reduced Graphene Oxide Core-Shell Nanowire Electrodes", Adv. Energy Mater., Mar. 2018, 8, 1703658.
Shi et al., "Graphene supported Cu nanoparticles as catalysts for the synthesis of dimethyl carbonate: Effect of carbon black intercalation", Molecualr Catalysis 445 (2018) 257-268 (Available Online on Dec. 22, 2017).
Shiliang Wang et al., "Synthesis, growth mechanism and thermal stability of copper nanoparticles encapsulated by multi-layer graphene", Carbon 50 (Jan. 2012) 2119-2125.
Shoujie Liu et al., "Unidirectional Thermal Diffusion in Bimetallic Cu@Au Nanoparticles", ACS Nano, vol. 8, No. 2, 1886-1892, Jan. 2014.
Shu-Hao Chang et al., "Synthesis of Cu/ZnO core/shell nanocomposites and their use as efficient photocatalysts", CrystEngComm., 2016, 18, 616 (Accepted on Dec. 17, 2015).
Stöber et al., "Controlled Growth of Monodisperse Silica Spheres in the Micron Size Range", Journal of Colloid and Interface Science 26, 62-69 (1968) (Received on Aug. 3, 1967).
Sungi Kim et al., "Nonnoble-Metal-Based Plasmonic Nanomaterials: Recent Advances and Future Perspectives", Adv. Mater., Mar. 2018, 30, 1704528.
Sutter et al., "In situ liquid-cell electron microscopy of silver-palladium galvanic replacement reactions on silver nanoparticles", Nature Communications, 5:4946, Published on Sep. 11, 2014.
Ting Bian et al., "Epitaxial Growth of Twinned Au—Pt Core-Shell Star-Shaped Decahedra as Highly Durable Electrocatalysts", Nano Lett., Nov. 2015, 15, 7808-7815.
Tse-Lok Ho, "Hard and Soft Acids and Bases Principle in Organic Chemistry", Department of Chemistry (1977).
Tymoczko et al., "One-step synthesis of Fe—Au cose-shell magnetic-plasmonic nanoparticles driven by interface energy minimization", Nanoscale Horiz., Jul. 2019, 4, 1326-1332.
Wang et al., "Nanogold plasmonic photocatalysis for organic synthesis and clean energy conversion", Chem. Soc. Rev., Apr. 2014, 43, 7188.
Wuping Xue et al., "Catalytic Oxidation of 1,2-Propanediol over Bimetallic Cu@Au Core/Shell Nanoparticles", Catal Lett (Apr. 2016) 146:1139-1152.
Xiaogang Han et al., "A General Strategy Toward pH-Controlled Aggregation-Dispersion of Gold Nanoparticles and Single-Walled Carbon Nanotubes", small, Feb. 2008, 4, No. 3, 326-329.

(56) References Cited

OTHER PUBLICATIONS

Xiaogang Peng et al., "Epitaxial Growth of Highly Luminescent CdSe/CdS Core/Shell Nanocrystals with Photostability and Electronic Accessibility", J. Am. Chem. Soc., Mar. 1997, 119, 7019-7029.
Xiaohu Xia et al., "25th Anniversary Article: Galvanic Replacement: A Simple and Versatile Route to Hollow Nanostructures with Tunable and Well-Controlled Properties", Adv. Mater., Sep. 2013, 25, 6313-6333.
Xiaoqing Huang et al., "Monidisperse Cu@PtCu nanocrystals and their conversion into hollow-PtCu nanostructures for methanol oxidation", J. Mater. Chem. A, Oct. 2013, 1, 14449.
Xiao Zhang et al., "Product selectivity in plasmonic photocatalysis for carbon dioxide hydrogenation", Nature Communications, 8:14542, Published on Feb. 23, 2017.
Xintong Yuan et al., "Ultrathin Pd—Au Shells with Controllable Alloying Degree on Pd Nanocubes toward Carbon Dioxide Reduction", J. Am. Chem. Soc., Mar. 2019, 141, 4791-4794.
Yang et al., "High-Efficiency "Working-in-Tandem" Nitrogen Photofixation Achieved by Assembling Plasmonic Gold Nanocrystals on Ultrathin Titania Nanosheets", J. Am. Chem. Soc., Jun. 2018, 140, 8497-8508.
Yanyun Ma et al., "Au@Ag Core-Shell Nanocubes with Finely Tuned and Well-Controlled Sizes, Shell Thickness, and Optical Properties", ACS Nano, vol. 4, No. 11, 6725-6734, Oct. 2010.
Yifan Zhang et al., "In-situ synthesis of nanofibers with various ratios of BiOClx/BiOBry/BiOIz for effective trichloroethylene photocatalytic degradation", Applied Surface Science 384 (May 2016) 192-199.
Yifeng Shi et al., "Noble-Metal Nanocrystals with Controlled Shapes for Catalytic and Electrocatalytic Applications", Chem. Rev., 2021, 121, 649-735 (Published on Jul. 15, 2020).
Yongbing Lou et al., "A Stable Plasmonic Cu@Cu2O/ZnO Heterojunction for Enhanced Photocatalytic Hydrogen Generation", ChemSusChem, Apr. 2018, 11, 1505-1511.
Yu-Chi Tsao et al., "Aqueous Phase Synthesis of Au—Ag Core-Shell Nanocrystals with Tunable Shapes and Their Optical and Catalytic Properties", J. Am. Chem. Soc., 2014, 136, 396-404 (Published on Dec. 17, 2013).
Yun Xia et al., "Spatially isolating salt crystallisation from water evaporation for continuous solar steam generation and salt harvesting", Energy Environ. Sci., Apr. 2019, 12, 1840.
Yuxiang Zhu et al., "Bimetallic Ag—Cu Supported on Graphitic Carbon Nitride Nanotubes for Improved Visible-Light Photocatalytic Hydrogen Production", ACS Appl. Mater. Interfaces, Feb. 2018, 10, 9468-9477.
Zakaria et al., "Small Molecule- and Amino Acid-Induced Aggregation of Gold Nanoparticles", Langmuir, May 2013, 29, 7661-7673.
Zeke Liu, "Tuning infrared plasmon resonances in doped metal-oxide nanocrystals through cation-exchange reactions", Nature Communications, (Mar. 2019), 10:1394.
Xueqin Liu et al., "Noble metal-metal oxide nanyhybrids with tailored nanostructures for efficient solar energy conversion, photocatalysis and environmental remediation", Energy Environ. Sci., 2017, 10, 402 (Accepted on Aug. 17, 2016).
Zhen Yin et al., "Hybrid Au—Ag Nanostructures for Enhanced Plasmon-Driven Catalytic Selective Hydrogenation through Visible Light Irradiation and Surface-Enhanced Raman Scattering", J. Am. Chem. Soc., Jan. 2018, 140, 864-867.
Zhiqiang Niu et al., "Ultrathin Epitaxial Cu@Au Core-Shell Nanowires for Stable Transparent Conductors", J. Am. Chem. Soc., May 2017, 139, 7348-7354.
Zhi-You Zhou et al., "Nanomaterials of high surface energy with exceptional properties in catalysis and energy storage", Chem. Soc. Rev., 2011, 40, 4167-4185.
Linic et al., "Photochemical transformations on plasmonic metal nanoparticles", Nature Materials, Review Article, Published Online on May 20, 2015.
Lin Zhou et al., "3D self-assembly of aluminium nanoparticles for plasmon-enhanced solar desalination", Nature Photonics, vol. 10, Jun. 2016.
Liu et al., "CuNPs for Efficient Photocatalytic Hydrogen Evolution", Part. Part. Syst. Charact., Jun. 2015, 32, 869-873.
Liu et al., "High performance Au—Cu alloy for enhanced visible-light water splitting driven by coinage metals", Chem. Commun., Feb. 2016, 52, 4694.
Abbas et al., "Shape- and size-controlled synthesis of Cu nanoparticles wrapped on RGO nanosheet catalyst and their outstanding stability and catalytic performance in the hydrogenation reaction of dimethyl oxalate", J. Mater. Chem A, Sep. 2018, 6, 19133-19142.
Alejandro F. Alvarez-Paneque et al., "Shape-Templated Growth of Au@Cu Nanoparticles", J. Phys. Chem. C, 2013, 117, 2474-2479, Published on Aug. 3, 2012.
Bala et al., "A facile liquid foam based synthesis of nickel nanoparticles and their subsequent conversion to NicoreAgshell particles: structural characterization and investigation of magnetic properties", J. Mater. Chem., Sep. 2004, 14, 2941-2945.
Beberwyck et al., "Cation Exchange: A Versatile Tool for Nanomaterials Synthesis", J. Phys. Chem. C, Sep. 2013, 117, 19759-19770.
Byoung-Hoon Lee et al., "Reversible and cooperative photoactivation of single-atom Cu/TiO2 photocatalysts", Nature Materials, vol. 18, Jun. 2019, 620-626.
Changjiang Zhou et al., "Low-Temperature Carbon Monoxide Oxidation with Au—Cu Meatball-Like Cages Prepared by Galvanic Replacement", ChenSusChem, Aug. 2013, 6, 1883-1887.
Changsoo Lee et al., "Cu—Ag core-shell nanoparticles with enhanced oxidation stability for printed electronics", Nanotechnology 26 (Oct. 2015) 455601 (9pp).
Chaoliang Tan et al., "Dimensional Nanosheets", J. Am. Chem. Soc., Sep. 2015, 137, 12162-12174.
Chao Zhan et al., "From plasmon-enhanced moledular spectroscopy to plasmon-mediated chemical reactions", Article in Nature Reviews Chemistry (Aug. 2018).
Chao Zhan et al., "Interfacial Construction of Plasmonic Nanostructures for the Utilization of the Plasmon-Excited Electrons and Holes", J. Am. Chem. Soc., May 2019, 141, 8053-8057.
Christopher et al., "Visible-light-enhanced catalytic oxidation reactions on plasmonic silver nanostructures", Nature Chemistry, vol. 3, Jun. 2011, 467-472.
Dajiang Zheng et al., "Unconventional Route to Hairy Plasmonic/Semiconductor Core/Shell Nanoparticles with Precisely Controlled Dimensions and Their Use in Solar Energy Conversion", Chem. Mater. Jul. 2015, 27, 5271-5278.
Dong Liu et al., "Pd—Ag alloy hollow nanostructures with interatomic charge polarization for enhanced electrocatalytic formic acid oxidation", Nano Research, Feb. 2016, 9(6): 1590-1599.
Dou et al., "Solution-Processed Copper/Reduced-Graphene-Oxide Core/Shell Nanowire Transparent Conductors", ACS Nano, Jan. 2016, 10, 2600-2606.
Erlebacher et al., "Evolution of nanoporosity in dealloying", Nature, vol. 410, Mar. 22, 2001, 450-453.
Fei Zhao et al., "Materials for solar-powered water evaporation", Nature Reviews, Materials, Mar. 10, 2020.
Gawande et al., "Core-shell nanoparticles: synthesis and applications in catalysis and electrocatalysis", Chem. Soc. Rev., Apr. 2015, 44, 7540.
Gawande et al., "Cu and Cu-Based Nanoparticles: Synthesis and Applications in Catalysis", Chem. Rev., Mar. 2016, 116, 3722-3811.
George H. Chan et al., "Plasmonic Properties of Copper Nanoparticles Fabricated by Nanosphere Lithography", American Chemical Society, May 2007, vol. 7, No. 7, 1947-1952.
Ghasemi et al., "Solar steam generation by heat localization", Article, Nature Communications, 5:4449, Published on Jul. 21, 2014.
Ghosh et al., "Core/Shell Nanoparticles: Classes, Properties, Synthesis Mechanisms, Characterization, and Applications", Chem. Rev. 2012, 112, 2373-2433, Published on Dec. 28, 2011.
Gong et al., "Synthesis of Au@Ag Core-Shell Nanocubes Containing Varying Shaped Cores and Their Localized Surface Plasmon Resonances", Langmuir, Feb. 2012, 28, 8959-8964.

(56) References Cited

OTHER PUBLICATIONS

Grant et al., "Ultrafast Electronic Relaxation and Coherent Vibrational Oscillation of Strongly Coupled Gold Nanoparticle Aggregates", J. Am. Chem. Soc., 2003, 125, 549-553, Published on Dec. 5, 2002.
Guo et al., "Copper Nanoparticles on Graphene Support: An Efficient Photocatalyst for Coupling of Nitroaromatics in Visible Light", Angew. Chem. Int. Ed., Jan. 2014, 53, 1973-1977.
Hanxue Liang et al., "Thermal Efficiency of Solar Steam Generation Approaching 100% through Capillary Water Transport", Angew. Chem., Nov. 2019, 131, 19217-19222.
Hui-Juan Zhan et al., "Biomimetic Difunctional Carbon-Nanotube-Based Aerogels for Efficient Steam Generation", ACS Appl. Nano Mater., Apr. 2020, 3, 4690-4698.
Isabel Pastoriza-Santos et al., "Aerobic Synthesis of Cu Nanoplates with Intense Plasmon Resonances", small 2009, 5, No. 4, 440-443 (Revised on Oct. 8, 2008).
Jeung-Yeop Shim et al., "Reversible aggregation of gold nanoparticles induced by pH dependent conformational transitions of a self-assembled polypeptide", Journal of Colloid and Interface Science 316 (Aug. 2007) 977-983.
Jiang-Feng Li et al., "Core-Shell Nanoparticle-Enhanced Raman Spectroscopy", Chem. Rev., Mar. 2017, 117, 5002-5069.
Jiang et al., "Active Plasmonics: Principles, Structures, and Applications", Chem. Rev., 2018, 118, 3054-3099 (Published on Sep. 29, 2017).
Jijian Xu et al., "Copper nanodot-embedded graphene urchins of nearly full-spectrum solar absorption and extraordinary solar desalination", Nano Energy 53 (Aug. 2018) 425-431.
Jing Fang et al., "Hierarchical Porous Carbonized Lotus Seedpods for Highly Efficient Solar Steam Generation", Chem. Mater., Sep. 2018, 30, 6217-6221.
Jingxiang Low et al., "Enhanced visible-light photocatalytic activity of plasmonic Ag and graphene co-modified Bi2WO6 nanosheets", Phys. Chem. Chem. Phys., 2014, 16, 1111 (Accepted on Nov. 1, 2013).
Jinxing Chen et al., "Space-Confined Seeded Growth of Cu Nanorods with Strong Surface Plasmon Resonance for Photothermal Actuation", Angew. Chem., May 2019, 131, 9376-9382.
P. B. Johnson et al., "Optical Constants of the Noble Metals", Physical Review B, vol. 6, No. 12, Dec. 15, 1972.
Jun-Hao Zhou et al., "Thin-walled hollow Au—Cu nanostructures with high efficiency in electrochemical reduction of CO2 to CO", Inorg. Chem. Front., Apr. 2018, 5, 1524.
Junli Liu et al., "Cluster-Nucleic Coassembled into Two-Dimensional Hybrid CuO-PMA Sub-1 nm Nanosheets", J. Am. Chem. Soc., Nov. 2019, 141, 18754-18758.
Jutaek Nam et al., "pH-Induced Aggregation of Gold Nanoparticles for Photothermal Cancer Therapy", J. Am. Chem. Soc., 2009, 131, 13639-13645 (Published on Sep. 8, 2009).
Kalidindi et al., "Nanostructured Cu and Cu@Cu2O core shell catalysts for hydrogen generation from ammonia-borane", Phys. Chem. Chem. Phys., Aug. 2008, 10, 5870-5874.
Kamat et al., "Self-Limiting Shell Formation in Cu@Ag Core-Shell Nanocrystals during Galvanic Replacement", J. Phys. Chem. Lett., Jun. 2020, 11, 5318-5823.
Kaur et al., "All-Ceramic Microfibrous Solar Steam Generator: TiN Plasmonic Nanoparticled-Loaded Transparent Microfibers", ACS Sustainable Chem. Eng., Sep. 2017, 5, 8523-8528.
Kerui Li et al., "Biomimetic MXene Textures with Enhanced Light-to-Heat Conversion for Solar Steam Generation and Wearable Thermal Management", Adv. Energy Mater., Aug. 2019, 9, 1901687.
Kobayashi et al., "Silica-coating of metallic copper nanoparticles in aqueous solution", Colloids and Surfaces A: Physicochem. Eng. Aspects 317 (2008) 756-759 (Available Online on Nov. 17, 2007).
Kobayashi et al., "Synthesis of metallic copper nanoparticles coated with polypyrrole", Colloid Polym Sci (May 2009) 287:877-880.
Kyung Min Choi et al., "Plasmon-Enhanced Photocatalytic CO2 Conversion within Metal-Organic Frameworks under Visible Light", J. Am. Chem. Soc., 2017, 139, 356-362 (Published on Nov. 26, 2016).
Lauhon et al., "Epitaxial core-shell and core-multishell nanowire heterostructures", Nature, vol. 420, Nov. 7, 2002.

* cited by examiner

METHOD OF PRODUCING STABLE CU-BASED CORE-SHELL NANOPARTICLES

CROSS-REFERENCE TO RELATED APPLICATIONS

The present disclosure claims the benefit of priority from U.S. patent application No. 62/964,891, filed Jan. 23, 2020, the contents of which are incorporated herein by reference in their entirety.

FIELD

The present disclosure relates to a stable copper-based core-shell nanoparticle and its process of manufacture. Further, the present disclosure relates to the use of the copper-based core-shell nanoparticles in catalysis, photocalysis, hydrogen production, conductive inks and optoelectronic devices.

INTRODUCTION

Fossil fuels are being rapidly consumed with the increased demands, which leads to energy crisis and various related environmental concerns. Safe, green and abundant, solar energy is one of the most promising and effective alternative energy resource. Photocatalytic process is a desirable way to efficiently transfer solar energy into usable energy. (1) In particular, solar water splitting can lead to the generation of $H_2$, which is a clean fuel, from water and has high energy efficiency. $H_2$ production by means of water splitting over photocatalysts is a cost-effective approach to large-scale solar hydrogen synthesis.

Unfortunately, despite intense efforts during the past 40 years, current direct photocatalysts for water splitting still face several challenging issues: (i) low quantum efficiency in the visible light range; (ii) many photocatalysts are made of rare and expensive materials; (iii) poor stability; (iv) insufficient light absorption; (v) inefficient charge separation; and (vi) high charge recombination. Therefore, there is a need to develop a more amenable photocatalyst.

Recently, it has been discovered that plasmonic metal nanoparticles are photocatalytically active; they can drive chemical reactions with photo-generated hot carriers and/or exhibit strong near fields and scattering effects to increase light absorption by other materials. (2, 3, 4) The formation of heterojunctions by coupling plasmonic nanostructures with semiconductors can greatly enhance the activity of photocatalysts by plasmonic energy and/or electron transfer from the metal nanostructure to the semiconductor. Nanostructured plasmonic metals, such as Au, Ag and Cu, strongly absorb visible light (~43% of incoming solar energy) in a wide range of the solar spectrum owing to their localized surface plasmon resonance (LSPR). When plasmonic metal nanostructures are used in photocatalysts, plasmons can modulate photocatalysis via the following effects: (i) strong light absorption, (ii) intensive far-field light scattering, (iii) a strong near-field electromagnetic field, (iii) abundant hot carrier generation and (iv) plasmonic heating effects. These effects may alter the key physical and chemical processes in a semiconductor to enhance photoconversion.

Most currently available plasmonic photocatalysts are based on Au and Ag. Compared to Au and Ag, Cu has a larger electron conductivity and higher earth abundance. These properties make Cu attractive as a low-cost plasmonic material. Cu NPs show a strong photoabsorption of visible light due to their surface plasmon that displays the maxima at approx. 580 nm. Therefore, Cu could be a promising alternative to noble metals for plasmonic photocatalysis. (5) In particular, many studies on photocatalytic $H_2$ evolution by plasmonic Cu NPs have recently been reported due to their strong LSPR effect, high photocatalytic activity and low cost. (6 to 10)

However, Cu has so far been significantly less explored, mainly because the difficulty in fabricating chemically stable Cu colloids with intense plasmon resonance bands suitable for catalytic applications. (11) Under catalytic reaction conditions or in air, Cu NPs are easily oxidized to $Cu_2O$ or CuO, which seriously affects its catalytic performance. (12 to 15) Although Cu NPs loaded on graphene or coated with polypyrrole, Ag, SiO2, etc. have been observed with improved chemical stability, these methods are effective at maintaining chemical stability of Cu NPs under harsh conditions, such as acidic or alkaline environments. (11, 16 to 19) Therefore, there is a need to design and develop plasmonic Cu-based nanoparticles with stability and high activity.

SUMMARY

Accordingly, the present disclosure includes a copper-based core-shell nanoparticle comprising
a core comprising Cu; and
a shell comprising at least one noble metal.

In another aspect, the present disclosure includes a process of forming the copper-based core-shell nanoparticle of the present disclosure comprising
mixing a Cu nanoparticle composition comprising an amine and a noble metal composition comprising a phosphine at a temperature of about 125° C. to about 155° C. to obtain a mixture; and
cooling the mixture to obtain the copper-based core-shell nanoparticle dispersed in the amine.

In another aspect, the present disclosure includes a process of forming a Cu nanoparticle comprising
mixing a Cu source and an amine at a temperature of about 200° C. to about 250° C. under an inert atmosphere to obtain a mixture; and
cooling the mixture to form the Cu nanoparticle dispersed in the amine.

In another aspect, the present disclosure includes a process of forming the copper-based core-shell nanoparticle of the present disclosure comprising
mixing a copper source and a primary amine under an inert atmosphere to obtain a mixture;
forming Cu nanoparticles by heating the mixture;
cooling the mixture;
adding a noble metal composition comprising a phosphine to obtain a core-shell composition; and
cooling the core-shell composition to obtain the copper-based core-shell nanoparticles.

In another aspect, the present disclosure includes a use of the copper-based core-shell nanoparticle of the present disclosure as catalyst.

In another aspect, the present disclosure includes a use of the copper-based core-shell nanoparticle of the present disclosure as photocatalyst.

In another aspect, the present disclosure includes a use of the copper-based core-shell nanoparticle of the present disclosure as plasmonic photocatalyst.

In another aspect, the present disclosure includes a use of the copper-based core-shell nanoparticle of the present disclosure in the production of hydrogen by photocatalysis.

In another aspect, the present disclosure includes a use of the copper-based core-shell nanoparticle of the present disclosure in conductive inks and optoelectronics.

In another aspect, the present disclosure includes a metal-based core-shell nanoparticle comprising
a core comprising a metal; and
a shell comprising at least one noble metal.

In another aspect, the present disclosure includes a method of catalyzing a reaction comprising providing a Cu-based core-shell nanoparticle of the present disclosure as a catalyst.

In another aspect, the present disclosure includes a method of photocatalysis comprising providing a Cu-based core-shell nanoparticle of the present disclosure as a photocatalyst.

In another aspect, the present disclosure includes a method of plasmonic photocatalysis comprising providing a Cu-based core-shell nanoparticle of the present disclosure as a photocatalyst.

In another aspect, the present disclosure includes a method of production of hydrogen by photocatalysis comprising providing a Cu-based core-shell nanoparticle of the present disclosure as a photocatalyst.

In another aspect, the present disclosure includes a method of production of hydrogen by photocatalysis comprising providing a Cu-based core-shell nanoparticle of the present disclosure as a photocatalyst and splitting water by photocatalysis.

In another aspect, the present disclosure includes a method of preparing conducive ink comprising providing a Cu-based core-shell nanoparticle of the present disclosure.

In another aspect, the present disclosure includes a method of preparing optoelectronics comprising providing a Cu-based core-shell nanoparticle of the present disclosure.

Other features and advantages of the present disclosure will become apparent from the following detailed description. It should be understood, however, that the detailed description and the specific examples, while indicating embodiments of the disclosure, are given by way of illustration only and the scope of the claims should not be limited by these embodiments, but should be given the broadest interpretation consistent with the description as a whole.

DRAWINGS

The embodiments of the disclosure will now be described in greater detail with reference to the attached drawings in which:

FIG. 1 shows a schematic illustration of the Cu@noble metal-Cu core-shell nanoparticle synthesis, where Au is used as an example of noble metal.

FIG. 2 shows TEM images with different magnifications (panels a and b), HAADF-STEM image (panel c), and corresponding EDS mapping images (panels d to f) of Cu@AuCu (5:2) nanoparticles. The dashed circles in panel b highlight Cu core. Inset in panel b is HR-TEM image of Cu@AuCu (5:2) nanoparticles. In panels e and f, the light grey in panel e represents Cu and the light grey in panel f represents Au. In panel d, the darker grey at the centre of the nanoparticle represents Cu, while the lighter grey at the periphery of the nanoparticle represents Au.

FIG. 3 shows elemental lines profiles obtained from EDS line scan mapping (panel a) and EDS spectrum (panel b) of Cu@AuCu (5:2) nanoparticles. Inset in panel a is the corresponding EDS mapping of a Cu@AuCu (5:2) nanoparticle. Inset in panel b is a table of elemental content obtained from the corresponding EDS spectrum.

Figure 8:
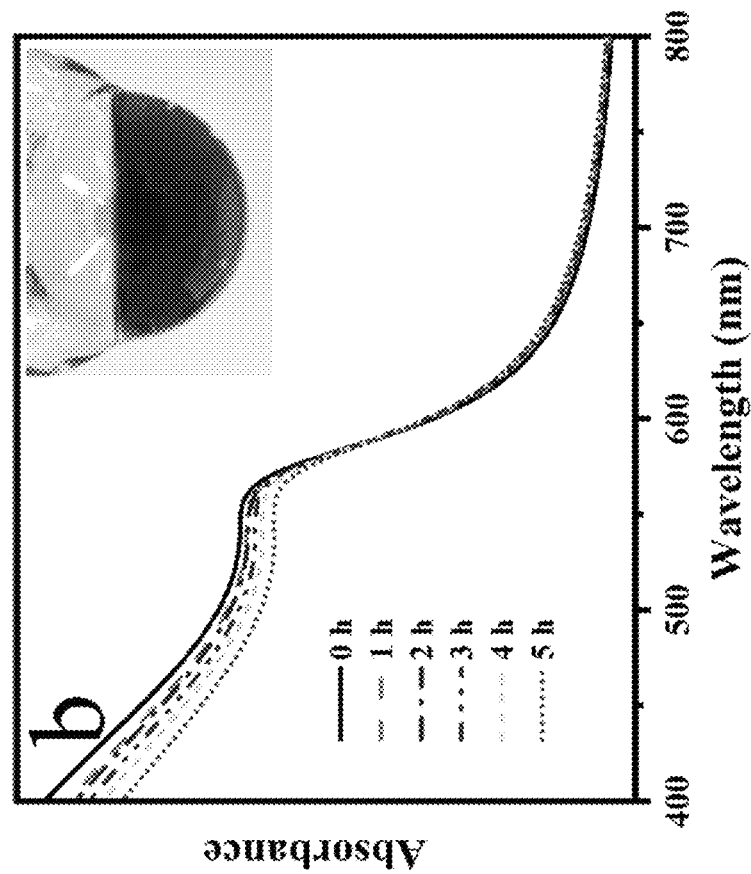
Figure 8:
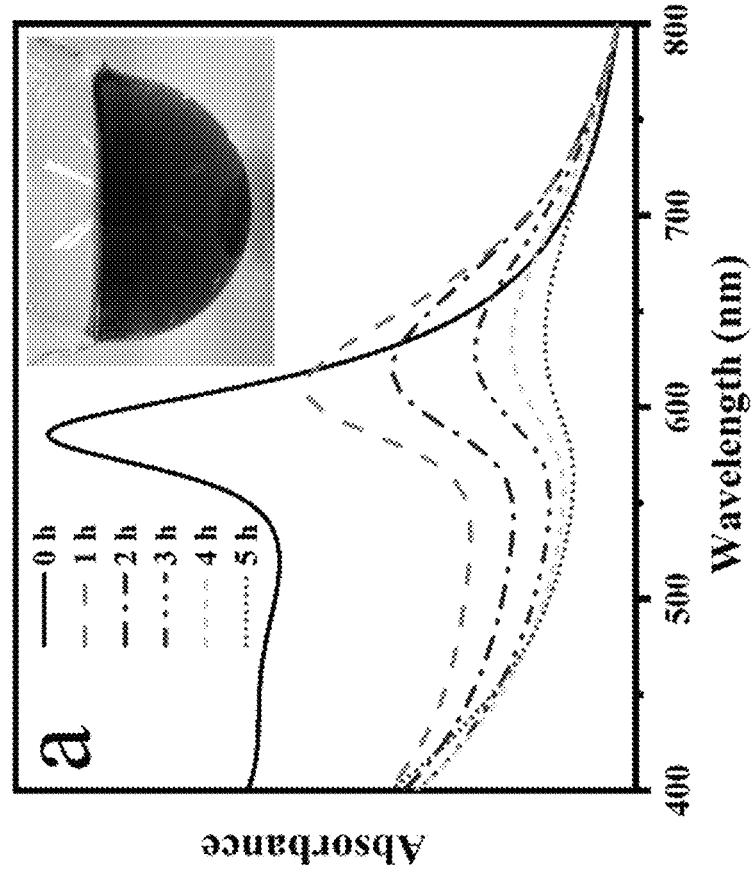

FIG. 8 shows the antioxidant stability of Cu NPs and Cu@AuCu (5:2) NPs. UV-vis spectra of Cu NPs (panels a) and Cu@AuCu (5:2) NPs (panels b) dispersed in toluene for different aging time and under heating at 100° C. for different time intervals. Insets in panels (a) and (b) are the corresponding color change of Cu NPs and Cu@AuCu (5:2) NPs. Insets in panels (a) and (b) are the corresponding color of Cu NPs and Cu@AuCu (5:2) NPs after heated at 100° C. for 5 h.

Figure 9:
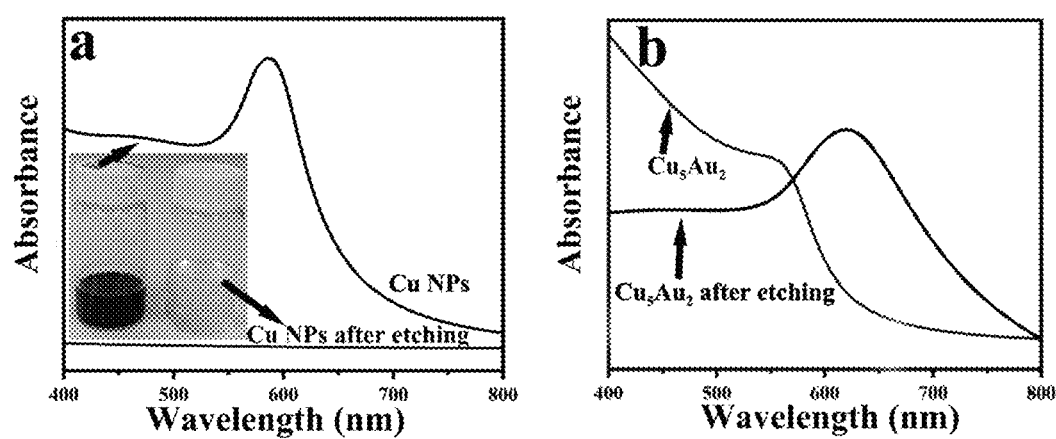

FIG. 9 shows the anti-etch stability of Cu nanoparticles and Cu@AuCu (5:2) nanoparticles. UV-Vis spectra of Cu nanoparticles (panel a) and Cu@AuCu (5:2) nanoparticles (panel b) before and after etched by $HNO_3$ (1M for 30 min). Insets in panel a are the corresponding photographs of Cu nanoparticles before (left) and after (right) etching.

Figure 10:
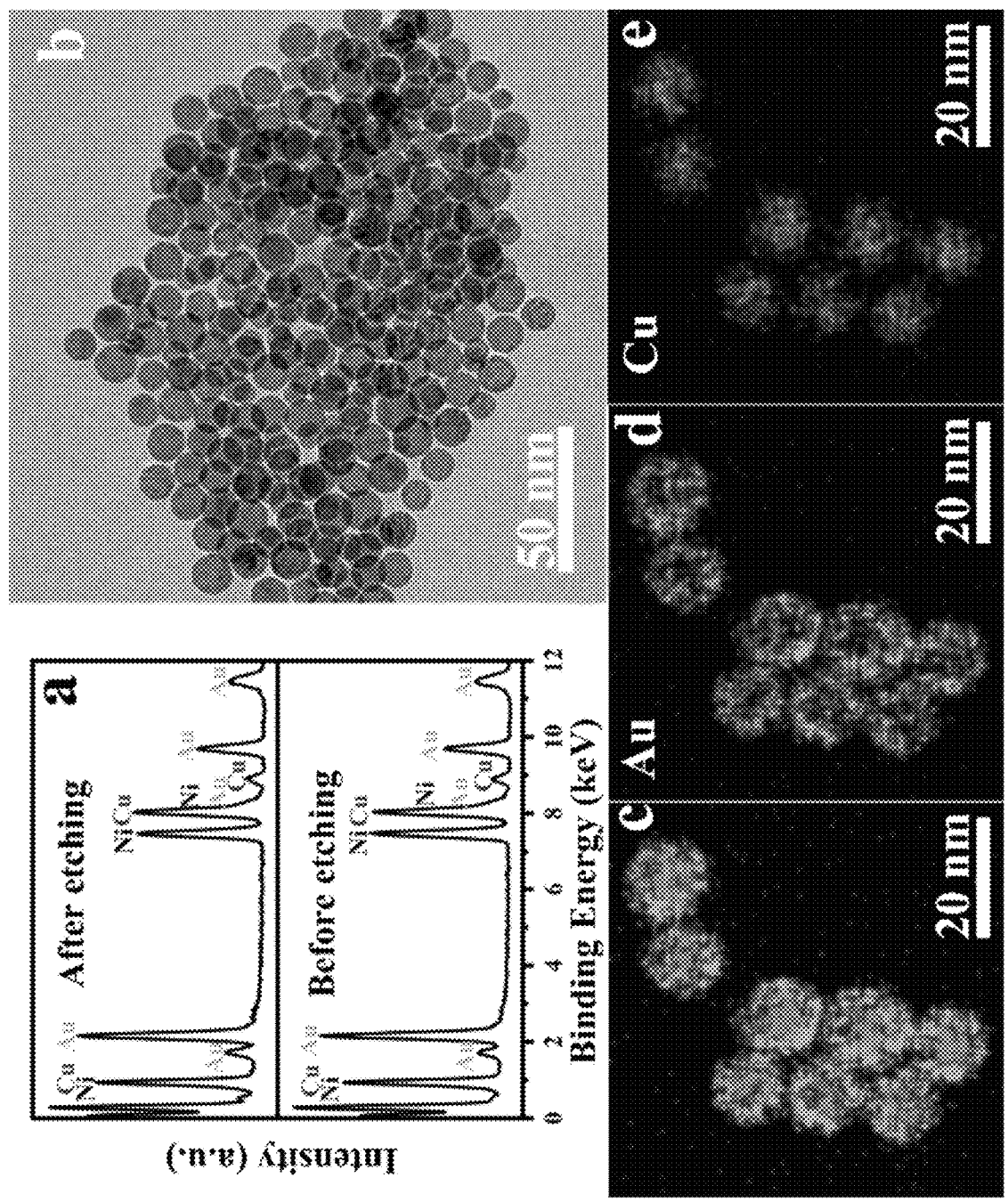

FIG. 10 shows the anti-etch stability of Cu@AuCu (5:2) NPs. EDS spectra of Cu@AuCu (5:2) NPs (panel a) before and after being etched by $HNO_3$ (1 M for 30 min). Panel b is the corresponding TEM image of Cu@AuCu (5:2) NPs after (right) etching. Panel c-e are the corresponding EDS mapping images of Cu@AuCu (5:2) NPs after etching. In panel c, the darker grey at the centre of the nanoparticle represents Cu, while the lighter grey at the periphery of the nanoparticle represents Au. In panels d and e, the light grey in panel d represents Au and the light grey in panel e represents Cu.

Figure 11:
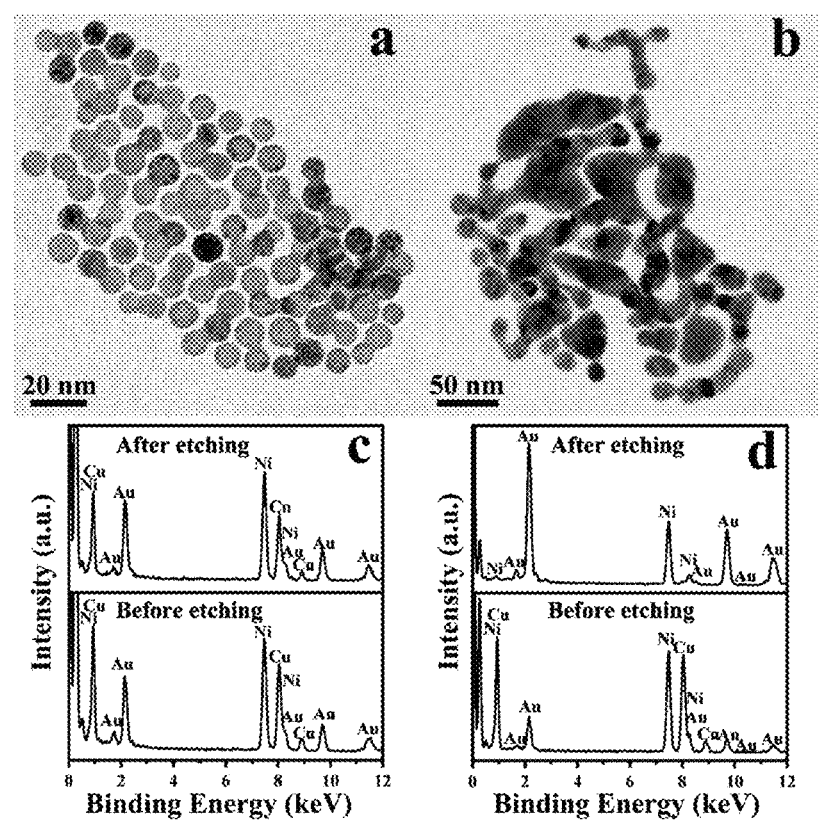

FIG. 11 shows TEM images of Cu@AuCu (5:1) NPs (panel a) and Cu@AuCu (10:1) NPs (panel b) after etched by $HNO_3$ (1 M) for 30 min, EDS spectrum of Cu@AuCu (5:1) NPs (panel c) and Cu@AuCu (10:1) NPs (panel d) before and after etched by $HNO_3$.

Figure 12:
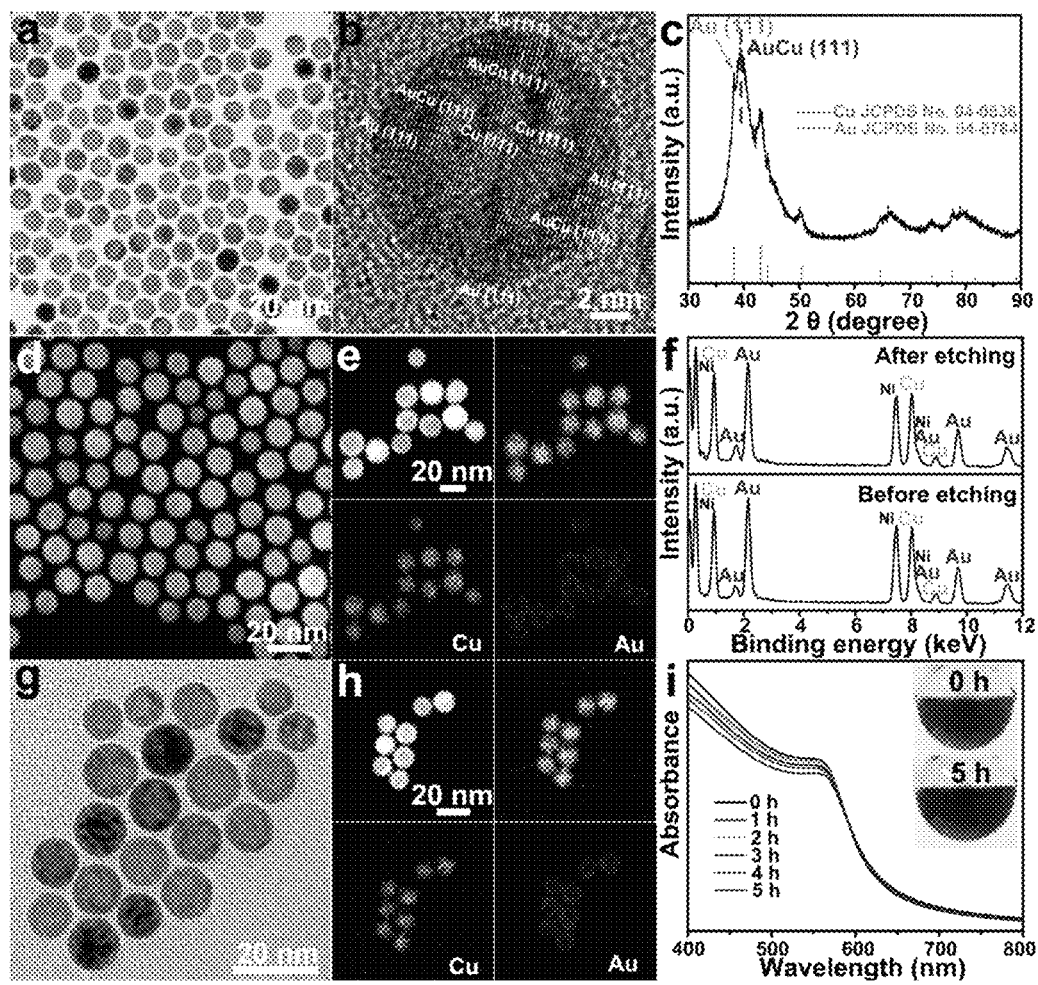

FIG. 12 shows TEM image (a), HR-TEM image (b), XRD pattern (c), HAADF-STEM image (d), and EDS mapping images (e) of $Cu_{2.5}Au_1$ NPs. EDS spectra (f) of $Cu_{2.5}Au_1$ NPs before and after the etching test with $HNO_3$ (1.0 M) for 30 min. The corresponding TEM image (g) and EDS mapping images (h) of $Cu_{2.5}Au_1$ NPs after the etching test. UV-vis spectra of $Cu_{2.5}Au_1$ NPs (i) dispersed in toluene under heating at 100° C. for different time intervals. Lattice fringes of Cu, CuAu alloy and Au are labelled in (b). Insets in (i) are the corresponding photographs of $Cu_{2.5}Au_1$ NPs before and after heating at 100° C. for 5 h.

Figure 13:
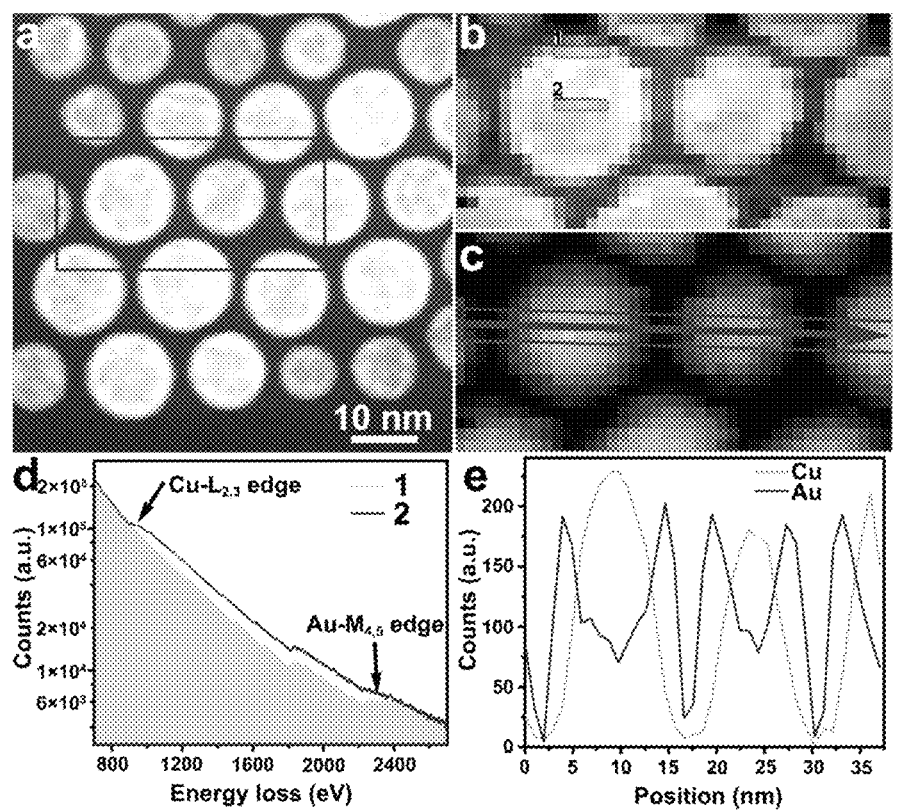

FIG. 13 shows HAADF-STEM image (a) of $Cu_{2.5}Au_1$ NPs. ADF image (b) recorded simultaneously with the EELS signal of the selected region in (a). EELS mapping (c) of Cu and Au in the selected region in (a). EELS spectra (d) obtained from the selected region marked in (b). EELS line profiles (e) of Au and Cu extracted from the selected region marked in (c).

Figure 14:
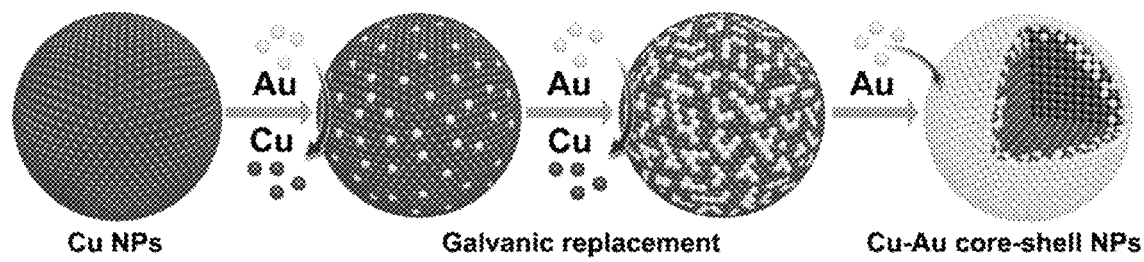

FIG. 14 shows a schematic illustration of thin shell stabilized plasmonic Cu-based NPs.

Figure 15:
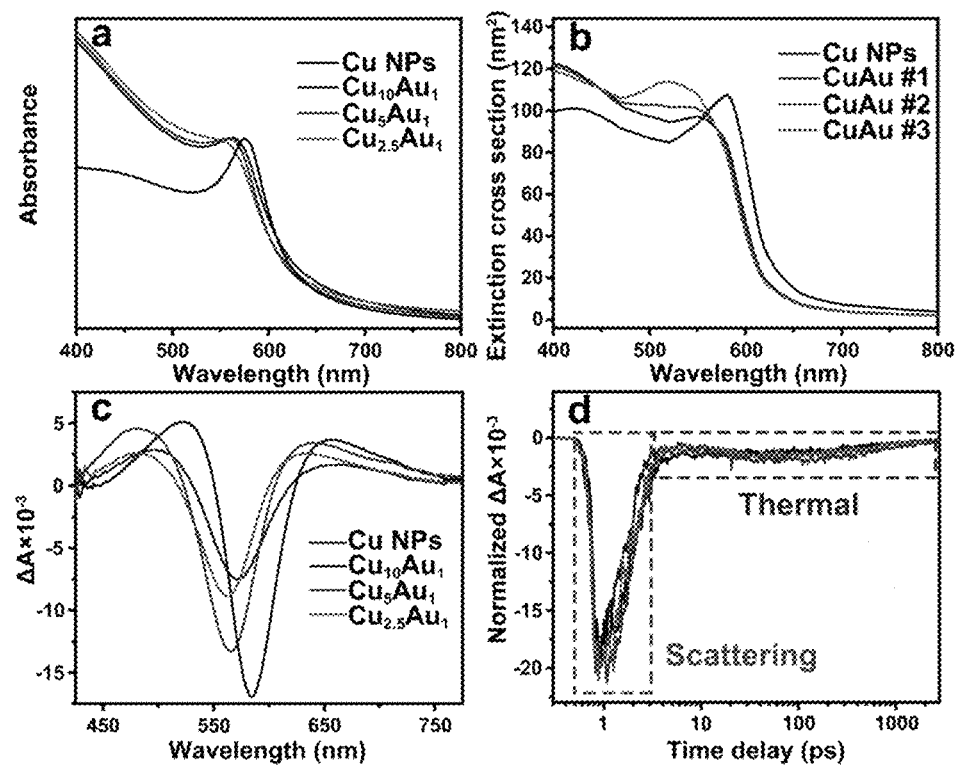

FIG. 15 shows (a) UV-vis spectra of Cu NPs and Cu—Au core-shell NPs synthesized at different Cu-to-Au feed ratios. (b) Theoretical extinction cross sections for Cu NPs model with $CuO_2$ shell and Cu—Au NPs models with progressively large Au concentration progressing from the NP's surface (overall Au concentration increases from CuAu #1 to CuAu #3). (c) Transient absorption spectra of Cu NPs and Cu—Au core-shell NPs synthesized at different feed ratios taken at the delay time of 1.3 ps under 530 nm excitation. (d) Normalized kinetic traces of Cu NPs and Cu—Au core-shell NPs at their minimum absorption wavelength.

Figure 16:
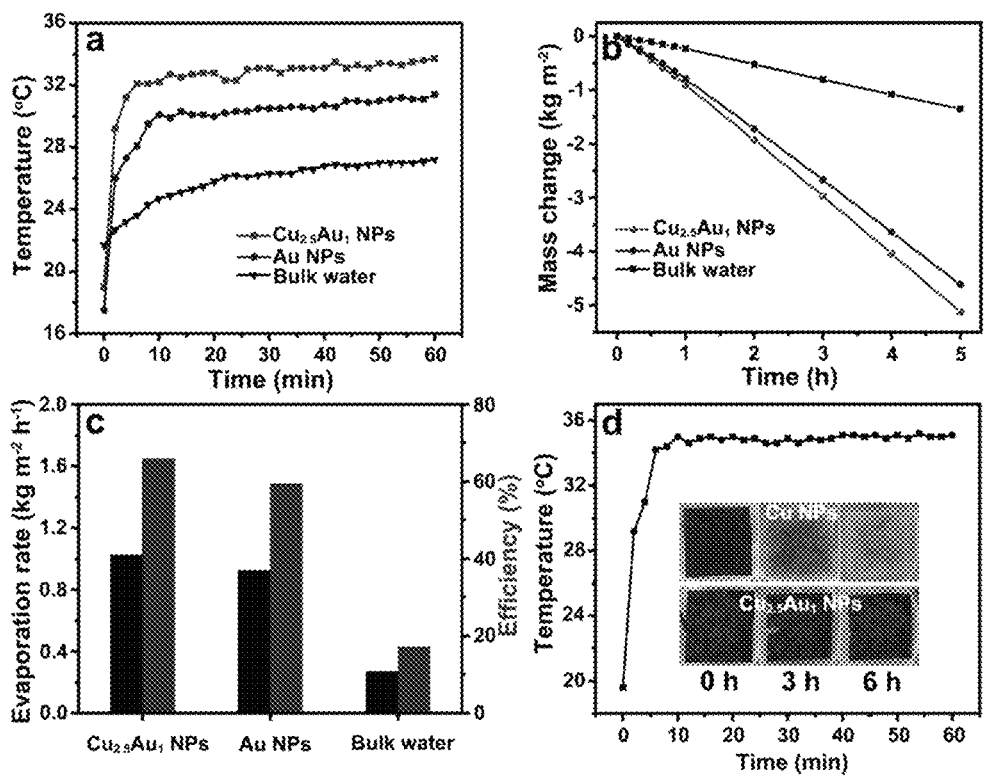

FIG. 16 Solar-induced water evaporation performance of $Cu_{2.5}Au_1$ NPs under 1 sun. The average temperature profiles (a) and evaporation mass change (b) of $Cu_{2.5}Au_1$ NPs, Au NPs and bulk water over time under 1 sun illumination. (c) The solar evaporation rates and solar steam efficiency of $Cu_{2.5}Au_1$ NPs, Au NPs and bulk water under 1 sun illumination. (d) The time-dependent surface temperature curve of the $Cu_{2.5}Au_1$ NPs when they were placed on the saturated $CO_2$ aqueous solution surface and under 1 sun illumination. Insets in (d) are the photographs of Cu NPs and $Cu_{2.5}Au_1$ NPs immersed in saturated $CO_2$ solution over time.

Figure 17:
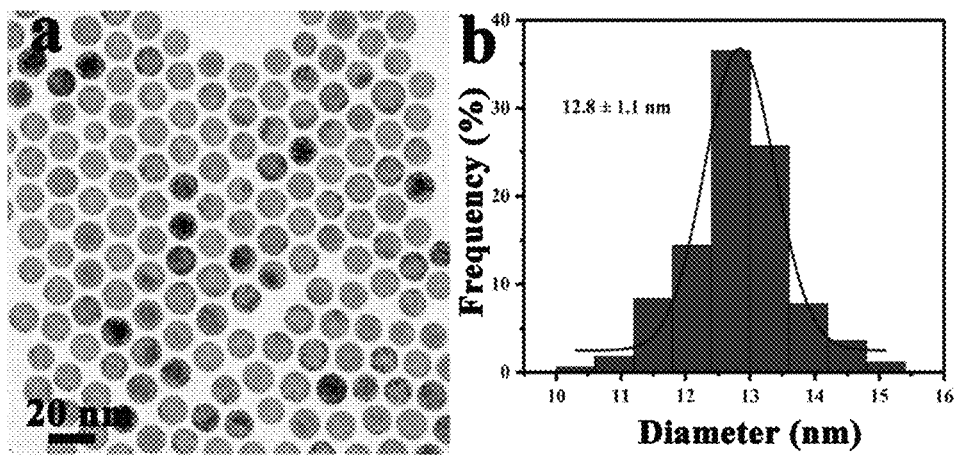

FIG. 17 shows TEM image (a) and the corresponding size distribution histogram (b) of $Cu_{2.5}Au_1$ core-shell NPs.

Figure 18:
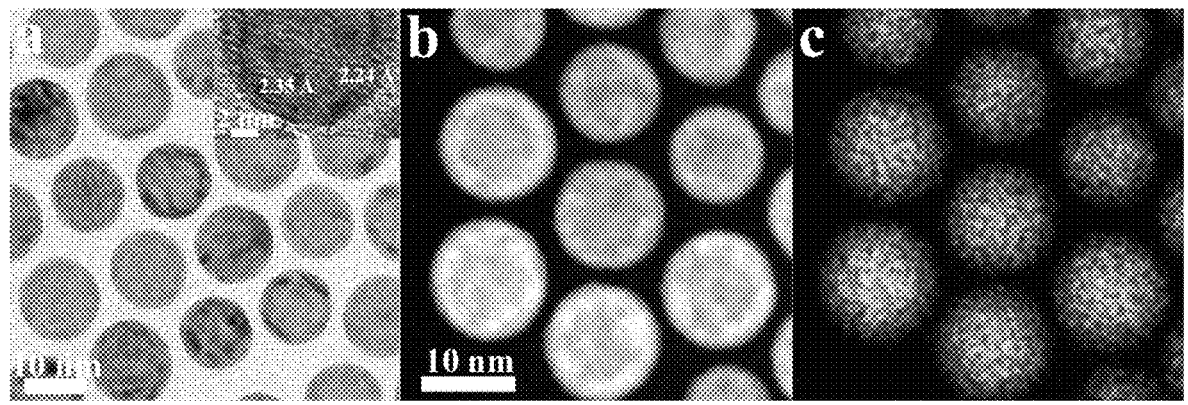

FIG. 18 shows TEM image (a), HAADF-STEM image (b) and the corresponding EDS mapping image (c) of $Cu_{2.5}Au_1$ core-shell NPs. Inset in (a) is HR-TEM image of $Cu_{2.5}Au_1$ NPs.

Figure 19:
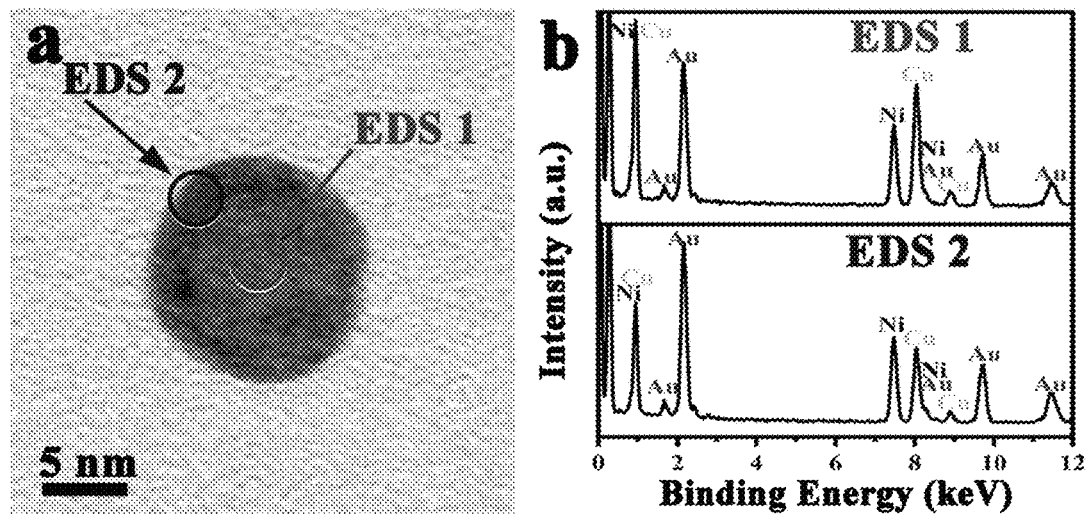

FIG. 19 shows TEM image (a) of a typical $Cu_{2.5}Au_1$ NP and EDS spectra (b) taken at core and shell regions. In one individual NP the Cu:Au ratio of the center part is higher than that of the edge part, consistent with the core-shell structure. The signal of Ni comes from the Ni grid.

Figure 20:
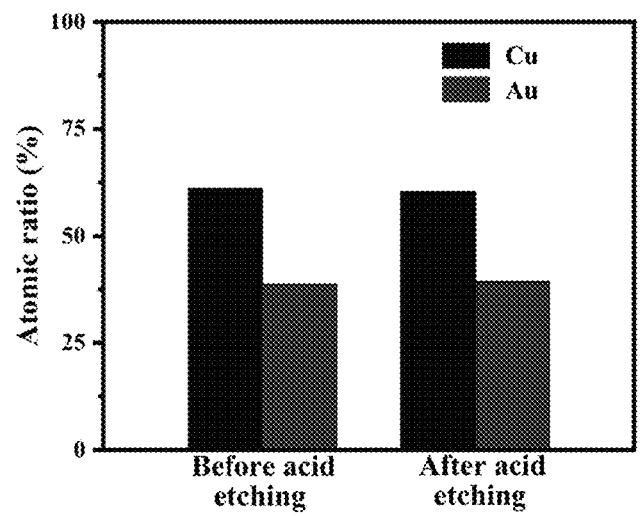

FIG. 20 shows the atomic ratios, measure by EDS, of $Cu_{2.5}Au_1$ NPs before and after the acid etching test with $HNO_3$ (1.0 M) for 30 min.

Figure 21:
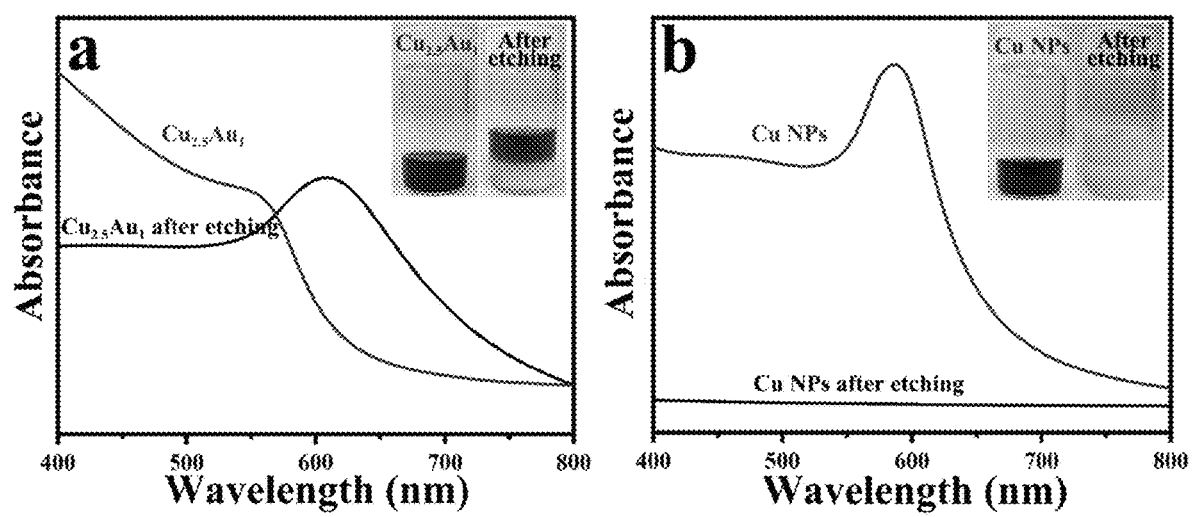

FIG. 21 shows UV-vis spectra of Cu NPs (a) and $Cu_{2.5}Au_1$ NPs (b) before and after the addition of $HNO_3$ (1.0 M) for 30 min. Insets in (a) and (b) are the corresponding photographs of $Cu_{2.5}Au_1$ NPs and Cu NPs before and after the acid etching tests. After adding 5 ml of $HNO_3$ (1.0 M) to 5 ml of NPs hexane solution, the solution was continuously shaken to fully mix for 30 min, and then allowed to stand. The solution was separated—the upper layer was the oil phase and the lower layer was the aqueous phase. For Cu NPs, after adding the $HNO_3$ for only 30 seconds, the color of colloidal solution changed from dark red to colorless, instead of the blue color of $[Cu(H_2O)_4]^{2+}$, which may be due to the coordination of Cu ions and ligand.

Figure 22:
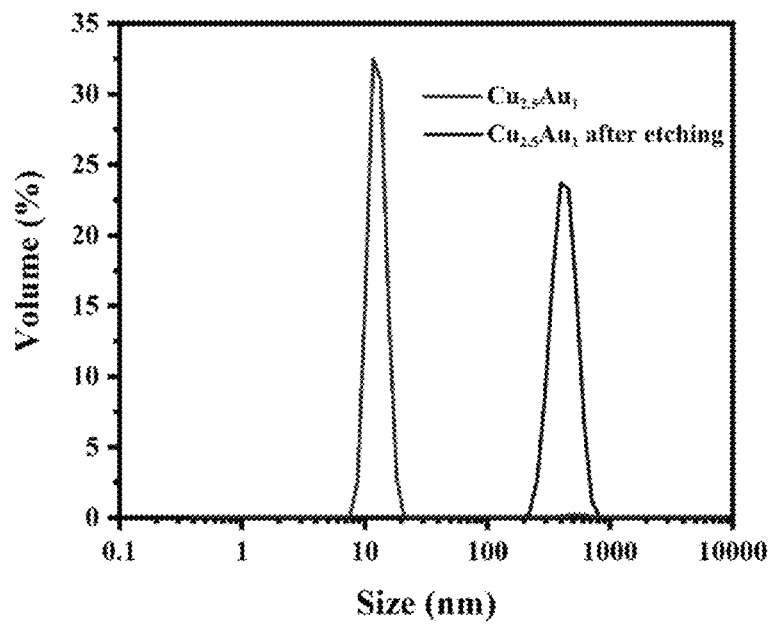

FIG. 22 shows dynamic light scattering (DLS) size analysis of $Cu_{2.5}Au_1$ NPs before and after etching test. The measured hydrodynamic diameters of NPs before and after etching test were 12.7 nm (±2.0 nm) and 427.8 nm (±96.2 nm), respectively. The obvious change in size distribution reveals the agglomeration of $Cu_{2.5}Au_1$ NPs after etching test.

Figure 23:
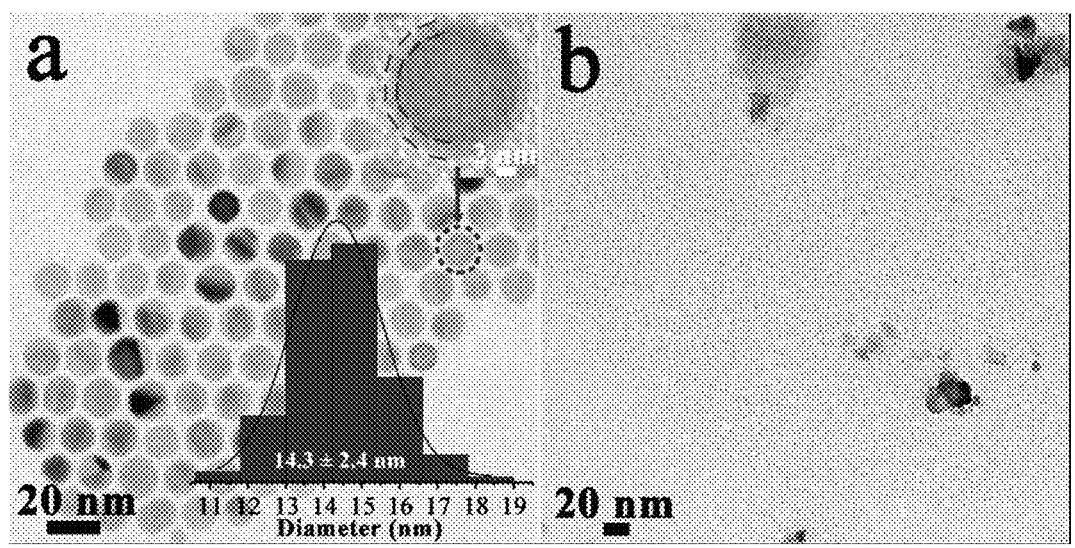

FIG. 23 shows TEM images of Cu NPs before (a) and after (b) etching with $HNO_3$ (1.0 M) for 30 min. Insets in (a) are the corresponding magnified TEM image and particle size distribution histogram of Cu NPs. The magnified TEM image reveals that the Cu NPs have been oxidized to form a $Cu_2O$ shell of about 1.1 nm. The oxidation may take place during TEM sample preparation.

Figure 24:
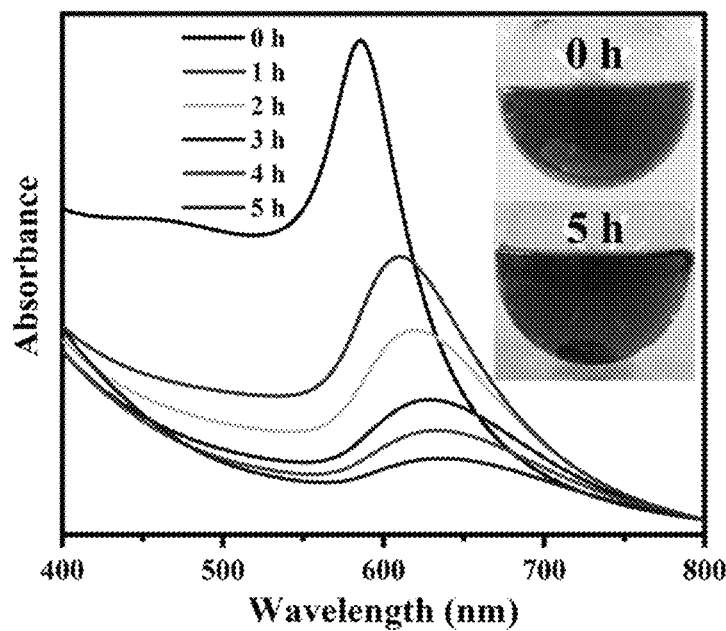

FIG. 24 shows UV-vis spectra of Cu NPs dispersed in toluene under heating at 100° C. for different time intervals. Insets are the corresponding photographs of Cu NPs before and after heating at 100° C. for 5 h, showing the color changing from dark red to dark green.

Figure 25:
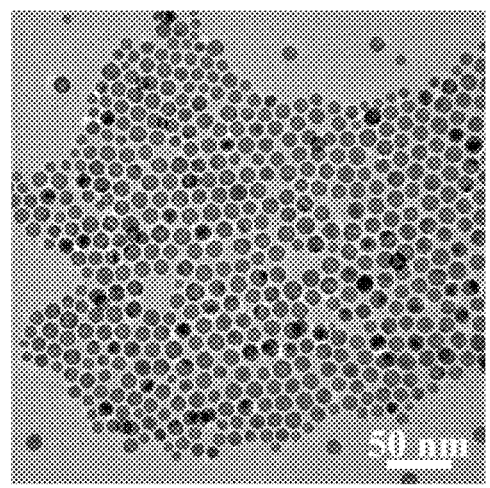

FIG. 25 shows TEM image of $Cu_{2.5}Au_1$ NPs dispersed in toluene after heating at 100° C. for 5 h.

Figure 26:
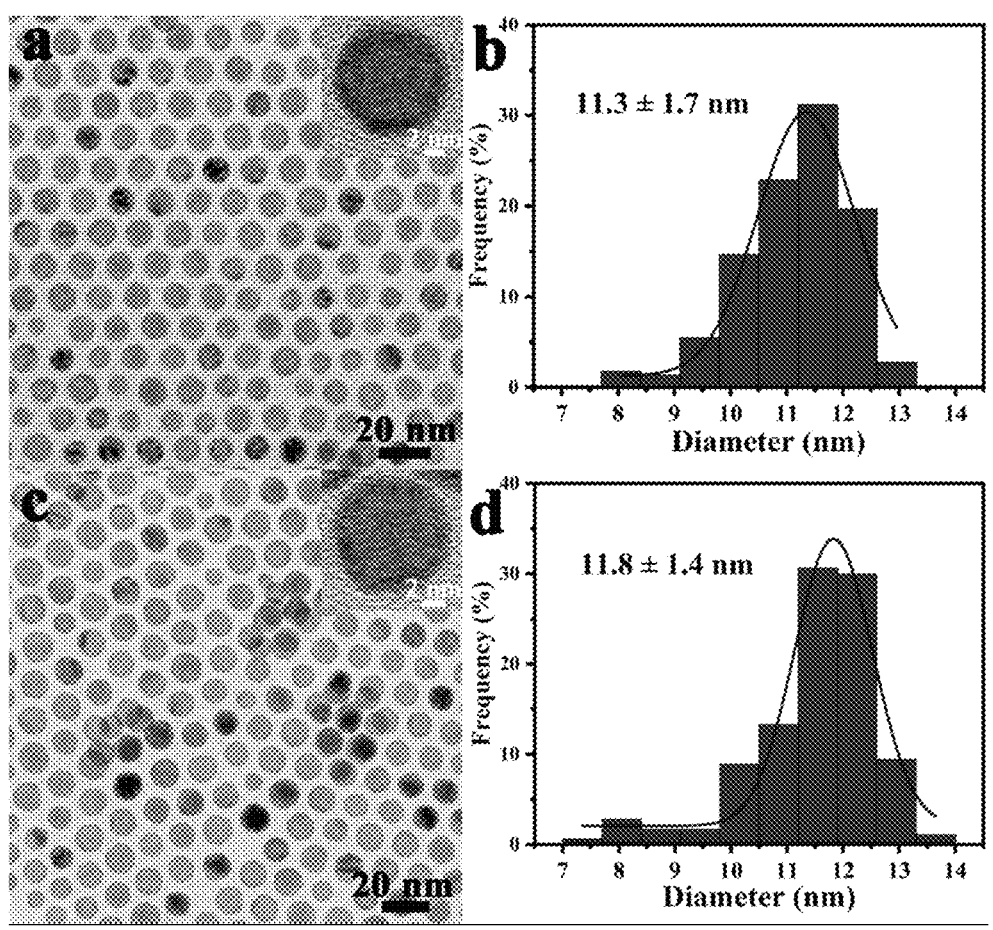

FIG. 26 shows TEM image (a) and the corresponding particle size distribution histogram (b) of $Cu_5Au_1$ NPs. TEM image (c) and the corresponding particle size distribution histogram (d) of $Cu_{10}Au_1$ NPs. Insets in (a) and (c) are the corresponding HRTEM images.

Figure 27:
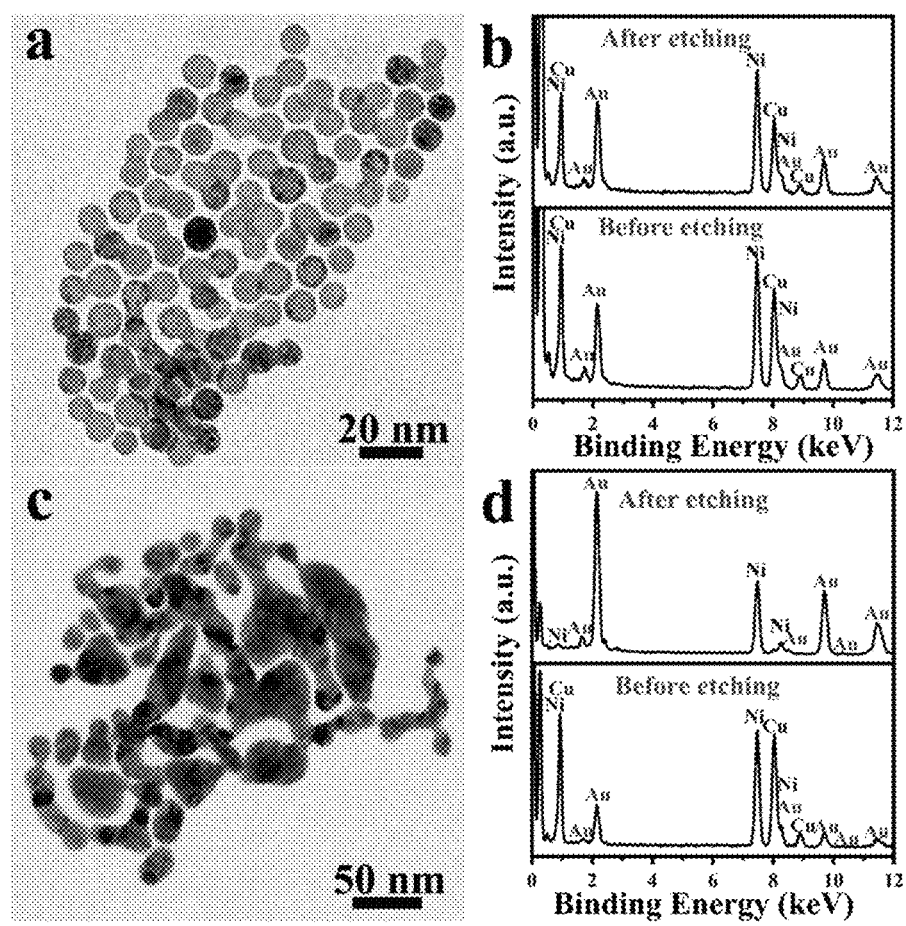

FIG. 27 shows TEM images of $Cu_5Au_1$ NPs (a) and $Cu_{10}Au_1$ NPs (c) after etching with $HNO_3$ (1.0 M) for 30 min. The corresponding EDS spectra of $Cu_5Au_1$ NPs (b) and $Cu_{10}Au_1$ NPs (d) before and after the etching tests.

Figure 28:
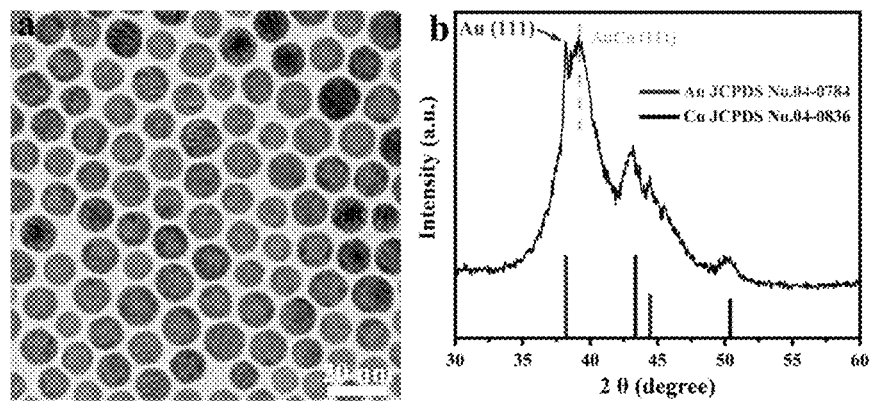

FIG. 28 shows TEM image (a) and XRD pattern (b) of $Cu_1Au_1$ core-shell NPs.

Figure 29:
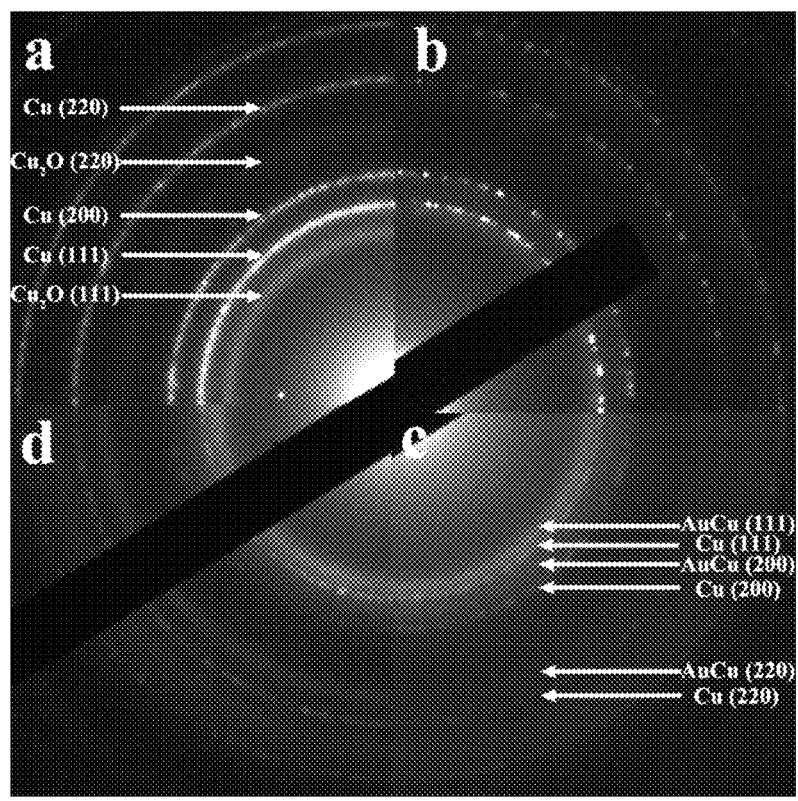

FIG. 29 shows SAED patterns of (a) Cu NPs, (b) $Cu_{10}Au_1$ NPs, (c) $Cu_5Au_1$ NPs, and (d) $Cu_{2.5}Au_1$ NPs.

Figure 30:
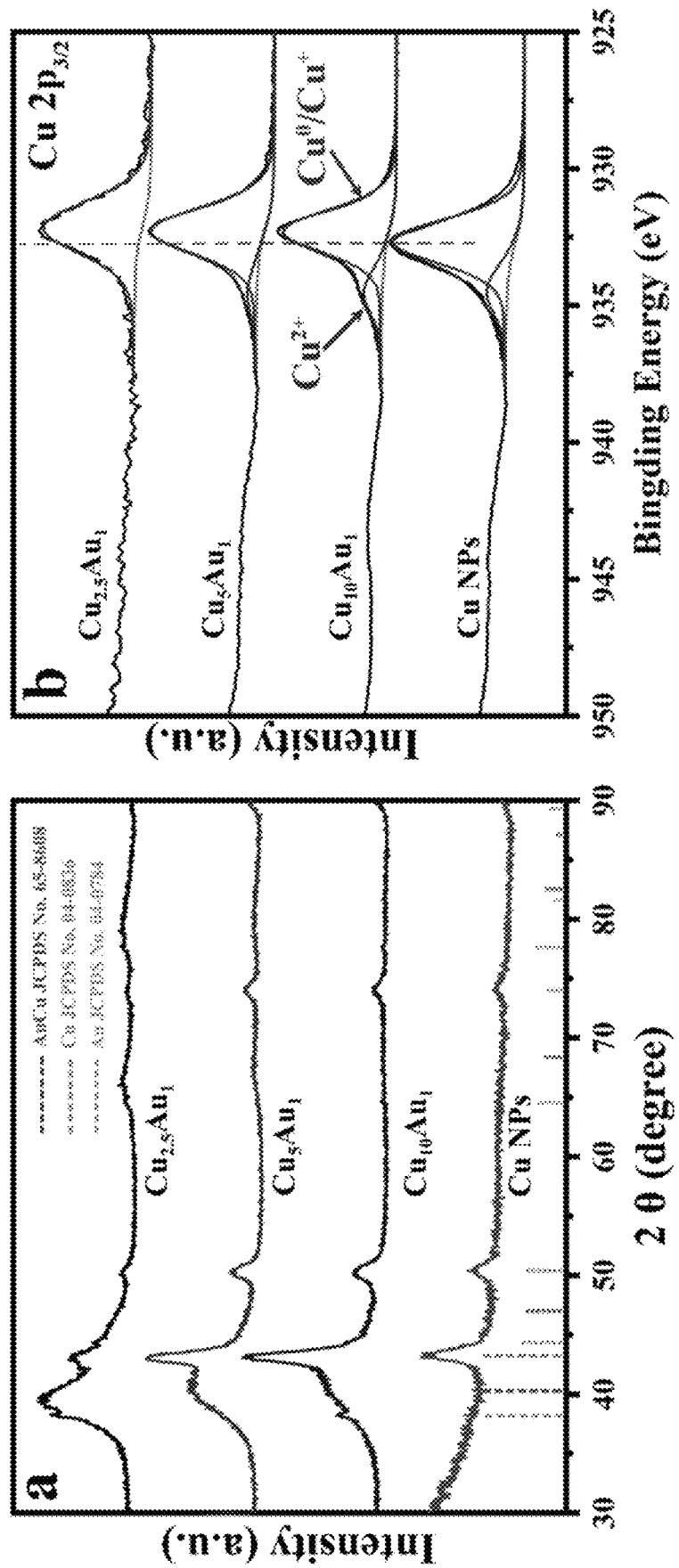

FIG. 30 shows XRD patterns (a) and Cu $2p_{3/2}$ XPS spectra (b) of Cu NPs and Cu—Au core-shell NPs synthesized with different feed ratios. The Cu $2p_{3/2}$ XPS spectra were deconvoluted into two components: the peak centered at ~932.4 eV can be assigned to the metallic Cu or $Cu_2O$ ($Cu^0$ or $Cu^+$) and the peak at ~934 eV can be attributed to $Cu^{2+}$ species. The existed $Cu^{2+}$ could be attributed to CuO and/or $Cu(OH)_2$ species when the NP surface is exposed to air.[120] However, it is difficult to differentiate $Cu^+$ and $Cu^0$ specifies by Cu $2p_{3/2}$XPS due to the overlapping of their peaks.[121-122] In addition, the peaks of Cu $2p_{3/2}$ slightly shifted toward lower binding energy with the decrease of the Cu:Au ratio in the core-shell NPs, which is probably due to the increased alloying between Cu and Au atoms.[123-124]

Figure 31:
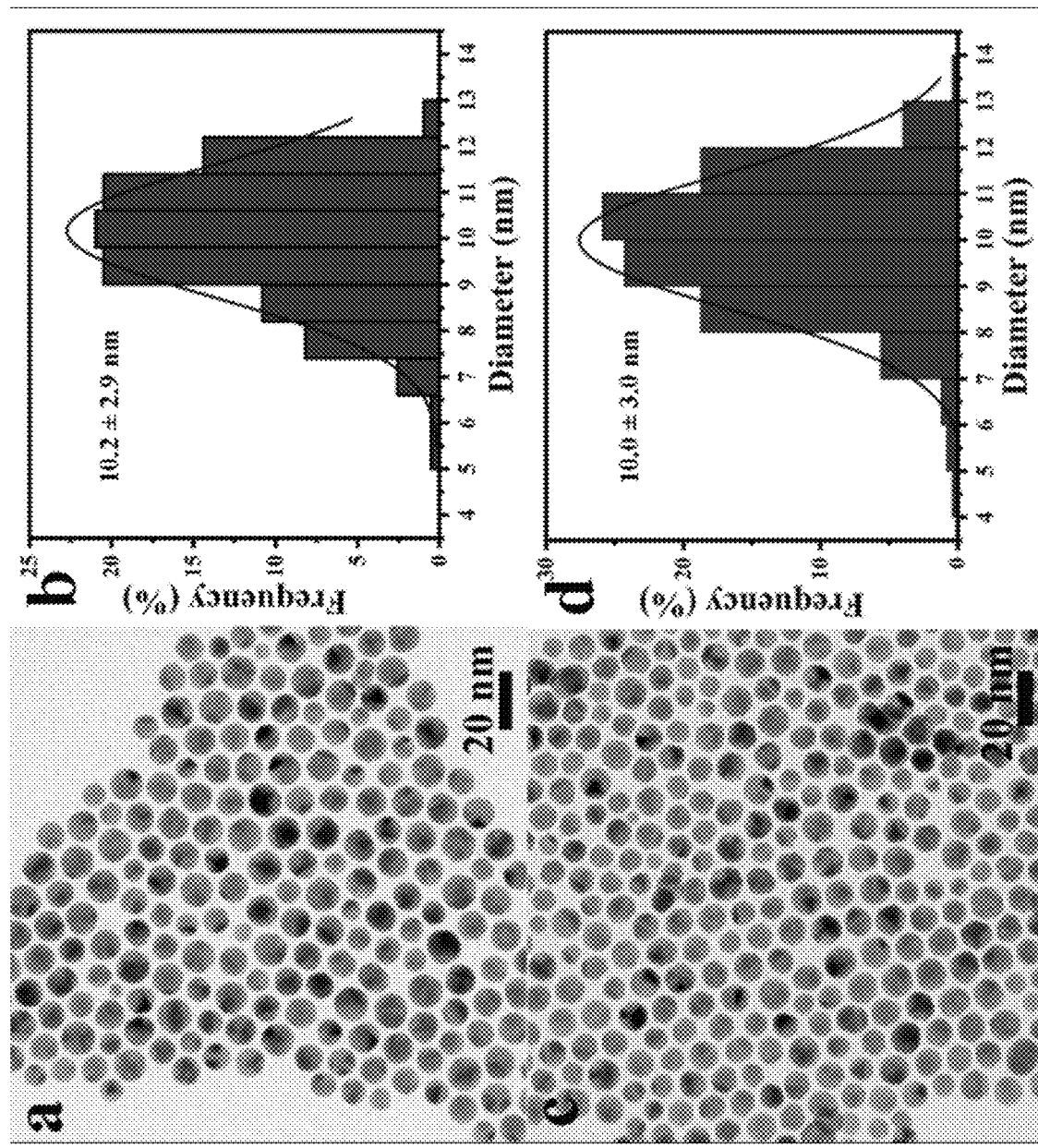

FIG. 31 shows TEM image and the corresponding size distribution histogram of Au NPs before (a and b) and after (c and d) adding the $Au^{3+}$/TOP precursor to Au NPs-in-OLA solution and reacting at 140° C. for 1 h. In the presence of Au seeds, no obvious change in the morphology and size of Au NPs was observed after the addition of $Au^{3+}$/TOP precursor, which indicates that even with the presence of Au seeds, the reduction of $Au^{3+}$/TOP precursor by OLA was not significant.

Figure 32:
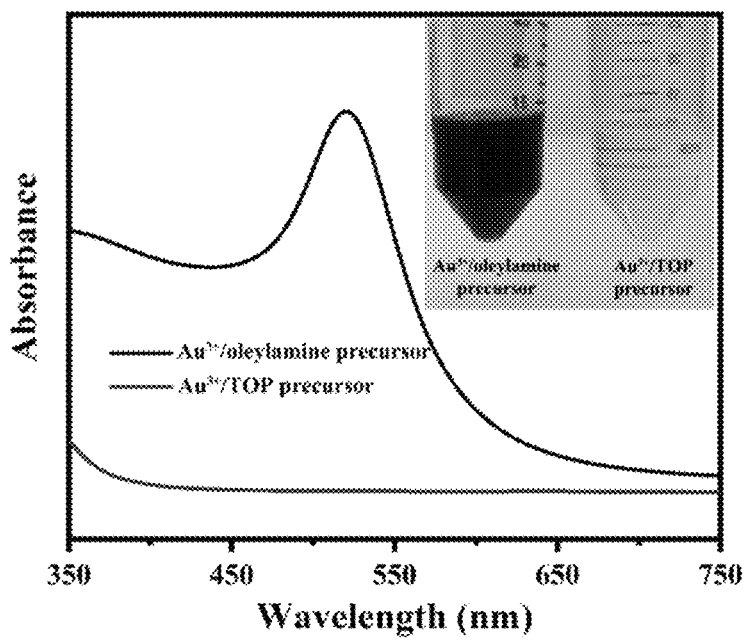

FIG. 32 shows UV-vis spectra of reaction solution after adding the $Au^{3+}$/OLA precursor or $Au^{3+}$/TOP precursor to OLA solution at 140° C. and reacting for 1 h. Insets are the corresponding photographs of solutions after reaction. It is difficult to reduce $Au^{3+}$/TOP precursor with OLA due to the strong binding of TOP to $Au^{3+}$, which greatly reduces the reduction potential according to hard and soft acids and bases theory.[125-126] In contrast, without the presence of TOP in solution, Au NPs can be synthesized under otherwise identical conditions.

Figure 33:
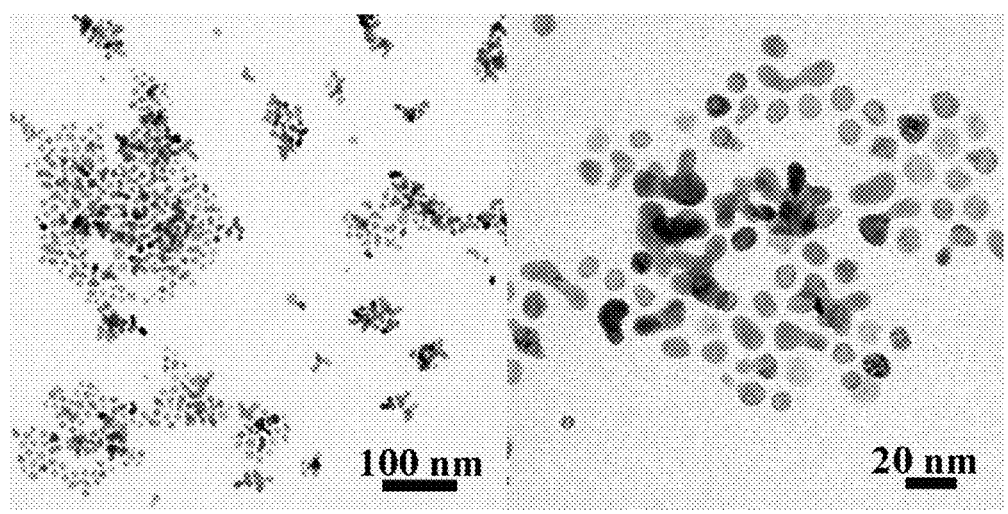

FIG. 33 shows TEM images of AuCu NPs obtained by adding the $Au^{3+}$/OLA precursor to Cu NPs/OLA solution and reacting at 140° C. for 1 h. Since OLA could easily reduce $Au^{3+}$/OLA precursor to Au NPs at 140° C., the addition of $Au^{3+}$/OLA precursor into the Cu colloid solution led to the rapid reduction and agglomeration of Au NPs along with the fast galvanic replacement reaction, and thereby a chaotic morphology.[125, 127]

Figure 34:
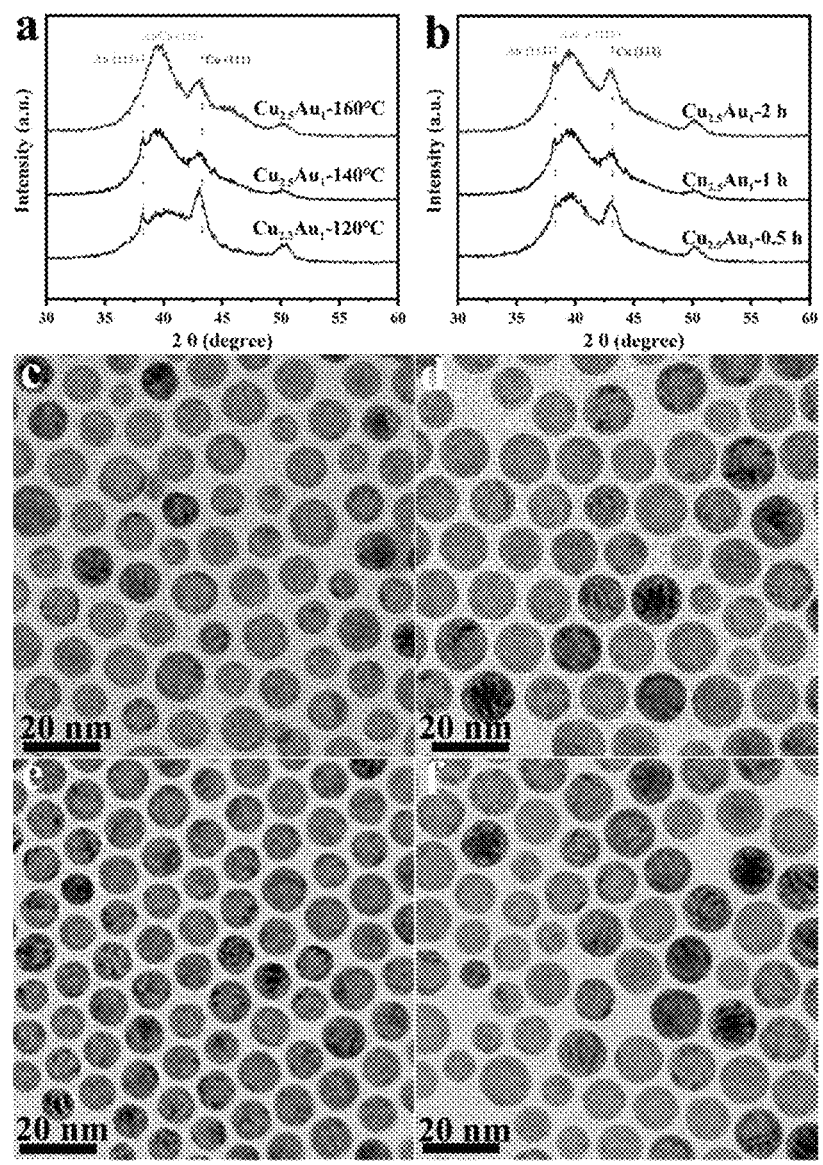

FIG. 34 shows XRD patterns of $Cu_{2.5}Au_1$ core-shell NPs obtained (a) at different reaction temperature (120, 140 and 160° C.) for 1 h and (b) for different reaction time (0.5, 1 and 2 h) at 140° C. TEM images of $Cu_{2.5}Au_1$ core-shell NPs obtained under different conditions—(c) 120° C.-1 h, (d) 160° C.-1 h, (e) 140° C.-0.5 h, and (f) 140° C.-2 h.

Figure 35:
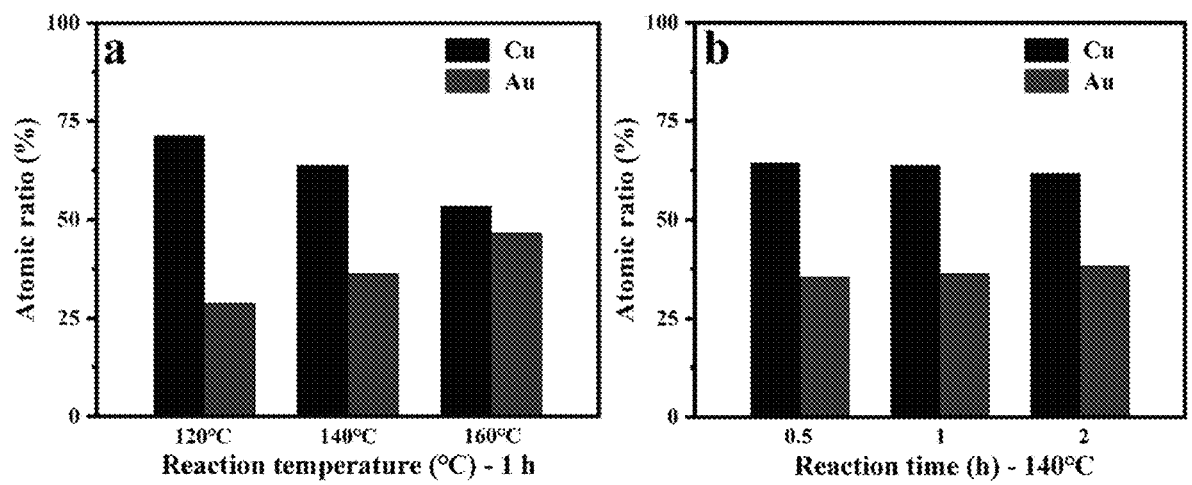

FIG. 35 shows the Cu—Au atomic ratio, obtained from EDS, of $Cu_{2.5}Au_1$ core-shell NPs synthesized under different conditions. The $Cu_{2.5}Au_1$ NPs prepared (a) at different temperature for 1 h and (b) at 140° C. for different reaction time.

Figure 36:
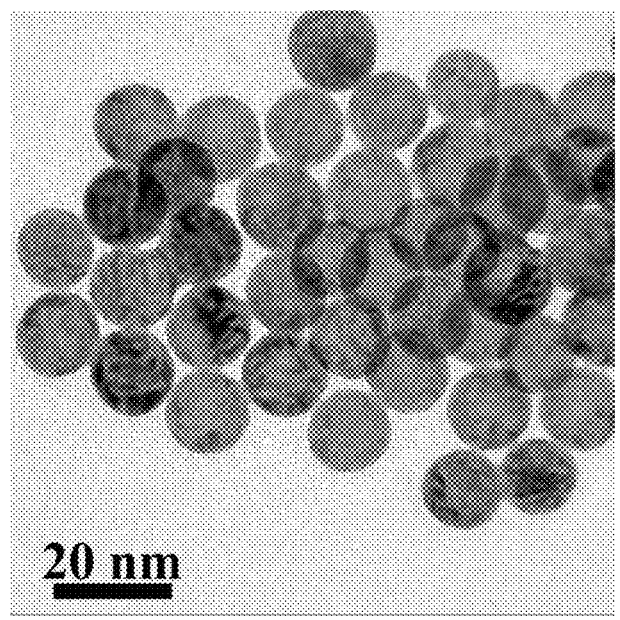

FIG. 36 shows TEM image of $Cu_{2.5}Au_1$ NPs (160° C.-1 h) after the etching test with $HNO_3$ (1.0 M) for 30 min.

Figure 37:
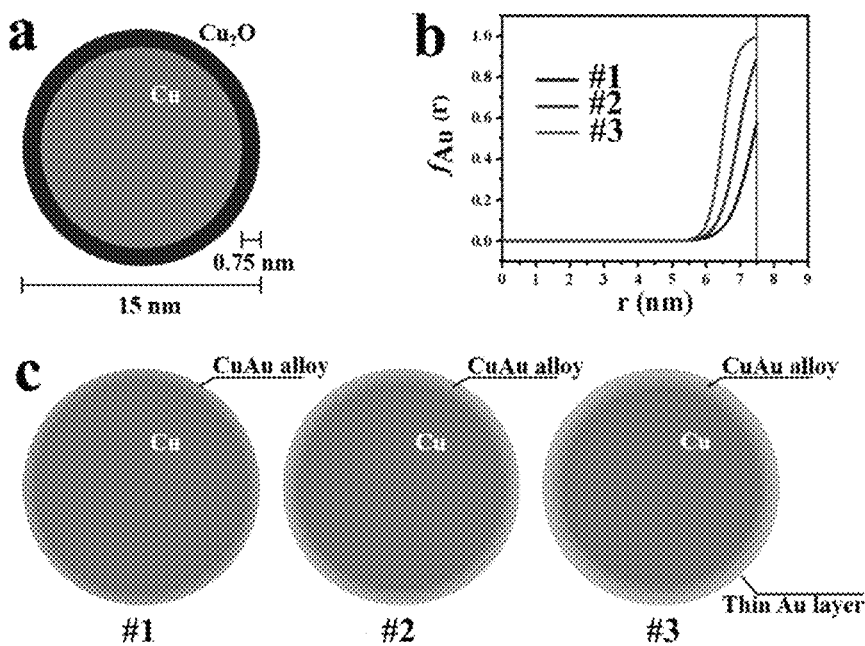

FIG. 37 shows Diagrams of the models used in the theoretical calculations, including the main features of the experimental Cu NPs and Cu—Au core-shell NPs. (a) Cu—$Cu_2O$ core-shell NP. (b) Volume concentration of Au in the Cu—Au NPs. This function was used to compute the permittivity of the NPs with the Maxwell-Garnett model. (c) Models of the Cu—Au core-shell NPs as the galvanic replacement process progresses. The local Cu—Au mixture is controlled by the data in panel b. The latter model has a thin layer of almost pure Au.

Figure 38:
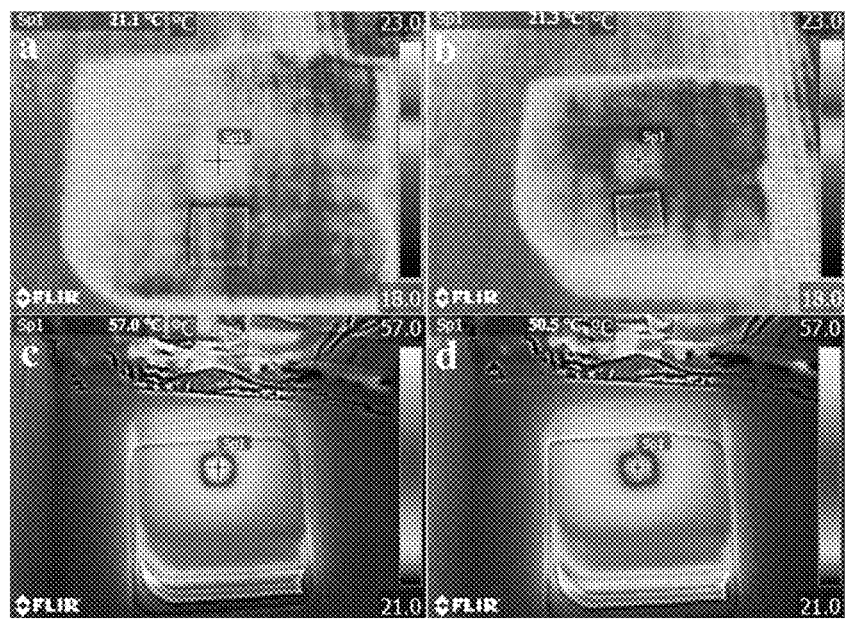

FIG. 38 shows Infrared thermal images of the dry (a and c) $Cu_{2.5}Au_1$ NPs absorber and (b and d) Au NPs absorber before and after 10 min illumination under 1 sun.

Figure 39:
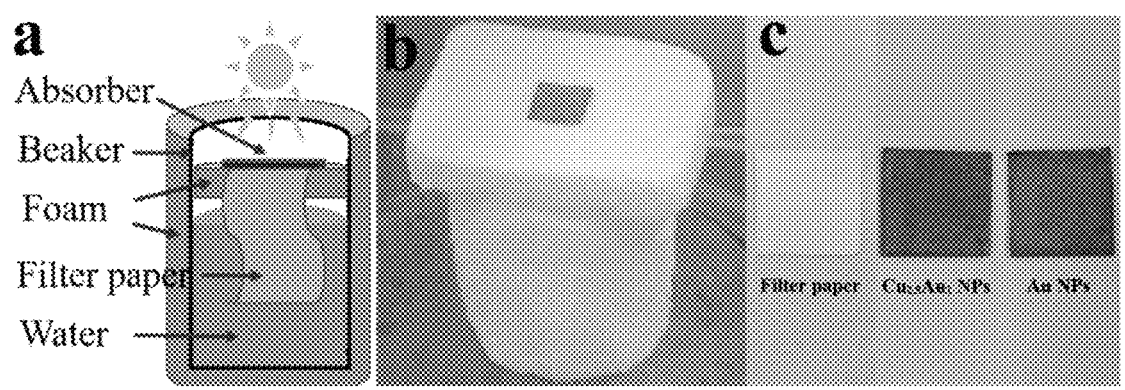

FIG. 39 shows (a) Schematic illustration and (b) photograph of solar steam generator. (c) Photographs of absorbers.

Figure 40:
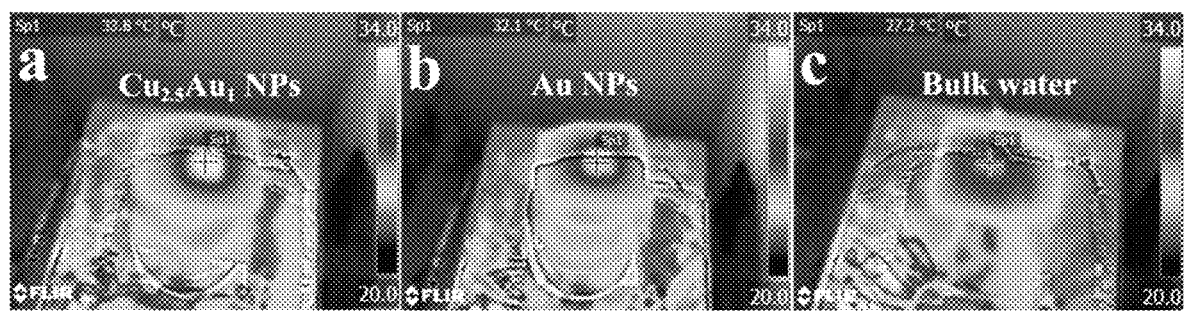

FIG. 40 shows Infrared thermal images of (a) the $Cu_{2.5}Au_1$ NPs absorber, (b) the Au NPs absorber and (c) bulk water after 60 min illumination under 1 sun.

DESCRIPTION OF VARIOUS EMBODIMENTS

I. Definitions

Unless otherwise indicated, the definitions and embodiments described in this and other sections are intended to be applicable to all embodiments and aspects of the present disclosure herein described for which they are suitable as would be understood by a person skilled in the art.

The term "and/or" as used herein means that the listed items are present, or used, individually or in combination. In effect, this term means that "at least one of" or "one or more" of the listed items is used or present. The term "and/or" with respect to pharmaceutically acceptable salts and/or solvates thereof means that the compounds of the disclosure exist as individual salts or hydrates, as well as a combination of, for example, a salt of a solvate of a compound of the disclosure.

As used in the present disclosure, the singular forms "a", "an" and "the" include plural references unless the content clearly dictates otherwise. For example, an embodiment including "a compound" should be understood to present certain aspects with one compound or two or more additional compounds.

In embodiments comprising an "additional" or "second" component, such as an additional or second compound, the second component as used herein is chemically different from the other components or first component. A "third" component is different from the other, first, and second components, and further enumerated or "additional" components are similarly different.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

The term "suitable" as used herein means that the selection of the particular compound or conditions would depend on the specific synthetic manipulation to be performed, and the identity of the molecule(s) to be transformed, but the selection would be well within the skill of a person trained in the art. All process/method steps described herein are to be conducted under conditions sufficient to provide the product shown. A person skilled in the art would understand that all reaction conditions, including, for example, reaction solvent, reaction time, reaction temperature, reaction pressure, reactant ratio and whether or not the reaction should be performed under an anhydrous or inert atmosphere, can be varied to optimize the yield of the desired product and it is within their skill to do so.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

The present description refers to a number of chemical terms and abbreviations used by those skilled in the art. Nevertheless, definitions of selected terms are provided for clarity and consistency.

The term "HCl" as used herein refers to hydrochloric acid.

The term "NP" or "NPs" and the like as used herein refers to nanoparticle(s).

The term "TEM" as used herein refers to transmission electron microscopy.

The term "HAADF-STEM" as used herein refers to high angle annular dark-field scanning TEM.

The term "EDS as used herein refers to energy-dispersive X-ray spectroscopy.

The term "HR-TEM" as used herein refers to high-resolution transmission electron microscopy.

The term "Cu seeds" or the like as used herein refers to a Cu nanoparticle.

The term "SAED" as used herein refers to selected area electron diffraction.

The term "LSPR" as used herein refers to localized surface plasmon resonance.

The term "XRD" as used herein refers to x-ray diffraction.

The term "X@Y" and the like as used herein refers to a core-shell nanoparticle, where the core comprises X and the shell comprises Y. For example, Cu@Au nanoparticle refers to a core-shell nanoparticle where the core comprises Cu and the shell comprises Au. For example, Cu@AuCu nanoparticle refers to a core-shell nanoparticle where the cure comprises Cu and the shell comprises Au and Cu, optionally an AuCu alloy.

The term "nanoparticle" as used herein refers to a nanostructure that can be of different shapes. For example, nanoparticle includes but is not limited to nanosphere, nanocube, and nanostar.

II. Nanoparticles and Uses of the Disclosure

In one aspect, The present disclosure includes a copper-based core-shell nanoparticle comprising a core comprising Cu; and
a shell comprising at least one noble metal.

In another aspect, the present disclosure includes a metal-based core-shell nanoparticle comprising
a core comprising a metal; and
a shell comprising at least one noble metal.

In some embodiments, the copper-based core-shell nanoparticle further comprises a second shell comprising the at least one noble metal.

In some embodiments, the copper-based core-shell nanoparticle further comprises a second shell consisting of the at least one noble metal.

In some embodiments, the copper-based core-shell nanoparticle further comprises a second shell comprising at least one other noble metal.

In some embodiments, the at least one noble metal and the at least one other noble metal is independently chosen from Au, Pt, Pd, and Rh. In some embodiments, the at least one noble metal and the at least one other noble metal is Au.

In some embodiments, the second shell consists of Au.

In some embodiments, the shell comprises an alloy comprising the at least one noble metal. In some embodiments, the at least one noble metal is Au, the shell comprises AuCu alloy and the copper-based nanoparticle is Cu@AuCu nanoparticle.

In some embodiments, the copper-based nanoparticle is resistant to oxidation of Cu.

In some embodiments, the copper-based nanoparticle has a diameter of about 5 nm to about 80 nm, about 10 nm to about 60 nm, about 10 nm to about 40 nm, about 10 nm to about 20 nm, about 10 nm to about 15 nm, or about 11 nm to about 13 nm. In some embodiments, the diameter of the copper-based nanoparticle is about 11 nm to about 13 nm.

In some embodiments, the core has a diameter of about 3 nm to about 78 nm, about 5 nm to about 58 nm, about 7 nm to about 38 nm, about 8 nm to about 18 nm, about 9 nm to about 10 nm. In some embodiments, the core has a diameter of about 8 nm to about 10 nm.

In some embodiments, the core has a diameter of about 3 nm to about 78 nm, about 5 nm to about 58 nm, about 6 nm to about 38 nm, about 7 nm to about 18 nm, about 7 nm to about 10 nm. In some embodiments, the core has a diameter of about 8 nm to about 9 nm.

In some embodiments, the shell has a thickness of about 1 nm to about 10 nm, or about 1.5 nm to about 2.2 nm. In some embodiments, the shell has a thickness of about 1.5 nm to about 2.2 nm.

In some embodiments, the shell has a thickness of about 1.5 nm to about 3 nm, optionally the thickness of the shell is about 1.5 nm to 2.5 nm, or about 2 nm to about 2.5 nm.

In some embodiments, the shell has ratio of Cu:noble metal of about 1:10 to about 3:1, about 1:5 to about 2.5:1, or about 1:3 to about 2.5:1. In some embodiments, the ratio of Cu:noble metal of the shell is about 1.5:1 to about 2.7:1. In some embodiments, the ratio of Cu:noble metal of the shell is at least 1:2. In some embodiments, the shell has a ratio of Cu:noble metal of about 0:1, i.e. the shell consists of the noble metal. In some embodiments, the shell consists essentially of the noble metal. In some embodiments, the shell consists of the noble metal.

In some embodiments, the copper-based core-shell nanoparticle has ratio of Cu:noble metal of about 1:1 to about 8:1, about 3:1 to about 8:1, or about 3:1 to about 6:1. In some embodiments, the copper-based core-shell nanoparticle has a ratio of Cu:nobel metal of about 1:1 to about 12:1, about 1.5:1 to about 12:1, about 1.5:1 to about 10:1, about 1.5:1 to about 7:1, about 1.5:1 to about 6:1, about 1.5:1 to about 3:1, about 2:1 to about 3:1, or about 2.5:1. In some embodiments, the copper-based core-shell nanoparticle has a ratio of Cu:nobel metal of about 1.5:1 to about 8:1. In some embodiments, the ratio of Cu:noble metal of the copper-based core-shell nanoparticle is about 3:1 to about 8:1. In some embodiments, the ratio of Cu:noble metal of the copper-based core-shell nanoparticle is about 3:1 to about 6:1.

In some embodiments, the Cu@AuCu nanoparticle has UV-Vis absorbance peak at about 530 nm to about 600 nm. In some embodiments, the Cu@AuCu nanoparticle has UV-Vis absorbance peak at about 550 nm to about 570 nm.

In some embodiments, the Cu@AuCu nanoparticle has UV-Vis absorbance peak at about 500 nm to 600 nm, about 515 to about 590 nm, about 520 nm to about 580 nm, about 530 nm to about 570 nm, about 540 nm to about 560 nm, about 540 nm to about 560 nm, or about 520 nm to about 576 nm.

In some embodiments, the copper-based core-shell nanoparticle is resistant to etching by acid. In some embodiments, the acid is chosen from $HNO_3$, HCl, $H_2CO_3$, $H_2SO_4$, acetic acid, and lactic acid.

In some embodiments, the copper-based core-shell nanoparticle has shape chosen from nanosphere, nanocube, nanostar, and a combination thereof.

In another aspect, the present disclosure includes a use of the copper-based core-shell nanoparticle of the present disclosure as plasmonic photocatalyst.

In another aspect, the present disclosure includes a use of the copper-based core-shell nanoparticle of the present disclosure in the production of hydrogen by photocatalysis.

In some embodiments, the production by hydrogen is by splitting water by photocatalysis.

In another aspect, the present disclosure includes a use of the copper-based core-shell nanoparticle of the present disclosure in conductive inks and optoelectronics.

III. Methods of the Disclosure

In another aspect, the present disclosure includes a process of forming the copper-based core-shell nanoparticle of the present disclosure comprising:
mixing a Cu nanoparticle composition comprising an amine and a noble metal composition comprising a phosphine at a temperature of about 125° C. to about 155° C. to obtain a mixture; and
cooling the mixture to obtain the copper-based core-shell nanoparticle dispersed in the amine.

In another aspect, the present disclosure includes a process of forming the copper-based core-shell nanoparticle of the present disclosure comprising
mixing a copper source and a primary amine under an inert atmosphere to obtain a mixture;
forming Cu nanoparticles by heating the mixture;
cooling the mixture;
adding a noble metal composition comprising a phosphine to obtain a core-shell composition; and
cooling the core-shell composition to obtain the copper-based core-shell nanoparticles.

In some embodiments, the inert atmosphere is selected from $N_2$, He, and Ar. In some embodiments, the inert atmosphere is $N_2$.

In some embodiments, the phosphine is trialkylphosphine. In the embodiments, the trialkylphosphine is chosen from trioctylphosphine and triphenylphosphine. In some embodiments, the phosphine is trioctylphosphine.

In some embodiments, the mixing of the Cu nanoparticle composition and the noble metal composition is at about 140° C.

In some embodiments, the Cu nanoparticle composition is a dispersion of Cu nanoparticles in the fatty amine.

In some embodiments, the process of forming the copper-based core-shell nanoparticle of the present disclosure further comprises heating the Cu nanoparticle composition at a temperature of about 80° C. to about 160° C. prior to the mixing with the noble metal composition. For example, the Cu nanoparticle composition is at a temperature of about 140° C. prior to mixing with the noble metal composition.

In some embodiments, the process of forming the copper-based core-shell nanoparticle of the present disclosure further comprises maintaining the temperature of the mixture at about 80° C. to about 160° C. for about 0.5 hour to about 3 hours. In some embodiments, the mixture is maintained at a temperature of about 140° C. for about an hour.

In some embodiments, the mixture of the Cu nanoparticle composition and the noble metal composition is cooled to about room temperature.

In some embodiments, the noble metal is selected from Au, Pt, Pd, and Rh. In some embodiments, the noble metal is Au. For example, the Au is $Au^{3+}$. In some embodiments, the Au is $HAuCl_4 \cdot 3H_2O$.

In some embodiments, the process of forming the copper-based core-shell nanoparticle of the present disclosure further comprises precipitating the copper-based core-shell nanoparticle dispersed in the amine by mixing the copper-based core-shell nanoparticle dispersed in the amine with a polar organic solvent to obtain a precipitated copper-based core-shell nanoparticle, and optionally collecting the precipitated copper-based core-shell nanoparticle by centrifugation. In some embodiments, the polar organic solvent is chosen from an alkyl alcohol and acetone. In some embodiments, the alkyl alcohol is ethanol.

In some embodiments, the process of forming the copper-based core-shell nanoparticle of the present disclosure further comprises purification of the copper-based core-shell nanoparticle by one or more redispersion-reprecipitation cycles using hexanes and acetone.

In another aspect, the present disclosure includes a process of forming a Cu nanoparticle comprising
mixing a Cu source and an amine at a temperature of about 200° C. to about 270° C. under an inert atmosphere to obtain a mixture; and
cooling the mixture to form the Cu nanoparticle dispersed in the amine.

In some embodiments, the amine is a primary amine. In some embodiments, the amine is an alkyl amine. For example, the alkyl amine is a fatty amine. In some embodiments, the fatty amine is chosen from oleylamine, decylamine, octylamine, hexadecylamine and dodecylamine. In some embodiments, the amine is oleyamine.

In some embodiments, the Cu source is chosen from a $Cu^+$ source, a $Cu^{2+}$ source and a combination thereof. In some embodiments, the Cu source is a $Cu^{2+}$ source.

In some embodiments, the Cu source is chosen from $Cu(acac)_2$, CuBr, $Cu(CH_3COO)_2$, $CuCl_2$, $Cu(NO_3)_2$, CuI, $CuBr_2$, and $CuSO_4$. In some embodiments, the Cu source is $Cu(acac)_2$.

In some embodiments, the process of forming a Cu nanoparticle of the present disclosure further comprises maintaining the temperature of the mixture of the Cu source and the amine at about 200° C. to about 270° C. for about 1 hour to about 6 hours. In some embodiments, the mixture is maintained at a temperature of about 230° C. for about 3 hours.

In some embodiments, the mixing of the Cu source and the amine is at about 230° C.

In some embodiments, the process of forming a Cu nanoparticle of the present disclosure further comprises precipitating the Cu nanoparticle dispersed in the amine by mixing the Cu nanoparticle dispersed in the amine with an alkyl alcohol to obtain precipitated Cu nanoparticles and optionally collecting the precipitated Cu nanoparticles by centrifugation.

In some embodiments, the process of forming a Cu nanoparticle of the present disclosure further comprises purifying the Cu nanoparticle by one or more redispersion-reprecipitation cycles in hexanes and ethanol to obtain purified Cu nanoparticles, and optionally collecting the purified Cu nanoparticles by centrifugation.

In some embodiments, the core in the process of forming a copper-based core-shell nanoparticle of the present disclosure is the Cu nanoparticle formed by a process of forming a Cu nanoparticle of the present disclosure.

IV. Examples

Example 1 Materials and General Methodology

Characterisation of Nanoparticles

The microstructure and composition of the Cu@AuCu core-shell nanoparticles were investigated by a transmission electron microscope (TEM, JEOL™ 2100F, operated at 200 kV), equipped with an energy-dispersive X-ray (EDX) spectrometer. High angle annular dark field-scanning transmission electron microscopy (HAADF-STEM) images and Energy dispersive x-ray (EDX) elemental mapping was performed using FEI-Talos™ microscope at an accelerating voltage of 200 KV. The crystal structures of all the samples were analyzed by the x-ray diffraction instrument (XRD, Panalytical X'Pert™ MRD) with a Cu Kα radiation source ($\lambda=0.1542$ nm) operated at 45 kV and 40 mA. XPS was taken by using a VG Escalab™ 220i-XL equipped with a twin-anode (Mg/Al) source. To correct for charging, the binding energies (BE) were referred to the C1 s peak at 284.6 eV. The UV-vis-NIR absorption spectra of samples were measured using a Varian Cary™ 5000 scan spectrometer.

Formation of Cu@Noble Metal-Cu Core-Shell Nanoparticle

Figure 1:
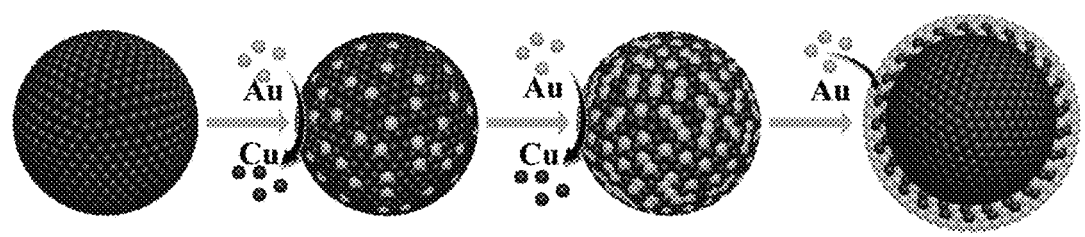

The preparation of the plasmonic Cu@noble metal-Cu core-shell NPs is mainly divided into two steps as described in the exemplary syntheses below: (i) the preparation of the Cu nanoparticles and (ii) the uniform galvanic replacement and growth of noble metal-Cu shell, which is shown in FIG. 1 using Au as an example. The Cu nanoparticles are synthesised by the thermal decomposition of Cu such as $Cu(acac)_2$ in an organic amine such as oleylamine, which not only as a stabilizing agent but also a weak reducing agent. Then, ultrathin noble metal-Cu shell growths on the surface of plasmonic Cu nanoparticle by slow galvanic displacement process. The thickness of noble metal-Cu shell can be regulated by adjusting the amount of noble metal precursor. The thicker the shell, the higher the noble metal content in the shell. Without wishing to be bound by theory, when the shell is overgrown, the Cu@noble metal-Cu@noble metal core-shell structure may be formed due to the limitation of $Cu^0$ dissolution. The formation of noble metal-Cu shell can effectively inhibit the oxidation of Cu core and maintain its plasmonic optical properties.

This general nanoparticle formation scheme is illustrated with the formation of Cu@AuCu core-shell nanoparticle as described below.

Example 2 Synthesis of Cu Nanoparticles

In a typical synthesis, 0.125 mmol Cu(acac)$_2$ and 10 mL of oleylamine were added in a 100 mL three-necked flask. Under a nitrogen atmosphere, the solution was slowly heated to 230° C. and was kept at this temperature for 3 h, producing a dark red colloidal solution. Then, the solution was cooled rapidly to room temperature by using a cold water bath. The obtained Cu NPs were purified by precipitation with addition of 20 mL of ethanol followed by centrifugation at 8000 rpm for 10 min and washed two times with hexane and ethanol using redispersion-precipitation cycles. Finally, the isolated solid was dispersed in hexane.

Example 3 Synthesis of Cu@AuCu Core-Shell Nanoparticles

Cu@AuCu core-shell nanoparticles of different Cu:Au ratio were synthesized according to the exemplary method below.

First, Cu nanoparticles were synthesized according to Example 2 described above. After the Cu seeds generated, the dark red colloidal solution was cooled to 140° C. A trioctylphsophine (TOP) solution of HAuCl$_4$.3H$_2$O (12.5-50 mM, 1 mL) was injected using a syringe and the mixing solution became crimson. After reacted at 140° C. for 1 h under flowing nitrogen, the solution was cooled rapidly to room temperature by using a cold water bath. The Cu@AuCu core-shell NPs were collected by precipitation with addition of 20 mL of ethanol followed by centrifugation at 8000 rpm for 10 min and washed two times with hexane and acetone using redispersion-precipitation cycles. Finally, the isolated solid was dispersed in hexane. The yielded Cu@AuCu core-shell NPs are named according to the feed ratio of Cu to Au, namely Cu@AuCu (5:2) NPs, Cu@AuCu (5:1) NPs, and Cu@AuCu (10:1) NPs.

Example 4 Characterization of Cu@AuCu Core-Shell Nanoparticles

Figure 2:
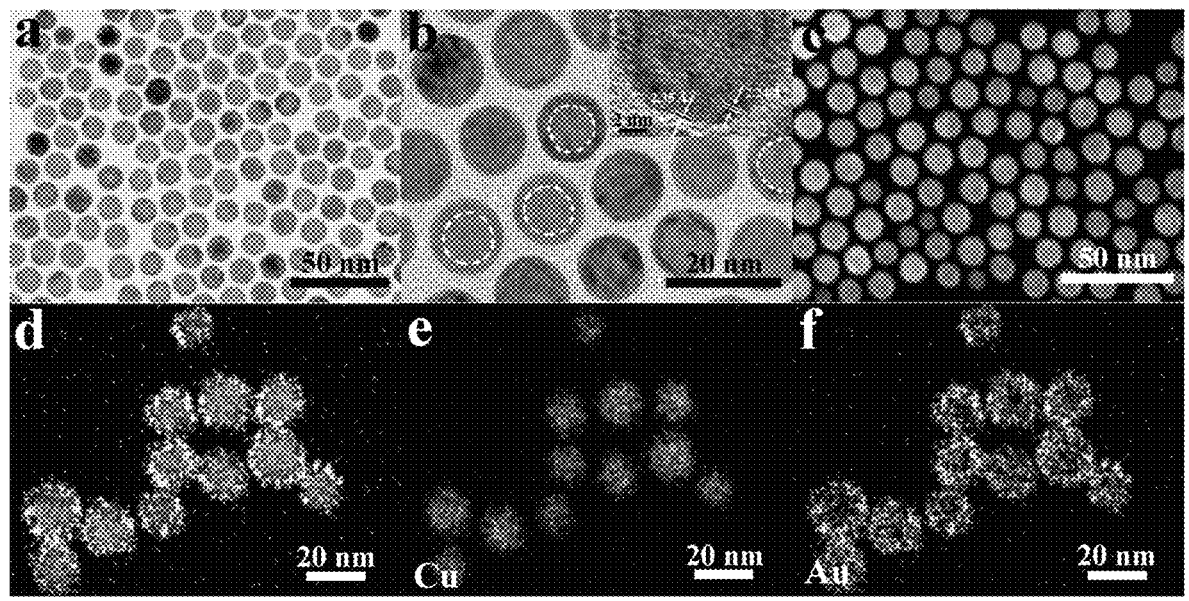

The morphology and structure of Cu@AuCu (5:2) or Cu$_5$Au$_2$ NPs were investigated by TEM (FIG. 2). As shown in FIG. 2a, the as-prepared Cu@AuCu (5:2) NPs are in high purity with a uniform size of 13.1±2.0 nm in diameter. Due to the different atomic number and the attenuation of electrons, significant contrast differences can be observed between the Au core and the AuCu shell. In the enlarged TEM image (FIG. 2b), the distinguishable Cu core (denoted by white dashed circles) are well coated by AuCu shell. The core size and shell thickness are measured to be ~8.6 and ~2.2 nm, respectively. HR-TEM image (inset in FIG. 2b) reveals the structure of the shell, and the lattice spacing of 2.35 Å can be assigned to the (111) planes of face-centered cubic (fcc) Au, while the lattice spacing of 2.24 Å can be assigned to the (111) planes of fcc AuCu alloy. Without wishing to be bound by theory, this indicates that excessive Au$^{3+}$ may form a thin pure Au shell. Furthermore, high angle annular dark-field scanning TEM (HAADF-STEM) was used to resolve the Cu nanoparticle core due to the atomic number of Cu being smaller relative to Au (FIG. 2c). The difference in the brightness of the core and shell of the Cu@AuCu (5:2) NPs is consistent with the TEM results. The brighter contrast on the edges of the NPs suggesting the local enrichment of Au atoms. The distributions of Cu and Au in the nanoparticles were also characterized by EDS mapping (FIG. 2d-f). The clearly observed large difference in composition between the center (Cu, dark grey color) and the outer (Au, light grey color) confirmed the nanoparticles are core-shell structure. The results also show that Cu and Au are well overlapped in the shells. The results indicate that closer the position is to the edge of nanoparticle, the higher the ratio of Au would be. This suggests the composition of shell is AuCu alloy with pure Au at the external surface.

Figure 3:
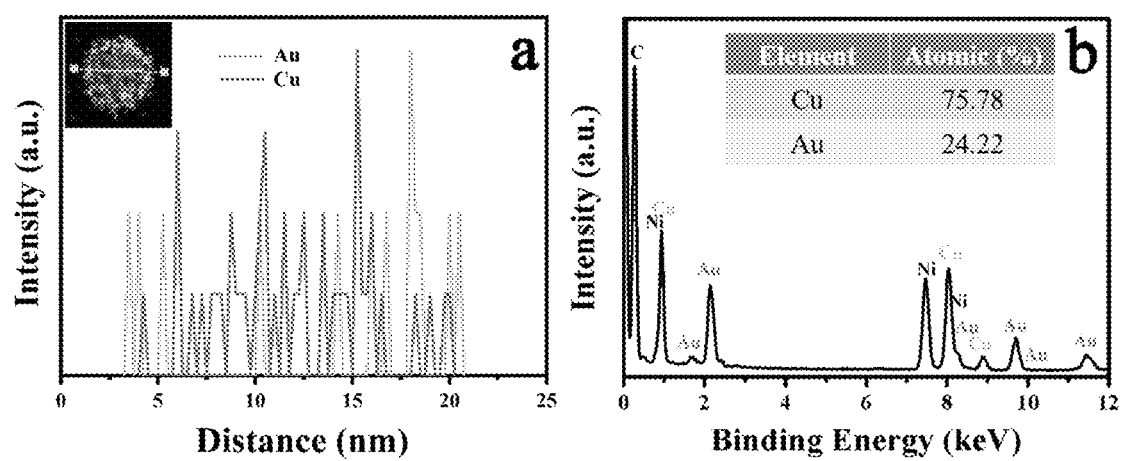

EDS line-scan analysis performed in the scanning TEM (STEM) mode on an individual Cu@AuCu (5:2) nanoparticle clearly indicate that more Cu atoms exist at the center while Au atoms show a higher signal at the edge, which also reveal the core-shell structure (FIG. 3a). In addition, the EDS line-scanning profile shows that the signal from both Cu and Au at the shell region and the outermost shell is pure Au, indicating the shell is composed of AuCu alloy and Au, consistent with the HR-TEM results. The elemental composition ratio of Cu@AuCu (5:2) NPs is Cu:Au≈76:24 via quantitative analysis of the EDS spectra (FIG. 3b). Compared to the feeding molar ration of the metal precursors (Cu:Au=5:2), the Au content in the Cu@AuCu (5:2) NPs is slightly lower. Without wishing to be bound by theory, the reason may be incomplete consumption of Au precursor. The formation of the Au shell on the surface of the Cu NPs could further inhibit the replacement of the Cu atoms by the Au ions.

Figure 4:
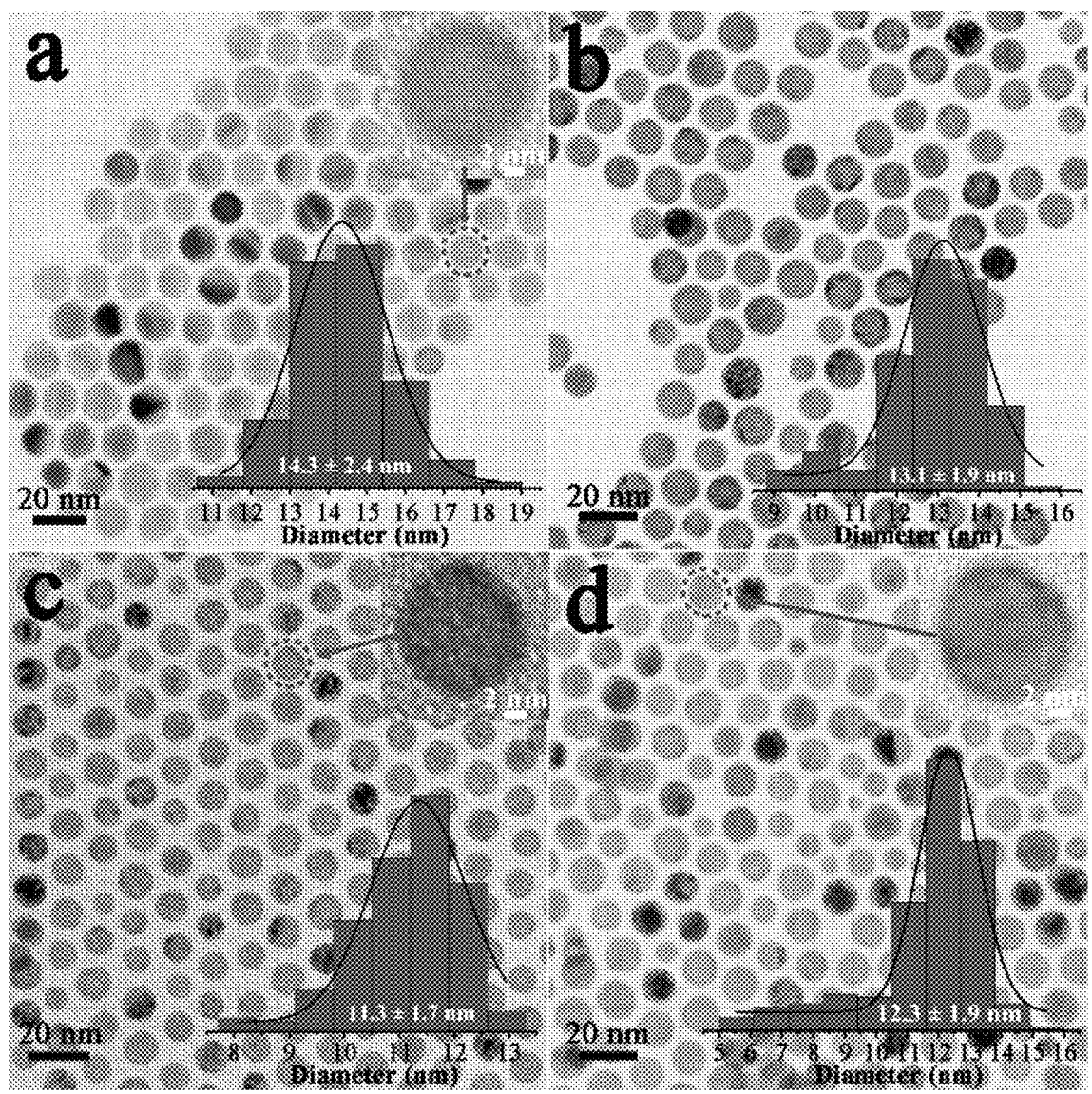
FIG. 4 shows exemplary TEM images of Cu nanoparticles (panel a), Cu@AuCu (5:2) nanoparticles (panel b), Cu@AuCu (5:1) nanoparticles (panel c), and Cu@AuCu (10:1) nanoparticles (panel d). Inset in each panel represents the corresponding histogram of nanoparticle size distribution.

Cu—Au core-shell NPs with different shell thickness can be synthesized by controlling the amount of Au precursor added into the reaction solution. FIG. 4 shows TEM images of pure Cu NPs and Cu@AuCu core-shell NPs with different feed ratio of Au precursor. The pure Cu NPs have a mean diameter of 14.3±2.4 nm according to the TEM analysis (FIG. 4a). The corresponding magnified TEM image revealed that the Cu NPs have been oxidized to form a Cu$_2$O shell of about 1.1 nm, which can be formed during TEM sample preparation. (15) Subsequently, the Cu NPs were coated with an AuCu shell by adding HAuCl$_4$/TOP to the Cu colloid at 140° C. As shown in FIG. 4b-d, the average sizes of Cu@AuCu (5:2) NPs, Cu@AuCu (5:1) (Cu$_5$Au$_1$) NPs and Cu@AuCu (10:1) (Cu$_{10}$Au$_1$) NPs are 13.1±2.0 nm, 11.3±1.8 nm and 12.3±1.9 nm, respectively. The size of Cu@AuCu core-shell NPs is slightly smaller than pure Cu NPs due to the AuCu shell is obtained by galvanic displacement reaction. The atomic ratio of Cu to Au has been measured by EDS mounted on TEM. For Cu@AuCu (5:2) NPs, Cu@AuCu (5:1) NPs and Cu@AuCu (10:1) NPs, the atomic ratio is measured to be approximately 1.8:1, 3.9:1, and 8.2:1. For Cu@AuCu (5:2) NPs, the gold content in a large number of particles is higher than the typical single particle is due to the presence of small size nanoparticles. The thickness of the AuCu shell estimated to a few atomic layers on average according to the amount of Au precursor added into the reaction system, prevents the complete characterization. As shown in FIGS. 2b and 4b-d, the thinness of the shell of Cu@AuCu (5:2) NPs, Cu@AuCu (5:1) NPs and Cu@AuCu (10:1) NPs are roughly ~2.2 nm, ~2.0 nm and ~1.4 nm. The ratios of Cu to Au in the shells are ~3:7, ~1:1, and ~7:3, respectively, based on the results of TEM and XPS. (Table 1) This further suggests the shell composition of Cu@AuCu core-shell NPs is not pure Au, but AuCu alloy or AuCu alloy-Au. Without wishing to be bound by theory, in the case of Cu—Au core-shell NPs, controlling the rate of galvanic displacement may be important due to the fact that the growth of shell is likely achieved by displacement of Cu by Au$^{3+}$. Reducing the rate of displacement reactions can facilitate uniform growth of the shell and inhibits the Kirkendall effect. (20) Thus, TOP was choosing as the ligand to dissolve the Au precursor. In this reaction, TOP strongly binds to the Au cation and reduce the reduction kinetics of $Au^{3+}$ to Au NSs. Generally, the $Au^{3+}$ can be easily reduced to Au nanoparticles by oleylamine at 140° C. However, it's hard to reduce the $Au^{3+}$ of $HAuCl_4$/TOP by oleylamine under the same conditions. (21) Therefore, the composition of the shell is closely related to the amount of Au precursor.

TABLE 1

Ratio of Cu and Au in the shell of Cu core-shell nanoparticles

| Sample | Cu (atomic %) | Au (atomic %) |
|---|---|---|
| $Cu_5Au_2$ | 30.6% | 69.4% |
| $Cu_5Au_1$ | 51.8% | 48.2% |
| $Cu_{10}Au_1$ | 76.9% | 23.1% |

Figure 5:
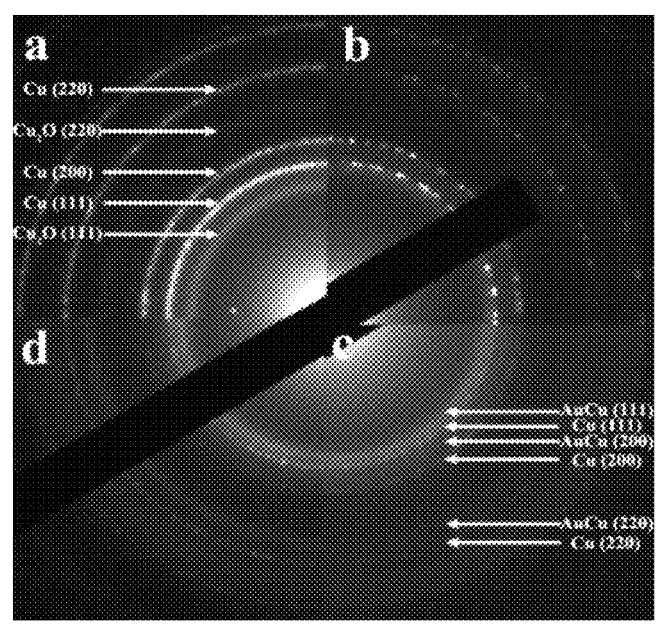
FIG. 5 shows the SAED pattern of Cu nanoparticles (panel a), Cu@AuCu (10:1) nanoparticles (panel b), Cu@AuCu (5:1) nanoparticles (panel c), and Cu@AuCu (5:2) nanoparticles (panel d).

The selected area electron diffraction (SAED) patterns of Cu NPs and Cu@AuCu core-shell NPs with different molar ratios are shown in FIG. 5. The ring diffraction patterns indicated the polycrystalline nature of Cu NPs and Cu@AuCu core-shell NPs with different molar ratios. In the case of Cu NPs, the SAED rings could be assigned to the (111), (200), and (220) planes of the fcc Cu phase and the (111) and (220) planes of the $Cu_2O$ phase (FIG. 5a). This suggests that the Cu NPs have been partially oxidized to $Cu_2O$ and the structure should be $Cu@Cu_2O$ core-shell. As described in the TEM section, oxidation can take place during the sample preparation process. However, there is no $Cu_2O$ phase appeared in the SAED patterns of Cu@AuCu core-shell NPs with different molar ratios. (FIG. 5c-d) But the SAED patterns of Cu@AuCu (10:1) NPs, Cu@AuCu (5:1) NPs, and (d) Cu@AuCu (5:2) NPs also exhibit mixed diffraction rings that can be indexed to Cu NPs and AuCu alloys with a fcc structure. In addition, as the proportion of Au increases, the diffraction ring of the AuCu alloy becomes clearer and broader, and the diffraction ring of Cu becomes weaker. This indicates that the shell is gradually thickened (as inferred from the TEM images) and prevents penetration of the electron beam to the Cu core. (22) In addition, for the Cu@AuCu (5:2) NPs, since the Au (111) and AuCu (111) are close to each other, the ultra-thin Au shell can also broaden the diffraction ring of AuCu (111), which was indeed observed in the SAED pattern.

Figure 6:
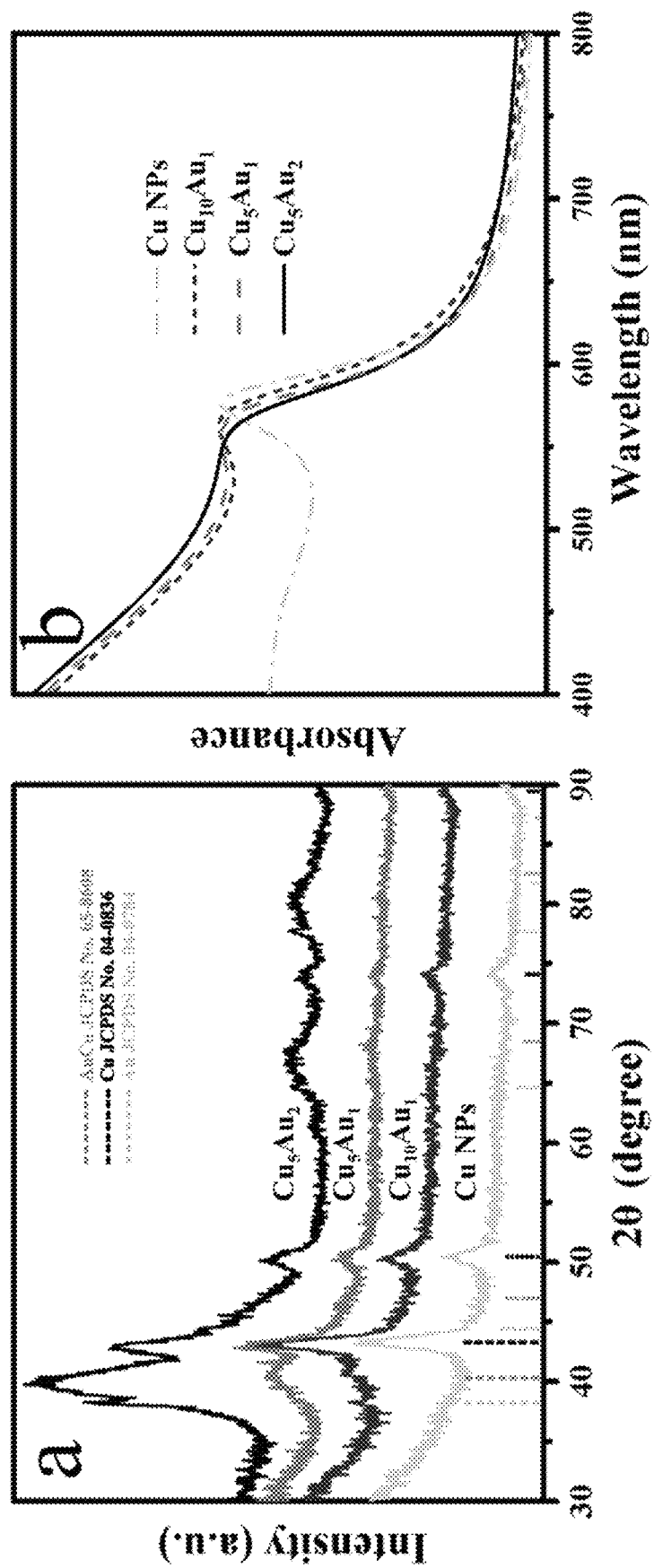
FIG. 6 shows the XRD patterns in panel a and UV-Vis spectra in panel b of Cu nanoparticles, Au nanoparticles, and Cu@AuCu nanoparticles.

The structural differences among Cu NPs and Cu@AuCu core-shell NPs with different molar ratios were characterized by PXRD analysis. As shown in FIG. 6a, the Cu NPs shows three main diffraction peaks of [111], [200], and [220] which is assigned to the fcc Cu (JCPDS 04-0836). However, unlike the result of SAED, there is no detectable diffraction peaks of $Cu_2O$, which may be due to a very thin surface layer of $Cu_2O$ on the Cu NPs. (22) For the Cu@AuCu core-shell structure, there is a distinct peak located at about 40°, which is assigned to AuCu alloy (JCPDS 65-8608). These results confirm the formation of AuCu alloy in the shell. In the XRD pattern of Cu@AuCu (10:1) NPs with thinner shell layers, the peaks of Au and AuCu alloy are very weak compare to Cu. With the increase of the shell thickness, the diffraction peak of AuCu alloy is more pronounced, and the diffraction peak of the monometallic Au is also more pronounced. In addition, the peaks of AuCu alloy shift to lower angle positions as the shells become thicker, indicating that the shell is doped with more Au atoms. UV-Vis spectroscopy was applied to explore the optical properties of Cu NPs and Cu@AuCu core-shell NPs with different molar ratios. As shown in FIG. 6b, the UV-vis spectra of freshly prepared Cu NPs show a broad band at λ=576 nm corresponding to the LSPR of Cu. Generally, Cu NPs show a strong photoabsorption of visible light due to their surface plasmon that displays maxima at approx. 530 and 580 nm. (25) The UV-vis spectra of Cu@AuCu core-shell NPs with different molar ratios show that the LSPR peaks exhibits a continuous blue shift from 574 nm for Cu NPs to 520 nm expected for the Au NPs as the shell thickness increases, which was correlated with the increasing proportion of Au. Due to the contribution of the Cu cores to the major LSPR band position of Cu@AuCu core-shell NPs is obvious, the LSPR property of Cu cores remains despite the presence of alloy shell, but the band position is tuned by the shell composition and thickness. (25 to 27)

Figure 7:
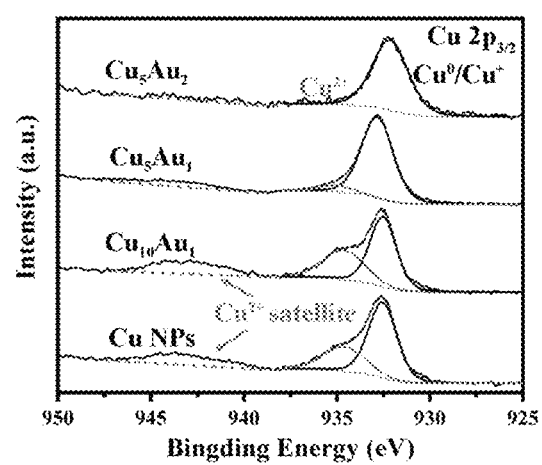
FIG. 7 shows Cu $2p_{3/2}$ XPS spectra of the Cu nanoparticles and Cu@AuCu nanoparticles with different molar ratios.

An XPS analysis was also performed to investigate the chemical state of Cu NPs and Cu@AuCu core-shell NPs with different molar ratios. As shown in FIG. 7, the peaks of Cu $2p_{3/2}$ electron core level are deconvoluted into two components: the peaks centered at ~932.4 eV can be assigned to the metallic Cu or $Cu_2O$ ($Cu^0$ or Cu+) and the peaks at ~934 eV can be attributed to $Cu^{2+}$ species. The existence of $Cu^{2+}$ can be further confirmed due to the presence of a broad satellite peak centered at around 943 eV. (28) However, it's difficult to differentiate $Cu^+$ and $Cu^0$ by the XPS feature of Cu $2p_{3/2}$ due to their binding energies are overlap. (29, 30) Combined with the characterization results of XRD, SAED, and TEM, without wishing to be bound by theory, it seems that as the Au content in the bimetallic shell increases, the $Cu^0$ content in the samples gradually increases. In addition, the binding energy shifts of Cu $2p_{3/2}$ for Cu NPs and Cu@AuCu core-shell NPs with different molar ratios were probably due to the alloy trend between Cu and Au nanoparticles or other factors such as the chemical state of surface elements. (28, 31)

Example 5 Antioxidant Stability of Cu@AuCu Core-Shell Nanoparticles

The antioxidant stability of the Cu@AuCu core-shell NPs was investigated. Here, the Cu@AuCu (5:2) NPs was chosen as an exemplary sample to compare with Cu NPs. As showed in FIG. 8, the antioxidant stability of Cu NPs and Cu@AuCu (5:2) NPs were compared by heating their colloidal toluene solution at 100° C. Color change is a direct evidence of Cu oxidation. For Cu NPs, the color changed from dark red to dark green after heating at 100° C. for 5 h, which suggest the Cu NPs were gradually oxidized to be $Cu@Cu_2O$ NPs (inset in FIG. 8a). However, no change in the color of Cu@AuCu (5:2) NPs was observed (inset in FIG. 8b). Additionally, the oxidation was also monitored by UV-vis absorption spectroscopy (FIG. 8). An obvious red shift of LSPR peak at ~585 nm and intensity decrease over time were observed (FIG. 8a), which consistent with the color change and suggests Cu oxidation. (33) Importantly, the Cu@AuCu (5:2) NPs showed high antioxidant stability, with no shift of the LSPR peak after heating at 100° C. for 5 h (FIG. 8b). But the intensity of LSPR peak decreased slightly, which is caused by a small amount of particles deposited on the walls of the flask resulting in a decrease in concentration.

The integrity of the shell in the core-shell structure will directly affect the stability of core. In order to investigate the integrity of the Au shell, the Cu@AuCu (5:2) NPs were treated by $HNO_3$, which will easily dissolve away the Cu or copper oxide. FIG. 9a shows the UV-vis spectra of Cu NPs before and after etched by $HNO_3$. After adding the $HNO_3$ for 30 seconds, the LSPR peak disappeared completely and the color of colloidal solution changed from dark red to colorless, which indicates the Cu NPs were etched by acid. However, the addition of $HNO_3$ resulted in a red shift in the LSPR position of Cu@AuCu (5:2) NPs from ~554 nm to around ~620 nm and confirms the anti-etch stability (FIG. 9b). Due to the acidic environment of the solution, Cu@AuCu (5:2) NPs will agglomerate and generate a new broader localized surface plasmon coupling peak due to the localized surface plasmon resonance coupling effect between the particles and the particles and the peak red shift will be further caused. The contents of Cu and Au in the Cu@AuCu (5:2) NPs before and after $HNO_3$ etching were characterized by EDS. Compared the EDS spectrum of before and after etched by $HNO_3$, it can be seen that the ratio of Cu to Au has no significant change (FIG. 10a), which indicates the anti-etch stability. The TEM image of Cu@AuCu (5:2) NPs after etching showed they remain as particles and there is no hollow or incomplete shell particles but are aggregated (FIG. 10b), demonstrating the corrosion resistance, which is consistent with the results of UV-vis spectra. In addition, the EDS mapping of Cu@AuCu (5:2) NPs after etching by $HNO_3$ (FIG. 10 c-e) also shows the existence of the Cu core, which is consistent with the result of UV-vis spectra and TEM.

The integrity of the shells in the core-shell structure of Cu@AuCu (5:1) NPs and Cu@AuCu (10:1) NPs is also investigated. As showed in FIG. 11a, the Cu@AuCu (5:1) NPs after etched by $HNO_3$, adhesion occurs between the particles, and regrowth together. The addition of $HNO_3$ not only could remove the Cu species, but also might change the charge on the surface of the particles to cause agglomeration. The dissolution of Cu atoms in the alloy leads to the occurrence of vacancies, and then the Au atoms without coordination atoms diffuse and coordinate with the Au atoms without coordinating atoms of the other particle surfaces, so that the adhesion of the particles occurs. (33) There is no obvious hollow structure, which indicates that the dealloying process is slow, and further dissolution of the Cu core is suppressed due to an increase in the concentration of Au atoms in the shell. The EDS spectrum of Cu@AuCu (5:1) NPs before and after etched by $HNO_3$ also shows Cu content decreased only a small portion (FIG. 10c). These results indicate the AuCu shell of Cu@AuCu (5:1) NPs is intact, but not enough to effectively protect the copper core. However, for the Cu@AuCu (10:1) NPs after etched by $HNO_3$, the morphology changed almost completely, and the particles were heavily agglomerated to grow together (FIG. 11b). It suggests that the content of Au in the alloy shell is low, and it does not effectively protect the Cu core under strong acidic conditions. Compared the EDS spectrum of before and after etched by $HNO_3$, it can be seen that the Cu core is completely dissolved (FIG. 11d), which is consistent with the TEM results.

Example 6 Conclusion and Discussion

In summary, controllable Cu@AuCu nanoparticle structures were synthesized with different shell thicknesses via galvanic replacement and investigated their stability. In this process, phosphine such as TOP was used with the Au precursor to reduce the reduction potential of $Au^{3+}$. The thin shelled Cu@AuCu core-shell NPs with tunable shell thickness, uniform size and complete coverage were prepared by the seed-mediated growth method. A significantly enhanced stability of LSPR and structure in a harsh environment was observed on Cu@AuCu (5:2) NPs. In addition, compared to pure plasmonic Au NPs, Cu@AuCu core-shell NPs reduced costs. Furthermore, the as-prepared Cu@AuCu core-shell NPs have potential application in photocatalysis under visible light.

Example 7 Ultrastable Plasmonic Cu-Based Core-Shell Nanoparticles

Introduction

Plasmonic metal (e.g., Ag and Au) nanoparticles (NPs) have been shown to improve solar energy utilization due to their localized surface plasmon resonance (LSPR) in the visible light region.[35-46] As a low-cost and earth-abundant plasmonic non-noble metal, Cu NPs have received increasing attention owing to their strong and broadband absorption ranging from visible to near-infrared.[47-49] Despite their broad application prospects in photocatalysis, solar energy harvesting, optoelectronics, and biomedical technologies, there has long been a concern regarding the strong damping of their plasmon resonances arising from the overlap of LSPR band and interband transition.[50-51] Recently, it is reported that LSPR band of Cu can be separated spectrally from its interband transition by tailoring the shape of Cu NPs so as to obtain a strong and sharp LSPR band.[50, 52] An even greater challenge consists in the easy oxidation and leaching of Cu directly and seriously affect their applications.[48, 53-54] Indeed, with high surface energy and low standard reduction potential, it is extremely difficult to keep Cu NPs' metallic nature in air.[55-57] Therefore, the development of highly stable Cu-based NPs is highly desired.

To enhance the stability of Cu NPs, several strategies have been attempted, mainly by forming alloy or core-shell structure with robust materials. Compared with alloyed structures, core-shell structures are considered more effective in protecting Cu atoms from oxidation because no Cu atoms are directly exposed on the surface in the ideal case. To this end, a series of materials, such as graphene, polymers, $SiO_2$, metal oxides and noble metals, have been explored as shell materials to protect the Cu core.[49, 58-65] However, they failed to maintain high chemical stability and performance of Cu NPs under harsh conditions, such as the presence of acidic or alkaline environments, due to the imperfect shell coverage and/or insufficient shell stability.[66-67] Recently, a strategy was reported to synthesize monodisperse Cu@PtCu core-shell nanocrystals, but they tend to convert to hollow-PtCu nanostructures due to the etching of Cu by tert-butyl hydroperoxide-benzoic acid mixture.[68] More recently, it was found that the coating of Au shell greatly enhanced the stability of the metal core due to the excellent oxidation resistance of Au. By a seeded epitaxial overgrowth, Cu@Au core-shell nanowires with ultrathin Au shell were synthesized with enhanced stability as transparent conductors.[66] However, the Cu nanowires can still be etched by acetic acid, perhaps due to imperfect thin shell coverage. In another study, porous Au shell was synthesized through a dealloying approach, where the Cu core can be easily etched by $HNO_3$.[69] Thus, a complete, compact, stable thin shell is needed to obtain highly stable Cu NPs, resisting oxidation and acids.

Regarding the core-shell structure synthesis, in general, several approaches have been explored.[70-73] They are epitaxial growth,[66, 74-77] cation exchange,[78-79] successive ionic layer adsorption and reaction (SILAR),[80-81] sol-gel,[82-83] galvanic replacement,[84-85] etc. Typically, the epitaxial growth method involves the deposition of a crystalline shell with the same structural orientation as the crystal core, which usually requires lower lattice mismatch between the core and shell crystalline materials. The cation exchange method relies on the different solubility of compounds, driving the partial replacement of cations in the core compound by cations in a solvent, while maintaining the anion sublattice undisturbed. It may not allow the precise control of the shell thickness composition, and uniformity. Once again, it requires the similar crystalline structure between the core and shell compounds. The sol-gel method is to disperse the core seeds in the sol, and then to gel under certain reaction conditions to form a coating layer on the surface of the core. However, this method usually suffers from the agglomeration and unwanted homogeneous nucleation of shell materials. The feature of SILAR is that anion and cation solutions are added alternatively to avoid self-nucleation. The addition amount of anion and cation precursors must be very accurate, because small deviations may cause uneven size. The galvanic replacement method relies on the redox potential difference of ions, which usually leads to the voids in the final structure. Recently, another approach was reported. With the assistance of laser ablation in liquid, Fe—Au core-shell magnetic-plasmonic NPs were synthesized in one-step, driven by interface energy minimization.[86] The Au shell not only gives the plasmonic property but also enhances the Fe stability. However, the particle size distribution and uniformity of core-shell structure still need to be improved.

Herein, the formation of stable plasmonic Cu—Au core-shell NPs with a thin shell synthesized by a galvanic replacement method is reported. The ultrathin yet complete crystalline Au shell can effectively inhibit the leaching of Cu even in strong oxidizing $HNO_3$ solution, demonstrating strong chemical stability. Furthermore, these NPs show high photothermal efficiency and chemical stability in real harsh environments for solar energy conversion. In stark contrast, the core-only Cu NPs can be easily and completely dissolved even by just saturated $CO_2$ solution.

Results and Discussion

The plasmonic Cu—Au core-shell NPs were synthesized via a seed-mediated approach. Cu NPs were first prepared as seeds by the thermal decomposition of copper acetylacetonate in oleylamine (OLA), and then mixed with the $Au^{3+}$ precursor. Cu atoms on the surface of the Cu NPs could be replaced by Au through the galvanic replacement process, thus leading to a thin shell composed of an intermediate AuCu layer and an outer Au layer around the Cu core. Transmission electron microscopy (TEM) images show that $Cu_{2.5}Au_1$ core-shell NPs (the feed ratio of Cu to Au is 2.5:1) had a uniform size of 12.8±1.1 nm in diameter (FIGS. 12a and 17). The core diameter and shell thickness were measured to be ~8.4 and ~2.2 nm, respectively. High resolution (HR)-TEM image (FIG. 12b and inset in 18a) reveals the core-shell structure, and the lattice fringe spacing of 2.35 Å and 2.24 Å can be assigned to the (111) planes of face-centered cubic (fcc) Au and AuCu alloy, respectively. This observation indicates that there was a thin pure Au layer formed on the surface, around the intermediate CuAu alloy layer. Consistently, the X-ray diffraction (XRD) analysis reveals the coexistence of diffraction peaks of fcc Au, Cu and AuCu alloy, further confirming the formation of the crystalline AuCu alloy and Au layer around Cu cores (FIG. 12c). Furthermore, high-angle annular dark-field scanning TEM (HAADF-STEM) images show slightly different brightness of the core and shell of the Cu—Au NPs (FIGS. 12d and 18b). The brighter contrast on the edges of the NPs was in line with the local enrichment of Au atoms, which was also demonstrated by energy-dispersive X-ray spectroscopy (EDS) analysis at different positions on individual $Cu_{2.5}Au_1$ particles (FIG. 19). Elemental mapping images clearly show the Cu core (green) and Au-containing shell (red) (FIGS. 1e and 18c). The chemical element distribution of single and a group of $Cu_{2.5}Au_1$ NPs was also investigated by STEM combined with electron energy-loss spectroscopy (EELS), as shown in FIG. 13. The rectangular frame in FIG. 13a marks the region from which the annular dark-field (ADF) image and EELS map shown in FIGS. 13b and c were recorded. The EELS mapping image clearly reveals the core-shell structure. The EELS spectra show that there are an obvious $Cu-L_{2,3}$ edge signal at the NP center (area 2), which is essentially missing at the edge (area 1; FIG. 13d). However, the $Au-M_{4,5}$ signal is stronger at the edge (area 1) and much weaker at the center (area 2). The EELS line profiles of Cu and Au across NPs present an alternating pattern (FIG. 13e). These results strongly support the formation of the core-shell structure. The measured Cu:Au atomic ratio of $Cu_{2.5}Au_1$ NPs obtained by inductively coupled plasma optical emission spectrometry (ICP-OES) is ~1.78:1.

Importantly, the $Cu_{2.5}Au_1$ core-shell NPs showed very high stability when exposed to acid. As a demonstration, 1.0 M $HNO_3$ solution, which can usually easily dissolve Cu or copper oxide, was used for etching test. There was no significant change in the Cu:Au ratio (FIGS. 12f and 20) after 30 min of etching, indicating there was no leakage of Cu atoms from the NPs. Although the addition of $HNO_3$ did not cause any dissolution, i.e., chemical change of the $Cu_{2.5}Au_1$ NPs, there was a slight color change of colloidal solution, and a red shift in the LSPR peak position (FIG. 21a), which was attributed to agglomeration of $Cu_{2.5}Au_1$ NPs in the acidic environment (FIG. 22).[87-88] Even though the LSPR peak happens to be shifted to the position close to that of pure Cu NPs, we don't believe the etching process produced pure Cu NPs because $HNO_3$ could preferentially dissolve the Cu. In clear contrast, for the un-coated Cu NPs, the LSPR peak completely disappeared and the color of colloidal solution changed dramatically from dark red to colorless after $HNO_3$ addition within 30 s, which indicates that the Cu NPs were completely destroyed by the acid (FIGS. 21b and 23). The TEM image of $Cu_{2.5}Au_1$ NPs after the etching test (FIG. 12g) shows that they maintained the initial structure without any sign of the formation of hollow or incomplete, broken shell structures, demonstrating their high acid resistance. The EDS mapping of $Cu_{2.5}Au_1$ NPs after the $HNO_3$ attack also clearly shows the existence of the Cu core, which further confirmed the integrity of the shell (FIG. 12h). All these results again support that the observed spectral change is due to the $Cu_{2.5}Au_1$ as aggregates rather than Cu NPs.

The antioxidation stability of the $Cu_{2.5}Au_1$ NPs was further investigated by heating their colloidal toluene solution at 100° C. FIG. 12i shows the oxidation of $Cu_{2.5}Au_1$ NPs monitored by UV-vis absorption spectroscopy. No significant shift in the LSPR peak and no obvious change in color were observed after heating at 100° C. for 5 h (FIG. 24). In stark contrast, for Cu NPs, the color changed from dark red to dark green and the significant drop in intensity and red-shift of LSPR peaks occurred, suggesting the gradual oxidation of Cu NPs to $Cu@Cu_2O$ NPs during the heating process. After the heat treatment, $Cu_{2.5}Au_1$ NPs did not show any obvious change in size or morphology either, as evidenced by TEM observations (FIG. 25), further confirming their high stability.

To further understand the effect of the shell on the chemical stability, Cu—Au core-shell NPs with different shell thickness were synthesized by adjusting the feeding amount of Au precursor. FIG. 26 shows TEM images of $Cu_5Au_1$ and $Cu_{10}Au_1$ (the Cu-to-Au feed ratios are 5:1 and 10:1, respectively) core-shell NPs with average sizes of 11.3±1.7 nm and 11.8±1.4 nm, respectively. As measured in HRTEM images (insets in FIG. 26), the shell thickness of $Cu_5Au_1$ NPs and $Cu_{10}Au_1$ NPs was measured to be ~2.0 nm and ~1.4 nm, respectively. These NPs were then subject to acid etching test. As shown in FIG. 27*a*, after the etching test with $HNO_3$, fusion occurred among the $Cu_5Au_1$ NPs, and many of them clearly joined together. It is known that the addition of $HNO_3$ can not only remove the Cu species, but also generally change the charge on the surface of the particles to cause "temporary" agglomeration, which is different from "permanent" NP fusion.[89-91] Without wishing to be bound by theory, it is assumed that the $Cu_5Au_1$ NPs have at least partially exposed alloy surface, which allows for Cu leakage. The dissolution of Cu atoms in the partially exposed alloy layer leads to the occurrence of vacancies, and then the Au atoms without sufficient number of coordination atoms can diffuse and coordinate with the Au atoms on the surface of other NPs, so that the welding of the particles occurs.[92] No hollow structure or structural collapse was observed, which indicates that the dealloying process was not very rapid. The EDS spectra of $Cu_5Au_1$ NPs show that the Cu:Au ratio decreased only slightly after $HNO_3$ etching (FIG. 27*b*), in agreement with slight "surface-dealloying" or "shell-dealloying". Such a dealloying process was essentially absent for the $Cu_{2.5}Au_1$ sample as supported by TEM images; almost no surface fused particles were observed and no Cu loss was detected by EDS in that case either. As the limited "shell dealloying" process should be mainly related to different "surface stability" rather than shell thickness, the distinct difference found in these two samples suggests that the surface of the $Cu_{2.5}Au_1$ NPs is likely completely covered by a pure Au layer, giving little or no change for Cu atoms to dissolve. The formation of a complete-coverage, outer crystalline Au layer should be key to the high chemical stability of the $Cu_{2.5}Au_1$ sample. As for the $Cu_{10}Au_1$ NPs, their morphology completely changed after etching with $HNO_3$, and the particles were heavily fused together (FIG. 27*c*). As a matter of fact, they formed an irregular network structure and individual NPs were hard to be resolved. The EDS spectra of the samples before and after the $HNO_3$ etching show that the Cu core was completely removed by the acid; no Cu signal could be even detected from the formed network (FIG. 27*d*). It is clear that in this case, the exposed, thin alloy shell was completely dealloyed and could not play any role in protecting the Cu core. Furthermore, NPs were also synthesized with a higher Cu-to-Au feed ratio of 1:1 under the otherwise same reaction conditions and confirmed that these $Cu_1Au_1$ NPs showed similar structural features and stability to $Cu_{2.5}Au_1$ NPs. These NPs contained a larger amount of Au in individual NPs (FIG. 28).

The Cu—Au core-shell NPs with distinctly different acid-resistant properties, carrying from strongest ($Cu_{2.5}Au_1$ NPs) to intermediate ($Cu_5Au_1$ NPs) and weakest ($Cu_{10}Au_1$ NPs), were further characterized to identify their structural differences and determine the factors contributing to acid resistance. As measured by EDS mounted on TEM, the Cu:Au atomic ratios of $Cu_{2.5}Au_1$, $Cu_5Au_1$, and $Cu_{10}Au_1$ NPs were approximately 1.8:1, 3.9:1, and 8.2:1, respectively. The selected area electron diffraction (SAED) patterns reveal that all three core-shell samples exhibit no signal from the oxidized Cu species while the Cu NPs were partially oxidized to $Cu@Cu_2O$ (FIG. 29), which is consistent with the TEM results (FIG. 23*a*).[93-94] Instead, mixed diffraction rings that can be indexed to Cu and AuCu alloy were identified. As the proportion of Au in the NPs increased, the diffraction rings of the AuCu alloy became clearer and broader, and the diffraction rings of Cu became weaker. In addition, for the $Cu_{2.5}Au_1$ NPs, since the diffraction ring positions of Au (111) and AuCu (111) are so close to each other, the formation of the ultrathin Au layer can broaden the diffraction ring of AuCu (111), which is indeed observed in the SAED pattern. XRD data clearly demonstrate that the fcc Au, Cu and AuCu alloy coexisted in the $Cu_{2.5}Au_1$ and $Cu_{10}Au_1$ NPs (FIG. 24*a*). With the increase of Au content, the (111) diffraction peak of AuCu alloy was more pronounced and shifted to lower angle from ~40.6° to ~39.5° (closer to the (111) peak position of pure Au at ~38.2°), indicating that the shell was integrated with more Au atoms. No distinct diffraction peak at ~38.2° from pure Au was shown in the $Cu_5Au_1$ NPs, possibly because it was hidden under the enhanced, broadened alloy diffraction peak. The Cu:Au atomic ratios of Cu—Au core-shell NPs measured by X-ray photoelectron spectroscopy (XPS) were much smaller than those by EDS, which further supports the core-shell structure considering XPS is a surface sensitive technique (Table 2).[95] XPS spectra and analysis of Cu—Au core-shell NPs suggest that as the Au feed content increased, the actual Cu concentration in the shell (also in the entire NPs) decreased, which is in agreement with the observation that $Cu_{2.5}Au_1$ has high anti-oxidation stability (FIG. 30*b*). Based on these characterizations, Cu, AuCu and Au phases are present in all the Cu—Au core-shell NPs with different molar ratios, but the samples show quite different stability. Without wishing to be bound by theory, it is possible that, at the lower feeding ratio of Au:Cu, the Au layer that could be formed is patchy and does not have a full surface coverage.

To better understand how the complete, crystalline Au layer was generated around the alloy layer to form very stable NPs, the entire core-shell structure synthesis process was studied (FIG. 14). The galvanic replacement process can lead to the integration of Au atoms into the NPs through the reduction of Au ions in solution by $Cu^0$ atoms in the Cu NPs. However, this method is known to usually lead to hollow nanostructures with an alloyed shell.[92-100] In parallel, direct reduction of $Au^{3+}$ ions by the reducing agent OLA can also cause the deposition of Au atoms on the Cu NPs, and this will likely generate homogeneously nucleated, separate Au NPs in solution. The final product will be determined by the interplay between these two processes. In the present synthesis, trioctylphosphine (TOP) was found to contribute to tuning these two processes and thereby in the formation of the desired, uniform, thin-shell core-shell NPs. Because TOP can strongly bind with $Au^{3+}$, it can largely reduce the reduction potential of $Au^{3+}$, contrasting to the case where only OLA, a weakly bound ligand (a reducing agent as well) for $Au^{3+}$, was present in the Au precursor solution.[66, 96] As a result, TOP can greatly suppress the galvanic replacement process to such an extent to form a very thin shell without forming a hollow structure but still fast enough to generate an uniform shell. On the other hand, the OLA reduction rate was more significantly reduced, with or without the Au seeds (FIG. 31, 32 and details therein). In stark contrast, without TOP, the reduction reactions of $Au^{3+}$ by both OLA and $Cu^0$ were so rapid and strongly competing that they produced irregular, relatively large nanostructures and self-nucleated Au nanospheres (FIG. 33 and details therein).[66, 66] The results suggest that the intermediate alloy layer and outer polycrystalline Au layer are mainly formed via the galvanic replacement.[84] For very small particles like Cu NPs under investigation herein, atomic segregation dictated by surface and interface energies can play an important role in determining the nanostructure and may lead to the formation of a non-alloyed, single-metal shell.[84, 101] Initially, the Cu atoms on the surface are gradually replaced by Au atoms, forming an alloy and a patched Au layer. After more surface Cu atoms are substituted by Au, the Cu@AuCu@Au core-shell sandwich structure was formed.

In addition, the effects of reaction temperature and time on the morphology and composition of $Cu_{2.5}Au_1$ core-shell NPs were also studied. Most strikingly, the reaction temperature and time showed the opposite effects on the formation of the outer crystalline Au layer based on the XRD analysis (FIGS. 34a and b). The Au (111) peak gradually disappeared with the reaction temperature increasing from 120° C. to 160° C., while the AuCu (111) peak became more pronounced with respect to the (111) peak of Cu. These results indicate that a higher reaction temperature can accelerate the interdiffusion of Au and Cu atoms, favoring the formation of AuCu alloy.[102] However, the longer reaction time at a relatively lower temperature (140° C.) resulted in the intensified Au (111) peak. TEM results show no significant change in the morphology of NPs, but as expected, the shell thickness slightly increased with the increase of both reaction temperature and time (FIG. 34c-f and FIG. 12a). As the reaction time increased to 2 h, the measured ratio of Cu:Au had no significant change (~1.6:1). This further demonstrates that the formation of the Au shell inhibits the diffusion of Cu and Au atoms. Moreover, the measured Au-to-Cu ratio obviously increased with temperature increasing from 120° C. to 160° C., even at short reaction time of one hour (FIG. 35). With more Au atoms introduced at 160° C., the NPs are anticipated to have higher stability as compared to the $Cu_{2.5}Au_1$ NPs synthesized at 140° C. But indeed, most of the NPs of the 160° C. sample became connected to each other with short "bridges" formed after the $HNO_3$ etching test (FIG. 36). The $Cu_{2.5}Au_1$ NPs synthesized at 140° C. seem to have a higher resistance against $HNO_3$ etching than the NPs synthesized at 160° C., even though the latter has a thicker shell and higher Au-to-Cu ratio. This observation strongly supports that the formation of the outer crystalline Au layer is responsible for the high chemical stability.

In order to use these Cu-based NPs in plasmon-related applications, their optical properties were studied. FIG. 15a shows that Cu NPs had a distinct peak at λ=576 nm, corresponding to the LSPR of Cu.[103] The UV-vis spectra of Cu—Au core-shell NPs synthesized at different Cu-to-Au feed ratios (2.5:1, 5:1 and 10:1) show that the LSPR peaks exhibited small, yet continuous blue shifts from 576 nm for Cu NPs towards 520 nm expected for the pure Au NPs with increasing Au concentration.[102] These experimental data is accompanied by optical simulations of representative models, shown in FIG. 15b, which illustrates the general blue shifting trend caused by the galvanic replacement of Cu by Au at the NP's surface. The concentrations of Au in the models are likely larger than in the experimental sample, which is helpful to examine this trend. These curves compare the extinction spectra of four NPs with the same volume but changing shell composition, with the reference being a chemically stable Cu—$Cu_2O$ core-shell NP (FIG. 37). The three Cu—Au NPs show an increasing exchange of Cu by Au from the outer surface of the particles, which is illustrated by the curves in FIG. 37b. In accordance with the experimental data in FIG. 15a, we see that even a thin Au layer can effect a significant and measurable change in the LSPR spectrum shape of the Cu NPs. The alloying of Cu with Au progressively changes the effective properties of the mobile carriers at the outer regions of the NP, resulting in a LSPR that shifts towards the higher-energy plasmonic resonance of Au particle. FIG. 15c shows the transient absorption (TA) spectra of these NPs taken at 1.3 ps delay time with excitation at 530 nm. With the shell, the LSPR band of Cu NPs shifted to blue due to the change in the surrounding dielectric medium, which is in good agreement with the UV-vis measurements (FIG. 15a). The dynamics of the minimum (between 550-600 nm) signal for these NPs were essentially identical (FIG. 15d). The early time dynamics is dominated by scattering, while the long tail is related to the NPs being heated up due to electron-phonon coupling during the hot electron relaxation process.[104-106] Both the scattering loss and heat transfer coefficients between the samples appeared to be quite similar. Thus, the shell does not seem to affect their plasmonic decay and heat transfer properties.

Solar photothermal conversion is a simple yet efficient way to utilize solar energy.[107-114] The stable, plasmonic $Cu_{2.5}Au_1$ core-shell NPs with strong absorption in the visible region can be used as a "nanofluid" to absorb the solar energy and directly heat the liquid for steam generation.[115-116] To demonstrate this, the photothermal performance of $Cu_{2.5}Au_1$ NPs was investigated under solar illumination for 10 min at the power density of 1 sun (1 kW $m^{-2}$) and compared with that of Au NPs of the same amount, where the NPs were loaded on filter paper to form an absorber (details in the Supporting Information). The thermal images and temperature change were monitored by an infrared camera (FIG. 38). After the "dry" absorbers (without water) were irradiated for 10 min, the surface temperature of the $Cu_{2.5}Au_1$ NPs absorber rapidly increased to the maximum value of 57.0° C. observed at the center, which was considerably higher than that (50.5° C.) of the Au NPs, attributed to much the enhanced photoabsorption of the former sample.[117] This suggests that the $Cu_{2.5}Au_1$ NPs have a higher photothermal conversion efficiency than Au NPs. To further verify this, experiment was conducted for solar steam generation, as illustrated in FIG. 39, in which water is transported from bottom to the absorber via filter paper by capillary action and the expanded polystyrene foam on the water surface can reduce the heat losses. As shown in FIG. 16a, the temperature of the $Cu_{2.5}Au_1$ sample on the water surface quickly rose to ~32° C. after 6 min under 1 sun, which was ~4° C. higher than that of the Au NPs absorber, and ~8.5° C. above that of bulk water. FIG. 40 shows the corresponding infrared images of the three samples after 60 min illumination under 1 sun. The equilibrate temperature of wet samples is much lower than that of dry absorbers due to the consumption of converted thermal energy during the solar steam generation. The time-dependent water evaporation mass losses in the presence of different photon absorbers are shown in FIG. 16b. By fitting data in FIG. 16b, the water evaporation rate and photothermal efficiency of different absorbers were estimated (Equation S1), with results presented in FIG. 16c. Under 1 sun irradiation for 5 h, the evaporation rates of the $Cu_{2.5}Au_1$ NPs and Au NPs were 1.02 and 0.92 kg $m^{-2}$ $h^{-1}$, respectively, which are much higher than that of bulk water (0.27 kg $m^{-2}$ $h^{-1}$). Furthermore, the $Cu_{2.5}Au_1$ NPs achieved the conversion efficiency of 66% under 1 sun irradiation, which is higher than that of the Au NPs absorber (59%) and bulk water (17%). The strong performance of the $Cu_{2.5}Au_1$ NPs is mainly attributed to enhanced photoabsorption.

Durability of the NPs is a crucial factor for practical applications, the performance of the NPs in saturated $CO_2$ solution was tested, as the natural water always contains certain level of $CO_2$. Under 1 sun, the color of pure Cu NPs changed from black to peacock green until colorless over time because Cu is easily oxidized to $Cu(OH)_2CO_3$ and then etched by $H_2CO_3$, showing poor stability (insets in FIG. 16d). In contrast, no color change was observed for the $Cu_{2.5}Au_1$ NPs under the same test condition. Furthermore, the surface temperature changed during evaporation of saturated $CO_2$ solution under 1 sun was tracked. As shown in FIG. 16d, $Cu_{2.5}Au_1$ NPs showed good stability without showing any temperature drop under continuous illumination. The significantly enhanced chemical stability of $Cu_{2.5}Au_1$ NPs highly desired for applications.

Conclusion

In summary, stable, $HNO_3$-acid resistant plasmonic Cu-based NPs have been synthesized in a controlled manner. The formation of a complete outer Au shell was identified as the major contributing factor for the significantly enhanced chemical stability. Compared to Au NPs, plasmonic $Cu_{2.5}Au_1$ NPs not only were cost-effective but also exhibited greater photothermal conversion performance in the solar steam generation due to their broad photoabsorption. This work provides a general strategy to rationally design and synthesize ultrastable Cu-based nanomaterials with many potential applications.

Experimental Section

Materials. Oleylamine (OLA, 70%), Copper(II) acetylacetonate ($Cu(acac)_2$, ≥99.9%), gold(III) chloride trihydrate ($HAuCl_4 \cdot 3H_2O$, ≥49.0%), and $HNO_3$ (90%) were purchased from Sigma-Aldrich. Ethanol (90%), acetone (≥99.5%), toluene (≥99.9%), trioctylphosphine (TOP, 90%) and filter paper were purchased from Fisher Scientific. All chemicals were used as received without further purification. All solutions were prepared using deionized water (resistance >18.25 MΩ·cm).

Synthesis of Cu NPs. The Cu NPs were synthesized by modifying a reported procedure.[56] In a typical synthesis, 33.2 mg of $Cu(acac)_2$ and 10 mL of OLA were added in a three-necked flask. Under a nitrogen atmosphere, the Cu NPs were obtained by thermal decomposition of $Cu(acac)_2$ at 230° C. for 3 h to produce a dark red colloidal solution. Then, the obtained Cu NPs were purified by precipitation and centrifugation. Finally, the isolated solid was dispersed in hexane.

Synthesis of Cu—Au core-shell NPs. Firstly, the Cu NPs were synthesized according to the method described above. After the Cu NPs were generated, the dark red colloidal solution was cooled down to 140° C. 1 mL of TOP solution of $HAuCl_4 \cdot 3H_2O$ was injected using a syringe and the mixed solution became crimson. After reacting for 1 h, the solution was cooled down rapidly to room temperature. The Cu—Au core-shell NPs were purified by precipitation and centrifugation. Finally, the isolated solid was dispersed in hexane. The yielded Cu—Au core-shell NPs were named according to the feed ratios (2.5:1, 5:1 and 10:1) of Cu to Au, namely $Cu_{2.5}Au_1$ NPs, $Cu_5Au_1$ NPs, and $Cu_{10}Au_1$ NPs.

Synthesis of Au NPs. The synthesis of Au NPs is similar to that of Cu NPs. In the synthesis process, 10 mL of OLA was added in a three-necked flask. Then, the solution was slowly heated to 140° C. An OLA solution (1 mL) of $HAuCl_4 \cdot 3H_2O$ (20 mg) was injected using a syringe. The Au NPs were obtained through the reduction of $HAuCl_4$ by OLA to produce a pink solution. After reacted for 1 h, the obtained Au NPs were purified by precipitation and centrifugation. Finally, the isolated solid was dispersed in hexane.

Preparation of solar absorbers. The $Cu_{2.5}Au_1$ NPs, Au NPs and Cu NPs absorbers were prepared by the filtration of corresponding diluted suspensions using filter paper. The loading amount of NPs on filter paper was kept at 0.09 mg $cm^{-2}$ and the size of absorbers used in this work was about 1.0 cm×1.0 cm. After being dried in air naturally, they were used for solar steam measurements.

Measurement of the photothermal conversion performance. The solar evaporation tests were performed under the solar illumination of 1 kW $m^{-2}$ (1 sun). A piece of expanded polystyrene foam (2.0 cm in diameter, 0.5 cm in thickness) with one hole (1.0 mm×1.0 mm) was utilized as the thermal insulator. The filter paper was threaded through the hole in expanded polystyrene foam and soaked in bulk water to transport water (FIG. 39). Absorber was wetted and placed on the expanded polystyrene foam. Thus, the expanded polystyrene foam prevents direct contact between absorber and bulk water. The whole set-up exposed exactly under simulated sunlight. The water weight loss was recorded by an electrical balance every 10 min. The surface temperature of absorbers was measured and recorded by an IR camera. The solar evaporation rate was calculated based on the weight loss of water over five hours at the steady state.

Calculation of solar energy conversion efficiency. The solar energy conversion efficiency (η) in solar steam generation was calculated as follows:

$$\eta = \frac{\dot{m} h_{LV}}{qi} \quad \text{S1}$$

where η is the conversion efficiency, $\dot{m}$ denotes the measured water evaporation rate generated by the solar steam generator (kg $m^{-2}$ $h^{-1}$), $h_{LV}$ is the liquid-vapor phase change enthalpy (including sensible heat (4.2 kJ $kg^{-1\circ}$ $C.^{-1}$) and phase change enthalpy (2257 kJ $kg^{-1}$)), and qi is the nominal solar illumination of 1 kW $m^{-2}$.[107, 110, 118]

Characterization. The microstructure and composition of the prepared Cu-based NPs were investigated by a transmission electron microscope (TEM, JEOL 2100F, operated at 200 kV), equipped with an energy-dispersive X-ray (EDX) spectrometer. High resolution (HR)-TEM, high angle annular dark field-scanning transmission electron microscopy (HAADF-STEM) imaging and EDX elemental mapping were performed using a FEI-Talos microscope at an accelerating voltage of 200 KV. Electron energy-loss spectroscopy (EELS) were performed using a FEI-Themis microscope at an accelerating voltage of 300 kV. The crystal structures of all the samples were analyzed by the x-ray diffraction spectrometer (XRD, Panalytical X'Pert MRD) with a Cu Kα radiation source (λ=0.1542 nm) operated at 45 kV and 40 mA. X-ray photoelectron spectroscopy (XPS) spectra were taken by using a VG Escalab 220i-XL equipped with a twin-anode (Mg/Al) source. To correct for charging, the binding energies (BE) were referred to the C1s peak at 284.6 eV. The Cu/Au ratio was measured by using inductively coupled plasma optical emission spectrometry (ICP-OES; Agilent Technologie, 5100). The UV-vis-NIR absorption spectra of samples were measured using a Varian Cary 5000 scan spectrometer. Optical pump-optical probe transient absorption spectroscopy was performed using a Coherent Libra (Coherent, Calif., USA) laser with pulse width of 100 fs and repetition rate of 1 kHz. A portion of the output was coupled to a Coherent OPerA Solo optical parametric amplifier (OPA), which generated the 530 nm laser pump pulse. The pump beam diameter was 0.3 mm at the sample and the pulse energy was tuned using graded neutral density filter to 300 nJ. The supercontinuum white light probe was generated using a sapphire crystal. An Ultrafast Systems (Sarasota, Fla., USA) transient absorption measurement system was used including fiber-coupled grating spectrometers with Si CMOS detector arrays for analysis of the ~315-800 nm spectral range. The differential signal was calculated by $dA=-dT=\log(I_{pumped}/I_{unpumped})$ The hydrodynamic size was characterized by a Malvern Zetasizer Nano-S90 DLS instrument. FLIR E6 XT infrared camera was used to take infrared photographs and measure temperature during photothermal tests. A solar simulator equipped with an AM1.5G filter (LCS-100, Newport) was utilized as the light source for the photothermal measurements.

Theoretical Details. The theoretical results presented in FIG. 15b were obtained with the commercial package COMSOL, which uses a finite element methods approach to solve the full electrodynamic problem the NPs under plane wave radiation. The models employed consist in small NPs, with 15 nm in diameter, immersed in a homogeneous fluid with a constant permittivity of $\varepsilon_{env}=2$, modelling an environment of hexane solvent and a coating layer of oleylamine ligands. The values of permittivity for Cu and Au were taken from available experimental data of bulk metals in the literature,[119] and that of Cu$_2$O was taken as a constant of $\varepsilon_{Cu_2O}=2.2^2$. As a useful approximation, the change in effective permittivity with alloying in the Cu—Au NPs was modelled using the Maxwell-Garnett effective medium theory, where the permittivity of the mixture can be calculated as a function of the volume fraction of the Au inclusions into the Cu matrix:

$$\varepsilon_{mix} = \varepsilon_{Cu} \frac{2\varepsilon_{Cu} + \varepsilon_{Au} + 2f_{Au}(\varepsilon_{Au} - \varepsilon_{Cu})}{2\varepsilon_{Cu} + \varepsilon_{Au} - f_{Au}(\varepsilon_{Au} - \varepsilon_{Cu})}$$

where $\varepsilon_{Cu}$ and $\varepsilon_{Au}$ are the permittivities of Cu and Au, respectively, and $f_{Au}$ is the volume fraction of Au. In our models, the composition of the particles is a function of the position, $f_{Au}=f_{Au}(r)$, so that we can define the continuous Au layer resulting of the progressive galvanic replacement of Cu atoms. The profiles of $f_{Au}(r)$ are the complementary to the Cu concentration curves shown in the inset of FIG. 4b.

Supporting Information

TABLE 2

Atomic ratios obtained from EDS and XPS measurements for Cu2.5Au1, Cu5Au1 and Cu10Au1 NPs. Compared with EDS, XPS is a surface sensitive characterization technique. Therefore, XPS results are more indicative of the atomic ratio in the shell.

| Sample | EDS (Cu:Au) | XPS (Cu:Au) |
| --- | --- | --- |
| Cu$_{2.5}$Au$_1$ | 1.8:1 | 0.4:1 |
| Cu$_5$Au$_1$ | 3.9:1 | 1.1:1 |
| Cu$_{10}$Au$_1$ | 8.2:1 | 3.3:1 |

While the present disclosure has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

FULL CITATIONS FOR DOCUMENTS REFERRED TO IN THE APPLICATION (1) X. Liu, J. Iocozzia, Y. Wang, C. Xun, Y. Chen, S. Zhao, Z. Li, Z. Lin, Energy Environ. Sci., 10 (2017) 402-434.

(2) S. Linic, U. Aslam, C. Boerigter, M. Morabito, Nat. Mater., 14 (2015) 567-576.

(3) X. Zhang, X. Li, D. Zhang, D., N. Q. Su, W. Yang, H. O. Everitt, J. Liu, Nat. Commun., 8 (2017) 14542.

(4) N. Jiang, X. Zhuo, J. Wang, Chem. Rev., 118 (2018) 3054-3099.

(5) A. Marimuthu, J. Zhang, S. Linic, Science, 339 (2013) 1590-1593.

(6) H. Liu, T. Wang, H. Zeng, Part. Part. Syst. Char., 32 (2015) 869-873.

(7) P. Zhang, T. Wang, H. Zeng, Appl. Surf. Sci., 391 (2017) 404-414.

(8) P. Zhang, T. Song, T. Wang, H. Zeng, Appl. Catal. B: Environ., 206 (2017) 328-335.

(9) Y. Zhang, M. Park, H. Y. Kim, B. Ding, S. J. Park, Appl. Surf. Sci., 384 (2016) 192-199.

(10) P. Zhang, T. Song, T. Wang, H. Zeng. Appl. Catal. B: Environ., 225 (2018) 172-179.

(11) X. Guo, C. Hao, G. Jin, H.-Y. Zhu, X.-Y. Guo, Angew. Chem. Int. Ed., 53 (2014) 1973-1977.

(12) G. H. Chan, J. Zhao, E. M. Hicks, G. C. Schatz, R. P. Van Duyne, Nano Lett., 7 (2007) 1947-1952.

(13) R. Shi, M. Ren, H. Li, J. Zhao, S. Liu, Z. Li, J. Ren, Mol. Catal., 445 (2018) 257-268.

(14) I. Pastoriza-Santos, A. Sánchez-Iglesias, B. Rodriguez-Gonzalez, L. M. Liz-Marzán, Small, 5 (2009) 440-443.

(15) S. U. Son, I. K. Park, J. Park, T. Hyeon, Chem. Commun., 7 (2004) 778-779.

(16) Y. Kobayashi, T. Sakuraba, Colloids Surf. A: Physicochem. Eng. Aspects, 317 (2008) 756-759.

(17) C. Lee, N. R. Kim, J. Koo, Y. J. Lee, H. M. Lee, Nanotechnology, 26 (2015) 455601.

(18) Y. Kobayashi, S. Ishida, K. Ihara, Y. Yasuda, T. Morita, S. Yamada, Colloid Polym. Sci., 287 (2009) 877-880.

(19) S. Wang, X. Huang, Y. He, H. Huang, Y. Wu, L. Hou, X. Liu, T. Yang, J. Zou, B. Huang, Carbon, 6 (2012) 2119-2125.

(20) J.-H. Zhou, D.-W. Lan, S.-S. Yang, Y. Guo, K. Yuan, L.-X. Dai, Y.-W. Zhang, Inorg. Chem. Front., 5 (2018), 1524-1532.

(21) Z. Niu, F. Cui, Y. Yu, N. Becknell, Y. Sun, G. Khanarian, D. Kim, L. Dou, A. Dehestani, K. Schierle-Arndt, P. Yang, J. Am. Chem. Soc., 139 (2017) 7348-7354.

(22) T. Bala, S. D. Bhame, P. A. Joy, B. L. V. Prasad, M. Sastry, J. Mater. Chem., 14 (2004) 2941-2945.

(23) Y. Lou, Y. Zhang, L. Cheng, J. Chen, Y. Zhao, ChemSusChem, 11 (2018) 1505-1511.

(24) C. Wang, D. Astruc, Chem. Soc. Rev., 43 (2014) 7188-7216.

(25) Y.-C. Tsao, S. Rej, C.-Y. Chiu, M. H. Huang, J. Am. Chem. Soc., 136 (2014) 396-404.

(26) J. Gong, F. Zhou, Z. Li, Z. Tang, Langmuir, 28 (2012) 8959-8964.
(27) Y. Ma, W. Li, E. C. Cho, Z. Li, T. Yu, J. Zeng, Z. Xie, Y. Xia, ACS Nano, 4 (2010) 6725-6734.
(28) M. Liu, W. Zhou, T. Wang, D. Wang, L. Liu, J. Ye, Chem. Commun., 52 (2016) 4694-4697.
(29) M. Jung, J. N. Hart, J. Scott, Y. H. Ng, Y. Jiang, R. Amal, Appl. Catal. A, 521 (2016) 190-201.
(30) Y. Zhu, A. Marianov, H. Xu, C. Lang, Y. Jiang, ACS Appl. Mater. Interfaces, 10 (2018) 9468-9477.
(31) W. Xue, S. Liu, H. Yin, L. Shen, Z. Lu, X. Jia, Catal. Lett., 146 (2016) 1139-1152.
(32) S. U. Son, I. K. Park, J. Park, T. Hyeon, Chem. Commun., 7 (2004) 778-779.
(33) A. Muzikansky, P. Nanikashvili, J. Grinblat, D. Zitoun, J. Phys. Chem. C, 117 (2013) 3093-3100.
(34) J. Erlebacher, M. J. Aziz, A. Karma, N. Dimitrov, K. Sieradzki, Nature, 410 (2001) 450-453.
(35) Yang, J.; Guo, Y.; Jiang, R.; Qin, F.; Zhang, H.; Lu, W.; Wang, J.; Yu, J. C. High-Efficiency "Working-in-Tandem" Nitrogen Photofixation Achieved by Assembling Plasmonic Gold Nanocrystals on Ultrathin Titania Nanosheets. J. Am. Chem. Soc. 2018, 140, 8497-8508.
(36) Zhang, Q.; Jin, X.; Xu, Z.; Zhang, J.; Rendon, U. F.; Razzari, L.; Chaker, M.; Ma, D. Plasmonic Au-Loaded Hierarchical Hollow Porous $TiO_2$ Spheres: Synergistic Catalysts for Nitroaromatic Reduction. J. Phys. Chem. Lett. 2018, 9, 5317-5326.
(37) Yin, Z.; Wang, Y.; Song, C.; Zheng, L.; Ma, N.; Liu, X.; Li, S.; Lin, L.; Li, M.; Xu, Y. Hybrid Au—Ag Nanostructures for Enhanced Plasmon-Driven Catalytic Selective Hydrogenation through Visible Light Irradiation and Surface-Enhanced Raman Scattering. J. Am. Chem. Soc. 2018, 140, 864-867.
(38) Zhan, C.; Wang, Z. Y.; Zhang, X. G.; Chen, X. J.; Huang, Y. F.; Hu, S.; Li, J. F.; Wu, D. Y.; Moskovits, M.; Tian, Z. Q. Interfacial Construction of Plasmonic Nanostructures for the Utilization of the Plasmon-Excited Electrons and Holes. J. Am. Chem. Soc. 2019, 141, 8053-8057.
(39) Low, J.; Yu, J.; Li, Q.; Cheng, B. Enhanced Visible-Light Photocatalytic Activity of Plasmonic Ag and Graphene Co-Modified $Bi_2WO_6$ Nanosheets. Phys. Chem. Chem. Phys. 2014, 16, 1111-1120.
(40) Choi, K. M.; Kim, D.; Rungtaweevoranit, B.; Trickett, C. A.; Barmanbek, J. T. D.; Alshammari, A. S.; Yang, P.; Yaghi, O. M. Plasmon-Enhanced Photocatalytic $CO_2$ Conversion within Metal-Organic Frameworks under Visible Light. J. Am. Chem. Soc. 2017, 139, 356-362.
(41) Lang, Q.; Chen, Y.; Huang, T.; Yang, L.; Zhong, S.; Wu, L.; Chen, J.; Bai, S. Graphene "Bridge" in Transferring Hot Electrons from Plasmonic Ag Nanocubes to $TiO_2$ Nanosheets for Enhanced Visible Light Photocatalytic Hydrogen Evolution. Appl. Catal., B 2018, 220, 182-190.
(42) Zhang, Q.; Deng, J.; Xu, Z.; Chaker, M.; Ma, D. High-Efficiency Broadband $C_3N_4$ Photocatalysts: Synergistic Effects from Upconversion and Plasmons. ACS Catal. 2017, 7, 6225-6234.
(43) Zhan, C.; Chen, X.-J.; Yi, J.; Li, J.-F.; Wu, D.-Y.; Tian, Z.-Q. From Plasmon-Enhanced Molecular Spectroscopy to Plasmon-Mediated Chemical Reactions. Nat. Rev. Chem. 2018, 2, 216-230.
(44) Wu, N. Plasmonic Metal-Semiconductor Photocatalysts and Photoelectrochemical Cells: A Review. Nanoscale 2018, 10, 2679-2696.
(45) Christopher, P.; Xin, H.; Linic, S. Visible-Light-Enhanced Catalytic Oxidation Reactions on Plasmonic Silver Nanostructures. Nat. Chem. 2011, 3, 467-472.
(46) Zheng, D.; Pang, X.; Wang, M.; He, Y.; Lin, C.; Lin, Z. Unconventional Route to Hairy Plasmonic/Semiconductor Core/Shell Nanoparticles with Precisely Controlled Dimensions and Their Use in Solar Energy Conversion. Chem. Mater. 2015, 27, 5271-5278.
(47) Kim, S.; Kim, J.-M.; Park, J.-E.; Nam, J.-M. Nonnoble-Metal-Based Plasmonic Nanomaterials: Recent Advances and Future Perspectives. Adv. Mater. 2018, 30, 1704528.
(48) Marimuthu, A.; Zhang, J.; Linic, S. Tuning Selectivity in Propylene Epoxidation by Plasmon Mediated Photo-Switching of Cu Oxidation State. Science 2013, 339, 1590-1593.
(49) Guo, X.; Hao, C.; Jin, G.; Zhu, H. Y.; Guo, X. Y. Copper Nanoparticles on Graphene Support: An Efficient Photocatalyst for Coupling of Nitroaromatics in Visible Light. Angew. Chem. Int. Ed. 2014, 53, 1973-1977.
(50) Zheng, P.; Tang, H.; Liu, B.; Kasani, S.; Huang, L.; Wu, N. Origin of Strong and Narrow Localized Surface Plasmon Resonance of Copper Nanocubes. Nano Res. 2019, 12, 63-68.
(51) Alvarez-Paneque, A. F.; Rodriguez-Gonzalez, B.; Pastoriza-Santos, I.; Liz-Marzán, L. M. Shape-Templated Growth of Au@Cu Nanoparticles. J. Phys. Chem. C 2013, 117, 2474-2479.
(52) Chen, J.; Feng, J.; Yang, F.; Aleisa, R.; Zhang, Q.; Yin, Y. Space-Confined Seeded Growth of Cu Nanorods with Strong Surface Plasmon Resonance for Photothermal Actuation. Angew. Chem. Int. Ed. 2019, 58, 9275-9281.
(53) Chan, G. H.; Zhao, J.; Hicks, E. M.; Schatz, G. C.; Van Duyne, R. P. Plasmonic Properties of Copper Nanoparticles Fabricated by Nanosphere Lithography. Nano Lett. 2007, 7, 1947-1952.
(54) Gawande, M. B.; Goswami, A.; Felpin, F. X.; Asefa, T.; Huang, X.; Silva, R.; Zou, X.; Zboril, R.; Varma, R. S. Cu and Cu-Based Nanoparticles: Synthesis and Applications in Catalysis. Chem. Rev. 2016, 116, 3722-811.
(55) Zhou, Z.-Y.; Tian, N.; Li, J.-T.; Broadwell, I.; Sun, S.-G. Nanomaterials of High Surface Energy with Exceptional Properties in Catalysis and Energy Storage. Chem. Soc. Rev. 2011, 40, 4167-4185.
(56) Son, S. U.; Park, I. K.; Park, J.; Hyeon, T. Synthesis of $Cu_2o$ Coated Cu Nanoparticles and Their Successful Applications to Ullmann-Type Amination Coupling Reactions of Aryl Chlorides. Chem. Commun. 2004, 778-9.
(57) Lee, B.-H.; Park, S.; Kim, M.; Sinha, A. K.; Lee, S. C.; Jung, E.; Chang, W. J.; Lee, K.-S.; Kim, J. H.; Cho, S.-P.; Kim, H.; Nam, K. T.; Hyeon, T. Reversible and Cooperative Photoactivation of Single-Atom $Cu/TiO_2$ Photocatalysts. Nat. Mater. 2019, 18, 620-626.
(58) Kobayashi, Y.; Sakuraba, T. Silica-Coating of Metallic Copper Nanoparticles in Aqueous Solution. Colloids Surf. A 2008, 317, 756-759.
(59) Lee, C.; Kim, N. R.; Koo, J.; Lee, Y. J.; Lee, H. M. Cu—Ag Core-Shell Nanoparticles with Enhanced Oxidation Stability for Printed Electronics. Nanotechnology 2015, 26, 455601.
(60) Kobayashi, Y.; Ishida, S.; Ihara, K.; Yasuda, Y.; Morita, T.; Yamada, S. Synthesis of Metallic Copper Nanoparticles Coated with Polypyrrole. Colloid. Polym. Sci. 2009, 287, 877-880.
(61) Wang, S.; Huang, X.; He, Y.; Huang, H.; Wu, Y.; Hou, L.; Liu, X.; Yang, T.; Zou, J.; Huang, B. Synthesis, Growth Mechanism and Thermal Stability of Copper Nanoparticles Encapsulated by Multi-Layer Graphene. Carbon 2012, 50, 2119-2125.

(62) Chang, S.-H.; Yang, P.-Y.; Lai, C.-M.; Lu, S.-C.; Li, G.-A.; Chang, W.-C.; Tuan, H.-Y. Synthesis of Cu/ZnO Core/Shell Nanocomposites and Their Use as Efficient Photocatalysts. CrystEngComm 2016, 18, 616-621.

(63) Muzikansky, A.; Nanikashvili, P.; Grinblat, J.; Zitoun, D. Ag Dewetting in Cu@Ag Monodisperse Core-Shell Nanoparticles. The Journal of Physical Chemistry C 2013, 117, 3093-3100.

(64) Abbas, M.; Chen, Z.; Chen, J. Shape- and Size-Controlled Synthesis of Cu Nanoparticles Wrapped on Rgo Nanosheet Catalyst and Their Outstanding Stability and Catalytic Performance in the Hydrogenation Reaction of Dimethyl Oxalate. J. Mater. Chem. A 2018, 6, 19133-19142.

(65) Huang, S.; Zhang, Q.; Li, P.; Ren, F.; Yurtsever, A.; Ma, D. High-Performance Suspended Particle Devices Based on Copper-Reduced Graphene Oxide Core-Shell Nanowire Electrodes. Adv. Energy Mater. 2018, 8, 1703658.

(66) Niu, Z.; Cui, F.; Yu, Y.; Becknell, N.; Sun, Y.; Khanarian, G.; Kim, D.; Dou, L.; Dehestani, A.; Schierle-Arndt, K.; Yang, P. Ultrathin Epitaxial Cu@Au Core-Shell Nanowires for Stable Transparent Conductors. J. Am. Chem. Soc. 2017, 139, 7348-7354.

(67) Dou, L.; Cui, F.; Yu, Y.; Khanarian, G.; Eaton, S. W.; Yang, Q.; Resasco, J.; Schildknecht, C.; Schierle-Arndt, K.; Yang, P. Solution-Processed Copper/Reduced-Graphene-Oxide Core/Shell Nanowire Transparent Conductors. ACS Nano 2016, 10, 2600-2606.

(68) Huang, X.; Chen, Y.; Zhu, E.; Xu, Y.; Duan, X.; Huang, Y. Monodisperse Cu@PtCu Nanocrystals and Their Conversion into Hollow-PtCu Nanostructures for Methanol Oxidation. J. Mater. Chem. A 2013, 1, 14449-14454.

(69) Li, Q.; Lian, L.; Liu, Y.; Liu, C. Synthesis, Microstructure, and Catalytic Performance of Monolithic Low-Density Porous Au. Adv. Eng. Mater. 2017, 19, 1700045.

(70) Gawande, M. B.; Goswami, A.; Asefa, T.; Guo, H.; Biradar, A. V.; Peng, D.-L.; Zboril, R.; Varma, R. S. Core-Shell Nanoparticles: Synthesis and Applications in Catalysis and Electrocatalysis. Chem. Soc. Rev. 2015, 44, 7540-7590.

(71) Shi, Y.; Lyu, Z.; Zhao, M.; Chen, R.; Nguyen, Q. N.; Xia, Y. Noble-Metal Nanocrystals with Controlled Shapes for Catalytic and Electrocatalytic Applications. Chem. Rev. 2020, DOI: https://doi.org/10.1021/acs.chemrev.0c00454.

(72) Li, J.-F.; Zhang, Y.-J.; Ding, S.-Y.; Panneerselvam, R.; Tian, Z.-Q. Core-Shell Nanoparticle-Enhanced Raman Spectroscopy. Chem. Rev. 2017, 117, 5002-5069.

(73) Ghosh Chaudhuri, R.; Paria, S. Core/Shell Nanoparticles: Classes, Properties, Synthesis Mechanisms, Characterization, and Applications. Chem. Rev. 2012, 112, 2373-2433.

(74) Peng, X.; Schlamp, M. C.; Kadavanich, A. V.; Alivisatos, A. P. Epitaxial Growth of Highly Luminescent CdSe/CdS Core/Shell Nanocrystals with Photostability and Electronic Accessibility. J. Am. Chem. Soc. 1997, 119, 7019-7029.

(75) Lauhon, L. J.; Gudiksen, M. S.; Wang, D.; Lieber, C. M. Epitaxial Core-Shell and Core-Multishell Nanowire Heterostructures. Nature 2002, 420, 57-61.

(76) Bian, T.; Zhang, H.; Jiang, Y.; Jin, C.; Wu, J.; Yang, H.; Yang, D. Epitaxial Growth of Twinned Au—Pt Core-Shell Star-Shaped Decahedra as Highly Durable Electrocatalysts. Nano Lett. 2015, 15, 7808-7815.

(77) Tan, C.; Zhang, H. Epitaxial Growth of Hetero-Nanostructures Based on Ultrathin Two-Dimensional Nanosheets. J. Am. Chem. Soc. 2015, 137, 12162-12174.

(78) Liu, Z.; Zhong, Y.; Shafei, I.; Borman, R.; Jeong, S.; Chen, J.; Losovyj, Y.; Gao, X.; Li, N.; Du, Y. Tuning Infrared Plasmon Resonances in Doped Metal-Oxide Nanocrystals through Cation-Exchange Reactions. Nat. Commun. 2019, 10, 1394.

(79) Beberwyck, B. J.; Surendranath, Y.; Alivisatos, A. P. Cation Exchange: A Versatile Tool for Nanomaterials Synthesis. J. Phys. Chem. C 2013, 117, 19759-19770.

(80) Ristov, M.; Sinadinovski, G.; Grozdanov, I. Chemical Deposition of $Cu_2O$ Thin Films. Thin Solid Films 1985, 123, 63-67.

(81) Nicolau, Y. F. Solution Deposition of Thin Solid Compound Films by a Successive Ionic-Layer Adsorption and Reaction Process. Appl. Surf. Sci. 1985, 22, 1061-1074.

(82) Stöber, W.; Fink, A.; Bohn, E. Controlled Growth of Monodisperse Silica Spheres in the Micron Size Range. J. Colloid Interface Sci. 1968, 26, 62-69.

(83) Rusch, P.; Niemeyer, F.; Pluta, D.; Schremmer, B.; Lübkemann, F.; Rosebrock, M.; Schäfer, M.; Jahns, M.; Behrens, P.; Bigall, N. C. Versatile Route to Core—Shell Reinforced Network Nanostructures. Nanoscale 2019, 11, 15270-15278.

(84) Kamat, G. A.; Yan, C.; Osowiecki, W. T.; Moreno-Hernandez, I. A.; Ledendecker, M.; Alivisatos, A. P. Self-Limiting Shell Formation in Cu@Ag Core-Shell Nanocrystals During Galvanic Replacement. J. Phys. Chem. Lett. 2020, 11, 5318-5323.

(85) Zhang, Q.; Xie, J.; Lee, J. Y.; Zhang, J.; Boothroyd, C. Synthesis of Ag@AgAu Metal Core/Alloy Shell Bimetallic Nanoparticles with Tunable Shell Compositions by a Galvanic Replacement Reaction. Small 2008, 4, 1067-71.

(86) Tymoczko, A.; Kamp, M.; Rehbock, C.; Kienle, L.; Cattaruzza, E.; Barcikowski, S.; Amendola, V. One-Step Synthesis of Fe—Au Core-Shell Magnetic-Plasmonic Nanoparticles Driven by Interface Energy Minimization. Nanoscale Horiz. 2019, 4, 1326-1332.

(87) Zakaria, H. M.; Shah, A.; Konieczny, M.; Hoffmann, J. A.; Nijdam, A. J.; Reeves, M. E. Small Molecule- and Amino Acid-Induced Aggregation of Gold Nanoparticles. Langmuir 2013, 29, 7661-7673.

(88) Nam, J.; Won, N.; Jin, H.; Chung, H.; Kim, S. pH-Induced Aggregation of Gold Nanoparticles for Photothermal Cancer Therapy. J. Am. Chem. Soc. 2009, 131, 13639-13645.

(89) Shim, J.-Y.; Gupta, V. K. Reversible Aggregation of Gold Nanoparticles Induced by pH Dependent Conformational Transitions of a Self-Assembled Polypeptide. J. Colloid Interface Sci. 2007, 316, 977-983.

(90) Park, S.; Lee, W. J.; Park, S.; Choi, D.; Kim, S.; Park, N. Reversibly pH-Responsive Gold Nanoparticles and Their Applications for Photothermal Cancer Therapy. Sci. Rep. 2019, 9, 20180.

(91) Han, X.; Li, Y.; Wu, S.; Deng, Z. A General Strategy toward Ph-Controlled Aggregation—Dispersion of Gold Nanoparticles and Single-Walled Carbon Nanotubes. Small 2008, 4, 326-329.

(92) Erlebacher, J.; Aziz, M. J.; Karma, A.; Dimitrov, N.; Sieradzki, K. Evolution of Nanoporosity in Dealloying. Nature 2001, 410, 450-453.

(93) Lou, Y.; Zhang, Y.; Cheng, L.; Chen, J.; Zhao, Y. A Stable Plasmonic $Cu@Cu_2O$/ZnO Heterojunction for Enhanced Photocatalytic Hydrogen Generation. ChemSusChem 2018, 11, 1505-1511.

(94) Kalidindi, S. B.; Sanyal, U.; Jagirdar, B. R. Nanostructured Cu and Cu@Cu2O Core Shell Catalysts for Hydrogen Generation from Ammonia—Borane. Phys. Chem. Chem. Phys. 2008, 10, 5870-5874.

(95) Yuan, X.; Zhang, L.; Li, L.; Dong, H.; Chen, S.; Zhu, W.; Hu, C.; Deng, W.; Zhao, Z. J.; Gong, J. Ultrathin Pd—Au Shells with Controllable Alloying Degree on Pd Nanocubes toward Carbon Dioxide Reduction. J. Am. Chem. Soc. 2019, 141, 4791-4794.

(96) Zhou, J.-H.; Lan, D.-W.; Yang, S.-S.; Guo, Y.; Yuan, K.; Dai, L.-X.; Zhang, Y.-W. Thin-Walled Hollow Au—Cu Nanostructures with High Efficiency in Electrochemical Reduction of CO2 to CO. Inorg. Chem. Front. 2018, 5, 1524-1532.

(97) Sutter, E.; Jungjohann, K.; Bliznakov, S.; Courty, A.; Maisonhaute, E.; Tenney, S.; Sutter, P. In Situ Liquid-Cell Electron Microscopy of Silver—Palladium Galvanic Replacement Reactions on Silver Nanoparticles. Nat. Commun. 2014, 5, 4946.

(98) Xia, X.; Wang, Y.; Ruditskiy, A.; Xia, Y. 25th Anniversary Article: Galvanic Replacement: A Simple and Versatile Route to Hollow Nanostructures with Tunable and Well-Controlled Properties. Adv. Mater. 2013, 25, 6313-6333.

(99) Liu, D.; Xie, M.; Wang, C.; Liao, L.; Qiu, L.; Ma, J.; Huang, H.; Long, R.; Jiang, J.; Xiong, Y. Pd—Ag Alloy Hollow Nanostructures with Interatomic Charge Polarization for Enhanced Electrocatalytic Formic Acid Oxidation. Nano Res. 2016, 9, 1590-1599.

(100) Zhou, C.; Jiang, X.; Yang, L.; Yin, Y.; Jin, M. Low-Temperature Carbon Monoxide Oxidation with Au—Cu Meatball-Like Cages Prepared by Galvanic Replacement. ChemSusChem 2013, 6, 1883-1887.

(101) Osowiecki, W. T.; Ye, X.; Satish, P.; Bustillo, K. C.; Clark, E. L.; Alivisatos, A. P. Tailoring Morphology of Cu—Ag Nanocrescents and Core-Shell Nanocrystals Guided by a Thermodynamic Model. J. Am. Chem. Soc. 2018, 140, 8569-8577.

(102) Liu, S.; Sun, Z.; Liu, Q.; Wu, L.; Huang, Y.; Yao, T.; Zhang, J.; Hu, T.; Ge, M.; Hu, F.; Xie, Z.; Pan, G.; Wei, S. Unidirectional Thermal Diffusion in Bimetallic Cu@Au Nanoparticles. ACS Nano 2014, 8, 1886-1892.

(103) Linic, S.; Aslam, U.; Boerigter, C.; Morabito, M. Photochemical Transformations on Plasmonic Metal Nanoparticles. Nat. Mater. 2015, 14, 567-76.

(104) Grant, C. D.; Schwartzberg, A. M.; Norman, T. J.; Zhang, J. Z. Ultrafast Electronic Relaxation and Coherent Vibrational Oscillation of Strongly Coupled Gold Nanoparticle Aggregates. J. Am. Chem. Soc. 2003, 125, 549-553.

(105) Newhouse, R. J.; Wang, H.; Hensel, J. K.; Wheeler, D. A.; Zou, S.; Zhang, J. Z. Coherent Vibrational Oscillations of Hollow Gold Nanospheres. J. Phys. Chem. Lett. 2011, 2, 228-235.

(106) Besteiro, L. V.; Yu, P.; Wang, Z.; Holleitner, A. W.; Hartland, G. V.; Wiederrecht, G. P.; Govorov, A. O. The Fast and the Furious: Ultrafast Hot Electrons in Plasmonic Metastructures. Size and Structure Matter. Nano Today 2019, 27, 120-145.

(107) Liu, J.; Shi, W.; Wang, X. Cluster-Nuclei Coassembled into Two-Dimensional Hybrid CuO-PMA Sub-1 nm Nanosheets. J. Am. Chem. Soc. 2019, 141, 18754-18758.

(108) Xia, Y.; Hou, Q. F.; Jubaer, H.; Li, Y.; Kang, Y.; Yuan, S.; Liu, H. Y.; Woo, M. W.; Zhang, L.; Gao, L.; Wang, H. T.; Zhang, X. W. Spatially Isolating Salt Crystallisation from Water Evaporation for Continuous Solar Steam Generation and Salt Harvesting. Energy Environ. Sci. 2019, 12, 1840-1847.

(109) Liang, H.; Liao, Q.; Chen, N.; Liang, Y.; Lv, G.; Zhang, P.; Lu, B.; Qu, L. Thermal Efficiency of Solar Steam Generation Approaching 100% through Capillary Water Transport. Angew. Chem. Int. Ed. 2019, 58, 19041-19046.

(110) Zhou, L.; Tan, Y.; Wang, J.; Xu, W.; Yuan, Y.; Cai, W.; Zhu, S.; Zhu, J. 3D Self-Assembly of Aluminium Nanoparticles for Plasmon-Enhanced Solar Desalination. Nat. Photonics 2016, 10, 393-398.

(111) Zhao, F.; Guo, Y.; Zhou, X.; Shi, W.; Yu, G. Materials for Solar-Powered Water Evaporation. Nat. Rev. Mater. 2020, 5, 388-401.

(112) Zhan, H.-J.; Chen, J.-F.; Zhao, H.-Y.; Jiao, L.; Liu, J.-W.; Yu, S.-H. Biomimetic Difunctional Carbon-Nanotube-Based Aerogels for Efficient Steam Generation. ACS Applied Nano Materials 2020, 3, 4690-4698.

(113) Li, K.; Chang, T. H.; Li, Z.; Yang, H.; Fu, F.; Li, T.; Ho, J. S.; Chen, P. Y. Biomimetic Mxene Textures with Enhanced Light-to-Heat Conversion for Solar Steam Generation and Wearable Thermal Management. Adv. Energy Mater. 2019, 9, 1901687.

(114) Fang, J.; Liu, J.; Gu, J.; Liu, Q.; Zhang, W.; Su, H.; Zhang, D. Hierarchical Porous Carbonized Lotus Seedpods for Highly Efficient Solar Steam Generation. Chem. Mater. 2018, 30, 6217-6221.

(115) Kaur, M.; Ishii, S.; Shinde, S. L.; Nagao, T. All-Ceramic Microfibrous Solar Steam Generator: TiN Plasmonic Nanoparticle-Loaded Transparent Microfibers. ACS Sustainable Chem. Eng. 2017, 5, 8523-8528.

(116) Ghasemi, H.; Ni, G.; Marconnet, A. M.; Loomis, J.; Yerci, S.; Miljkovic, N.; Chen, G. Solar Steam Generation by Heat Localization. Nat. Commun. 2014, 5, 4449.

(117) Xu, J.; Xu, F.; Qian, M.; Li, Z.; Sun, P.; Hong, Z.; Huang, F. Copper Nanodot-Embedded Graphene Urchins of Nearly Full-Spectrum Solar Absorption and Extraordinary Solar Desalination. Nano Energy 2018, 53, 425-431.

(118) Lu, Q.; Yang, Y.; Feng, J.; Wang, X. Oxygen-Defected Molybdenum Oxides Hierarchical Nanostructure Constructed by Atomic-Level Thickness Nanosheets as an Efficient Absorber for Solar Steam Generation. Solar RRL 2019, 3, 1800277.

(119) Johnson, P. B.; Christy, R. W. Optical Constants of the Noble Metals. Phys. Rev. B 1972, 6, 4370.

(120) Ling, P.; Zhang, Q.; Cao, T.; Gao, F., Versatile Three-Dimensional Porous Cu@Cu$_2$O Aerogel Networks as Electrocatalysts and Mimicking Peroxidases. Angew. Chem. Int. Ed. 2018, 57, 6819-6824.

(121) Jung, M.; Hart, J. N.; Scott, J.; Ng, Y. H.; Jiang, Y.; Amal, R., Exploring Cu Oxidation State on TiO2 and Its Transformation During Photocatalytic Hydrogen Evolution. Appl. Catal. A 2016, 521, 190-201.

(122) Zhu, Y.; Marianov, A.; Xu, H.; Lang, C.; Jiang, Y., Bimetallic Ag—Cu Supported on Graphitic Carbon Nitride Nanotubes for Improved Visible-Light Photocatalytic Hydrogen Production. ACS Appl. Mater. Interfaces 2018, 10, 9468-9477.

(123) Yuan, X.; Zhang, L.; Li, L.; Dong, H.; Chen, S.; Zhu, W.; Hu, C.; Deng, W.; Zhao, Z.-J.; Gong, J., Ultrathin Pd—Au Shells with Controllable Alloying Degree on Pd Nanocubes toward Carbon Dioxide Reduction. J. Am. Chem. Soc. 2019, 141, 4791-4794.

(124) Xue, W.; Yin, H.; Lu, Z.; Feng, Y.; Wang, A.; Liu, S.; Shen, L.; Jia, X., Catalytic Oxidation of 1,2-Propanediol over Bimetallic Cu@Au Core/Shell Nanoparticles. Catal. Lett. 2016, 146, 1139-1152.

(125) Niu, Z.; Cui, F.; Yu, Y.; Becknell, N.; Sun, Y.; Khanarian, G.; Kim, D.; Dou, L.; Dehestani, A.; Schierle-Arndt, K.; Yang, P., Ultrathin Epitaxial Cu@Au Core-Shell Nanowires for Stable Transparent Conductors. J. Am. Chem. Soc. 2017, 139, 7348-7354.

(126) Ho, T.-L., Hard and Soft Acids and Bases Principle in Organic Chemistry. Academic Press, New York, 1977.

(127) Zhou, J.-H.; Lan, D.-W.; Yang, S.-S.; Guo, Y.; Yuan, K.; Dai, L.-X.; Zhang, Y.-W., Thin-Walled Hollow Au—Cu Nanostructures with High Efficiency in Electrochemical Reduction of $CO_2$ to CO. Inorg. Chem. Front. 2018, 5, 1524-1532.

The invention claimed is:

1. A process of forming a Cu core-shell nanoparticle comprising a core comprising Cu and a shell comprising at least one noble metal, the process comprising
    mixing a Cu source and an amine at a temperature of about 200° C. to about 270° C. under an inert atmosphere to obtain a mixture;
    cooling the mixture to form a Cu nanoparticle dispersed in the amine; and
    adding a noble metal composition comprising a phosphine to obtain the core-shell nanoparticle.

2. The process of claim 1, wherein the amine is chosen from the group consisting of oleyamine, decylamine, octylamine, hexadecylamine and dodecylamine.

3. The process of claim 1, wherein the phosphine is a trialkylphosphine.

4. The process of claim 1, wherein the adding of the noble metal composition is at about 140° C.

5. The process of claim 1, wherein the noble metal is selected from the group consisting of Au, Pt, Pd, and Rh.

6. The process of claim 1, wherein the amine is oleyamine.

7. The process of claim 1, wherein the phosphine is trioctylphosphine.

8. The process of claim 1, wherein the phosphine is triphenylphosphine.

9. The process of claim 1, wherein the Cu source is selected from the group consisting of $Cu(acac)_2$, CuBr, $Cu(CH_3COO)_2$, $CuCl_2$, $Cu(NO_3)_2$, CuI, $CuBr_2$, and $CuSO_4$.

10. The process of claim 1, wherein the Cu source is $Cu(acac)_2$.

11. The process of claim 1, wherein the Cu source is selected from the group consisting of a $Cu^+$ source, a $Cu^{2+}$ source and a combination thereof.

12. The process of claim 1, wherein the Cu source is $Cu^{2+}$ source.

13. The process of claim 1, wherein the mixing of the Cu source and the amine is at about 230° C.

14. The process of claim 1, further comprising maintaining the temperature of the mixture at about 200° C. to about 270° C. for about 1 hour to about 6 hours.

15. The process of claim 1, wherein the temperature of the mixture is maintained at about 230° C. for about 3 hours.

16. The process of claim 1, further comprising precipitating the Cu nanoparticle dispersed in the amine by mixing the Cu nanoparticle dispersed in the amine with a polar organic solvent to obtain precipitated Cu nanoparticles and optionally collecting the precipitated Cu nanoparticles by centrifugation.

17. The process of claim 1, further comprising purifying the Cu nanoparticle by one or more redispersion-reprecipitation cycles in hexanes and ethanol to obtain purified Cu nanoparticles, and optionally collecting the purified Cu nanoparticles by centrifugation.

18. The process of claim 1, wherein the noble metal composition is $HAuCl_4 \cdot 3H_2O$.

* * * * *